United States Patent
Rodgers et al.

(10) Patent No.: US 11,110,993 B2
(45) Date of Patent: Sep. 7, 2021

(54) DAMPING DEVICE ADAPTED FOR INTEGRATION WITHIN A GEARSHIFTING SYSTEM

(71) Applicants: Brandon Rodgers, Los Osos, CA (US); Jasper Lewin, Santa Cruz, CA (US)

(72) Inventors: Brandon Rodgers, Los Osos, CA (US); Jasper Lewin, Santa Cruz, CA (US)

(*) Notice: Subject to any disclaimer, the term of this patent is extended or adjusted under 35 U.S.C. 154(b) by 147 days.

(21) Appl. No.: 16/264,308

(22) Filed: Jan. 31, 2019

(65) Prior Publication Data

US 2019/0233054 A1    Aug. 1, 2019

Related U.S. Application Data

(63) Continuation-in-part of application No. 16/218,467, filed on Dec. 12, 2018, and a continuation-in-part of application No. 15/703,273, filed on Sep. 13, 2017, now Pat. No. 10,556,639.

(51) Int. Cl.
  *B62M 9/1248* (2010.01)
  *F16H 25/20* (2006.01)
  *B62K 23/02* (2006.01)

(52) U.S. Cl.
  CPC ........... *B62M 9/1248* (2013.01); *F16H 25/20* (2013.01); *B62K 23/02* (2013.01)

(58) Field of Classification Search
  CPC ..... B62M 9/126; B62M 9/121; B62M 9/1248
  USPC .............................................. 474/78, 80, 82
  See application file for complete search history.

(56) References Cited

U.S. PATENT DOCUMENTS

| | | | | |
|---|---|---|---|---|
| 4,627,827 A | * | 12/1986 | Juy ........................ | B62M 9/126 474/80 |
| 5,213,548 A | * | 5/1993 | Colbert .................. | B62M 25/08 280/238 |
| 5,577,969 A | * | 11/1996 | Watarai .................. | B62M 9/122 474/78 |
| 6,012,999 A | * | 1/2000 | Patterson ............... | B62M 9/122 474/104 |
| 6,042,495 A | * | 3/2000 | Patterson ............... | B62M 9/122 474/78 |
| 6,135,904 A | * | 10/2000 | Guthrie .................. | B62M 9/122 474/82 |
| 6,394,921 B1 | * | 5/2002 | Fukuda .................. | B62M 9/126 474/80 |

(Continued)

*Primary Examiner* — Henry Y Liu
(74) *Attorney, Agent, or Firm* — Patrick Reilly

(57) ABSTRACT

A damping device includes an annular chamber rotatably coupled with the gear selection assembly; a rotating element rotatably coupled with the chamber and fixedly coupled with a gear guide pulley of the gear selection device; and a damping grease volume, the damping grease volume contained under pressure between the chamber and the rotating element and adapted to transfer force between the chamber and to the rotating element. The damping device may be adapted for integration within a gear selection device and for coupling with a linear actuator of the gear selection device. The damping device may be coupled with both a chain pulley of the gear selection device and the linear actuator, wherein the damping device positions the chain pulley within the gear selection device as driven by the linear actuator. The gear selection device may be attached to or comprised within a wheeled vehicle, such as a bicycle.

22 Claims, 49 Drawing Sheets

(56) References Cited

U.S. PATENT DOCUMENTS

| | | | | |
|---|---|---|---|---|
| 6,623,389 B1* | 9/2003 | Campagnolo | ........... | B62M 9/122 474/70 |
| 6,634,971 B2* | 10/2003 | Campagnolo | ........... | B62M 9/122 474/78 |
| 6,679,797 B2* | 1/2004 | Valle | ........... | B62M 9/132 474/78 |
| 6,884,190 B2* | 4/2005 | Takebayashi | ........... | B62M 9/10 474/70 |
| 6,988,739 B2* | 1/2006 | Guderzo | ........... | B62M 9/122 280/259 |
| 7,144,027 B2* | 12/2006 | Kitamura | ........... | B62M 25/045 280/260 |
| 7,207,912 B2* | 4/2007 | Takeda | ........... | B62M 25/045 280/260 |
| 7,223,189 B2* | 5/2007 | Guderzo | ........... | B62M 25/08 474/70 |
| 7,373,232 B2* | 5/2008 | Guderzo | ........... | B62M 9/122 474/116 |
| 8,104,142 B2* | 1/2012 | Lowry | ........... | E05D 11/082 16/307 |
| 9,037,368 B2* | 5/2015 | Miglioranza | ........... | F16H 61/0213 701/60 |
| 9,039,551 B2* | 5/2015 | Bohm | ........... | B62M 9/1244 474/80 |
| 9,228,643 B2* | 1/2016 | Yamaguchi | ........... | B62M 9/16 |
| 9,377,089 B2* | 6/2016 | Yamaguchi | ........... | B62M 9/16 |
| 9,645,606 B2* | 5/2017 | Tong | ........... | G06F 1/1681 |
| 9,669,900 B2* | 6/2017 | Shirai | ........... | F16H 7/1236 |
| 9,714,067 B1* | 7/2017 | Hara | ........... | B62M 9/122 |
| 9,751,590 B2* | 9/2017 | Shipman | ........... | B62M 9/128 |
| 10,137,962 B2* | 11/2018 | Celi | ........... | B62M 9/1244 |
| 10,189,542 B2* | 1/2019 | Wu | ........... | B62M 9/1242 |
| 10,252,772 B2* | 4/2019 | Sala | ........... | B62M 25/08 |
| 10,435,111 B2* | 10/2019 | Shipman | ........... | B62M 9/16 |
| 10,577,053 B2* | 3/2020 | Brown | ........... | B62M 9/1248 |
| 2002/0061797 A1* | 5/2002 | Valle | ........... | B62M 25/08 474/70 |
| 2004/0063528 A1* | 4/2004 | Campagnolo | ........... | B62M 9/122 474/70 |
| 2004/0166972 A1* | 8/2004 | Takeda | ........... | B62M 25/08 474/78 |
| 2005/0043129 A1* | 2/2005 | Guderzo | ........... | B62M 9/122 474/78 |
| 2005/0098978 A1* | 5/2005 | Kitamura | ........... | B62M 25/08 280/260 |
| 2005/0227798 A1* | 10/2005 | Ichida | ........... | B62M 25/045 474/81 |
| 2006/0100045 A1* | 5/2006 | Fukuda | ........... | B62M 9/122 474/70 |
| 2006/0189423 A1* | 8/2006 | Ichida | ........... | B62M 9/131 474/80 |
| 2007/0137361 A1 | 6/2007 | Fujii | | |
| 2007/0219029 A1* | 9/2007 | Turner | ........... | B62M 9/16 474/80 |
| 2008/0032835 A1 | 2/2008 | Reynolds | | |
| 2009/0045601 A1 | 2/2009 | Colegrove | | |
| 2009/0133219 A1* | 5/2009 | Lowry | ........... | E05D 11/082 16/304 |
| 2009/0210118 A1* | 8/2009 | Takamoto | ........... | B62M 9/122 701/49 |
| 2009/0315692 A1 | 12/2009 | Miki | | |
| 2012/0258827 A1 | 10/2012 | Ishikawa | | |
| 2013/0203532 A1* | 8/2013 | Jordan | ........... | B62M 9/1248 474/82 |
| 2014/0032067 A1* | 1/2014 | Miglioranza | ........... | B62M 25/08 701/60 |
| 2014/0102237 A1 | 4/2014 | Jordan | | |
| 2014/0287856 A1* | 9/2014 | Kuwayama | ........... | B62M 9/132 474/80 |
| 2014/0303857 A1* | 10/2014 | Takamoto | ........... | B62M 25/08 701/51 |
| 2016/0046352 A1* | 2/2016 | Shipman | ........... | B62M 9/126 474/80 |
| 2016/0186474 A1* | 6/2016 | Tong | ........... | F16F 7/04 361/679.27 |
| 2016/0288878 A1 | 10/2016 | Shipman | | |
| 2017/0174289 A1* | 6/2017 | Wu | ........... | B62M 9/16 |
| 2017/0355423 A1* | 12/2017 | Celi | ........... | B62M 9/122 |
| 2018/0346058 A1* | 12/2018 | Brown | ........... | F16F 7/06 |

* cited by examiner

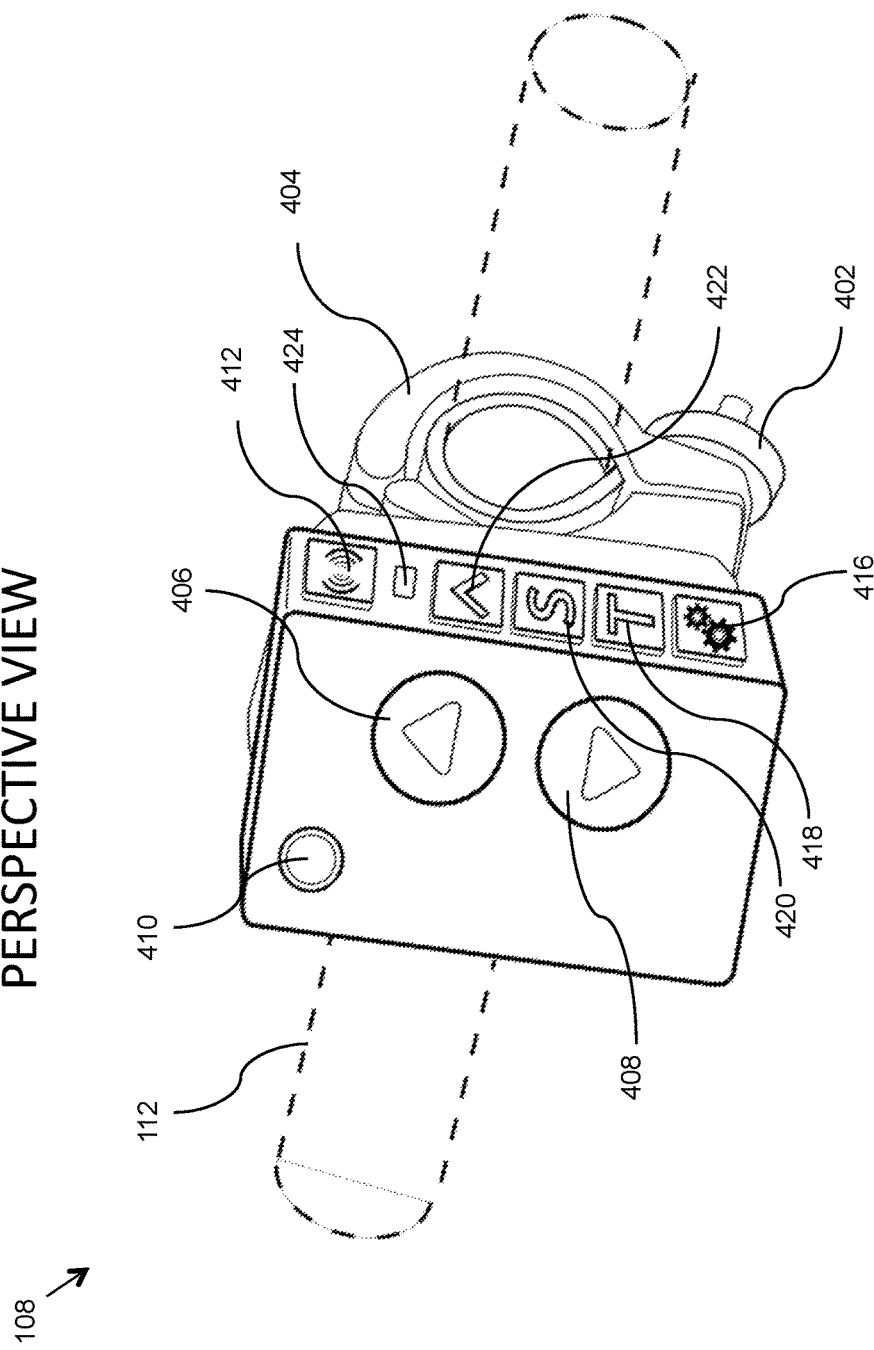

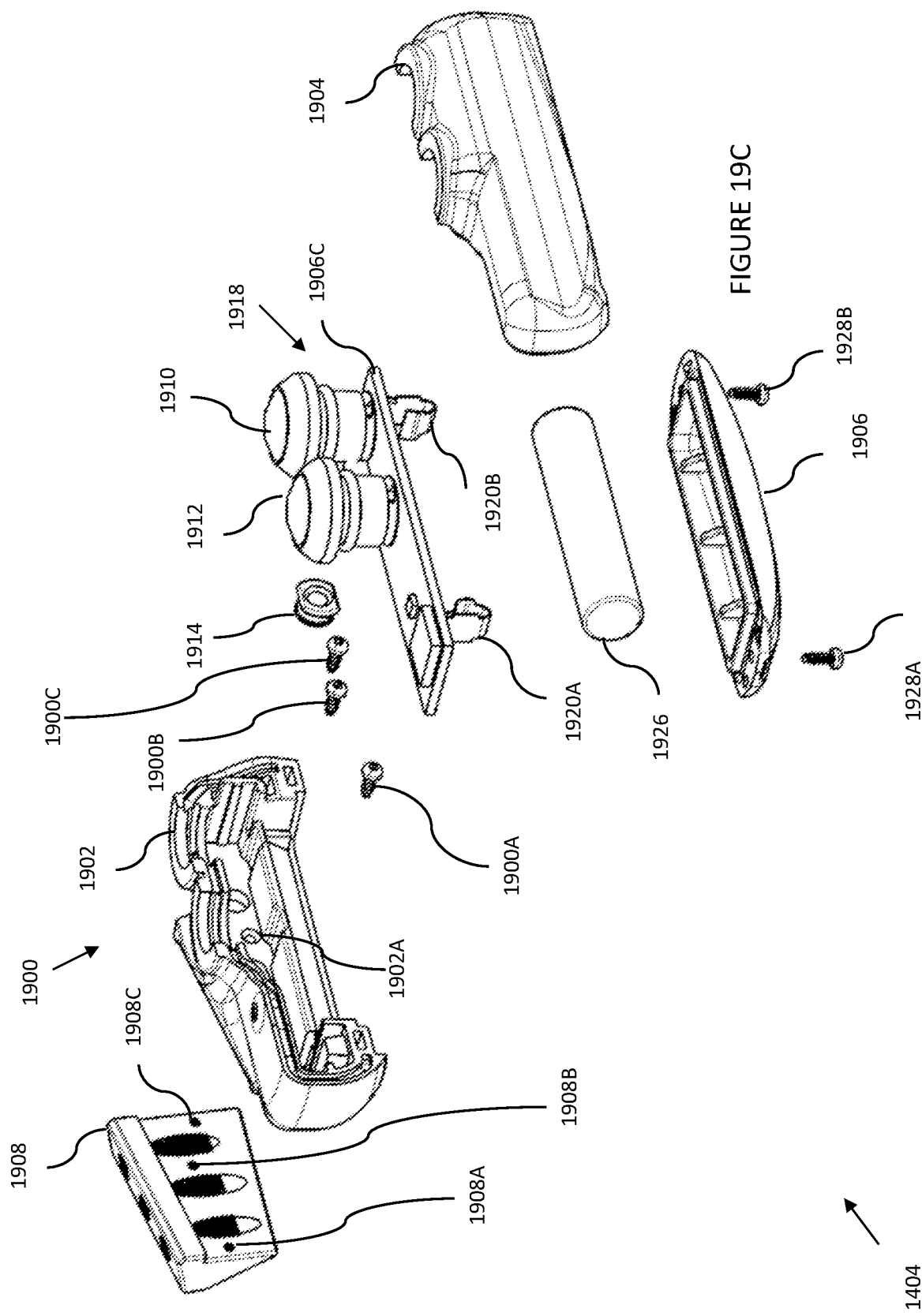

GEAR VALUE TABLE 2004

| | | |
|---|---|---|
| GRN.001 | PWD.VAL.001 | NULL |
| GRN.002 | PWD.VAL.002 | NULL |
| GRN.003 | PWD.VAL.003 | NULL |
| GRN.004 | PWD.VAL.004 | NULL |
| GRN.005 | PWD.VAL.005 | NULL |
| GRN.006 | PWD.VAL.006 | FLAG |
| GRN.007 | PWD.VAL.007 | NULL |
| GRN.008 | PWD.VAL.008 | NULL |
| GRN.009 | PWD.VAL.009 | NULL |
| GRN.010 | PWD.VAL.010 | NULL |
| GRN.N | PWD.VAL.N | NULL |

FIGURE 22

ADJ.MSG.001

| AMSG.ID.001 | ADDR.DR | ADDR.CM | GN-PWM | UP-DOWN | DTS.001 |

RPGM.MSG.001

| RPGM.MSG.ID.001 | ADDR.DR | GN-PWM | VAL.NEW | DTS.002 |

US 11,110,993 B2

DAMPING DEVICE ADAPTED FOR INTEGRATION WITHIN A GEARSHIFTING SYSTEM

CO-PENDING APPLICATION

The present Nonprovisional patent application is a Continuation-in-Part Nonprovisional patent application to, and claims the priority date of, U.S. Nonprovisional patent application Ser. No. 15/703,273 filed on Sep. 13, 2017 and titled "Wireless sprocket shifting control system". This U.S. Nonprovisional patent application Ser. No. 15/703,273 is hereby incorporated by reference in its entirety and for all purposes into the present Nonprovisional patent application.

The present Nonprovisional patent Application is additionally a Continuation-in-Part Nonprovisional patent application to, and claims the priority date of, U.S. Nonprovisional patent application Ser. No. 16/218,467 filed on Dec. 12, 2018 and titled "Gearshifting system comprising a linear actuator". This U.S. Nonprovisional patent application Ser. No. 16/218,467 is hereby incorporated by reference in its entirety and for all purposes into the present Nonprovisional patent application.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many chain driven vehicles, such as road and off-road bicycles, for example, are equipped with a chain drive assembly including one or more chain rings attached to a crank and a rear wheel hub including a freewheel having a number of rear sprockets or cogs. Torque produced by a rider at the crank and chain rings is transmitted to the rear sprockets by a chain. The function of moving the chain from one of the rear sprockets to another of the rear sprockets is accomplished by a rear derailleur.

With respect to off-road bicycles, technological innovation, for example the prevalent use of active front and rear suspension, has permitted greater speeds over increasingly technical terrain. This has presented a challenge to chain drive assembly engineers at least with respect to prevention of chain malfunction. This challenge is especially seen in multi-geared bicycles that can experience severe changes in chain tension, primarily from riding over rough terrain.

It is the object of the present invention to provide a damping clutch, especially for a derailleur, such as but not limited to a bicycle derailleur, that can successfully and reliably be ridden over rough and challenging terrain.

SUMMARY AND OBJECTS OF THE INVENTION

Towards these and other objects of the method of the present invention (hereinafter, "the invented method") that are made obvious to one of ordinary skill in the art in light of the present disclosure, an invented damping clutch device is provided.

In certain preferred embodiments of the present invention, the invented damping clutch device is adapted for integration within a gear selection device, such as but not limited to, a derailleur. A gear selection device coupled with certain alternate preferred embodiments of the invented damping clutch device may include a gear selection assembly and a gear guide pulley. The invented damping device may optionally or alternatively include (1.) an annular chamber rotatably coupled with the gear selection assembly; (2.) a rotating element rotatably coupled with the chamber and fixedly coupled with the gear guide pulley; and/or (3.) a damping grease volume, the damping grease volume contained between the chamber and the rotating element and transferring force travelling between the chamber and to the rotating element.

In certain yet other alternate preferred embodiments of the present invention, the invented damping clutch device is adapted for integration within a gear selection device, such as but not limited to a derailleur, and for coupling with a linear actuator of the gear selection device.

In certain even other preferred embodiments of the present invention, the invented damping clutch device is adapted for integration within a gear selection device that comprises a derailleur.

The method of the present invention optionally further provides a system (hereinafter, "the invented system") for control of derailleur operations by wireless and/or hard wired communications means, and a method of use thereof. The method of the present invention (hereinafter, "the invented method") allows operator control of at least one linear actuator to cause a derailleur to shift gears.

According to certain optional aspects of the present invention (hereinafter, "the invented gearshift system") includes a derailleur having a linear actuator that is adapted and applied to position a bracket, whereby the positioning of the bracket determines a relative location of a chain pulley in relation to a device frame. A linking element may couple the bracket to the chain pulley and may optionally be damped.

According to certain additional optional aspects of the invented derailleur, the derailleur forms a parallelogram bracket assembly that is rotatably coupled with the linear actuator, whereby linear motion of an arm of the linear actuator causes the bracket assembly to rotatably move relative to the linear actuator and optionally rotate relative to the chain pulley. An additional optional coupling element of the invented derailleur may rotatably couple to both the bracket assembly and the chain pulley whereby linear mechanical force received from the bracket assembly is at least partially transferred to the chain pulley.

According to certain yet additional optional aspects of the invented method, the invented derailleur may include a motor within or external to the linear actuator that applies force to position the linear actuator arm. The motor may be electrically powered, such as but not limited a direct current brush motor or a direct current brushless motor, and may be powered by a electrical power source, such as but not limited to an electrical charge battery, that is internal or alternatively external to the device.

According to certain yet additional optional aspects of the invented method, the invented derailleur may be coupled with one or more digital memory circuits that retain gearshift-setting values. Additionally and optionally, the control unit may enable the user to make reprogrammable microadjustments of the gearshift setting values as stored in one or more memories. The invented derailleur may be electrically coupled to receive electrical power from the electrical charge battery of the linear actuator and/or one or more additional batteries.

According to certain still additional optional aspects of the invented method, a control unit is provided with a communications pathway to the linear actuator whereby a user may direct the coupled derailleur to upshift and/or downshift. The communications pathway may be hard wired or wireless. In wireless embodiments of the control unit, the linear actuator is coupled with a paired circuit that receives and applies upshift and/or downshift commands generated from the control unit as directed by the user. In certain wireless embodiments of the control unit, the communications pathway conforms with one or more published wireless communications standards, such as but not limited to, the BLUETOOTH™ wireless communications standard, a WiFi™ wireless communications standard, and/or other suitable wireless communications standards known in the art.

Alternatively, additionally or optionally, the control unit and/or the linear actuator may be coupled with one or more digital memory circuits that retain gearshift-setting values. Additionally and optionally, the control unit may enable the user to make adjustments of the gearshift setting values as stored in one or more memories. The control unit may be electrically coupled to receive electrical power from the electrical charge battery of the linear actuator and/or one or more additional batteries.

In certain preferred alternate embodiments of the invented method, the invented derailleur and/or the control unit are coupled with an equipment or vehicular frame, such as but not limited to, a frame of a bicycle, a tricycle, or other mechanical system having a derailleur.

It is understood that the scope of meaning of the term gear as applied in the present disclosure includes the meaning of the term of art of sprocket.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 9,475,547 titled "Derailleur with damping assembly" and issued on Oct. 25, 2016 to Inventor Jordan, Brian; U.S. Pat. No. 10,047,816 titled "Damping strut with a hydraulic shock absorber and method for operating the damping strut" and issued on Aug. 14, 2018 to Ripa, Thomas; U.S. Pat. No. 9,751,590 titled "Bicycle rear derailleur with a damper assembly" issued on Sep. 5, 2017 to inventors Shipman; et al.; U.S. Pat. No. 8,066,597 titled "Electrically operated derailleur with force overload protection" and issued on Nov. 29, 2011 to Inventor Sakaue, Tadashi; U.S. Pat. No. 9,676,444 titled "Electromechanical rear derailleur" and issued on Jun. 13, 2017 to Inventor Shipman, Christopher; U.S. Pat. No. 9,394,030 titled "Rear derailleur" and issued on Jul. 19, 2016 to Inventor Shipman, Christopher; U.S. Pat. No. 9,784,552 titled "Controllable Caliper" and issued on Oct. 10, 2017 to Inventors Grosz, Gregory C. and Kros, Hans A.; and US Patent Application Publication No. 20170355423 A1 titled "DERAILLEUR WITH DAMPER OF THE CHAIN GUIDE" and published on Dec. 14, 2017 and referencing Inventor Celi, Gabriel are incorporated herein by reference in their entirety and for all purposes.

BRIEF DESCRIPTION OF THE FIGURES

The detailed description of some embodiments of the invention is made below with reference to the accompanying figures, wherein like numerals represent corresponding parts of the figures.

FIG. 4A is a perspective view of the control module of the first preferred embodiment of the invented system of FIG. 1;

FIG. 19C is an additional exploded view of the second control module of FIG. 14;

FIG. 22 is a block diagram of an instantiation of the gear PWM value table stored with the derailleur control circuitry of FIG. 21 and/or the alternate control module circuitry of FIG. 20;

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
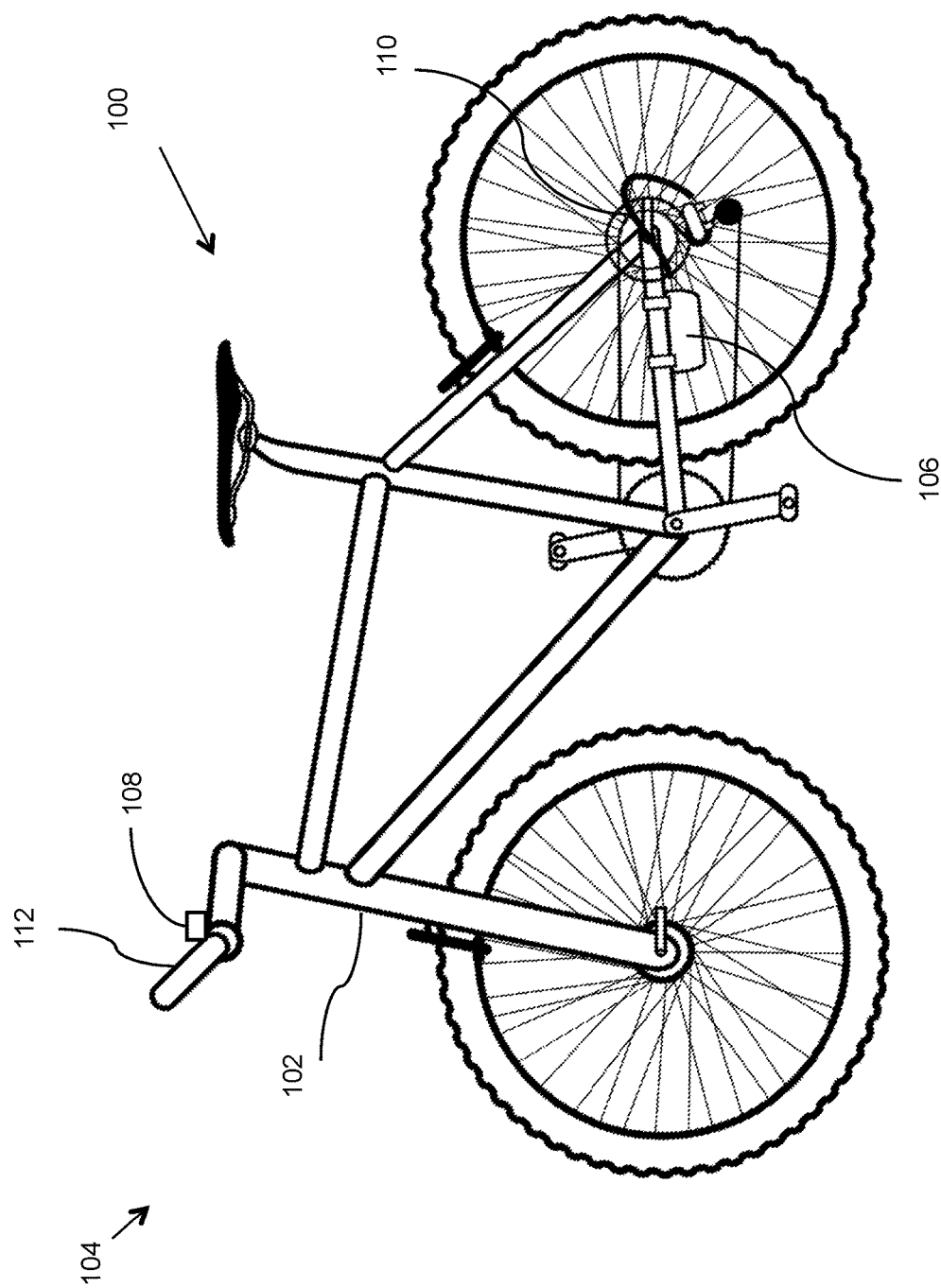
FIG. 1 is an illustration of a first preferred embodiment of the invented system having a control module and a shifter module installed on a bicycle.

Referring now generally to the Figures and particularly to FIG. 1, FIG. 1 illustrates a first preferred embodiment of the invented system 100, (hereinafter, "the first system" 100) coupled with a frame 102 of a bicycle 104. The first system 100 includes a shifter module 106 (hereinafter, "the shifter" 106) and a remote control module (hereinafter, "the control module") 108. The shifter 106 is coupled with both the frame 102 and a derailleur 110 of the bicycle 104 and the control module 108 is coupled with a handlebar 112 of the bicycle 104. A pair of pedals 114 & 116 of the bicycle 104 are used by a rider to mechanically power the bicycle 104.

Figure 2A:
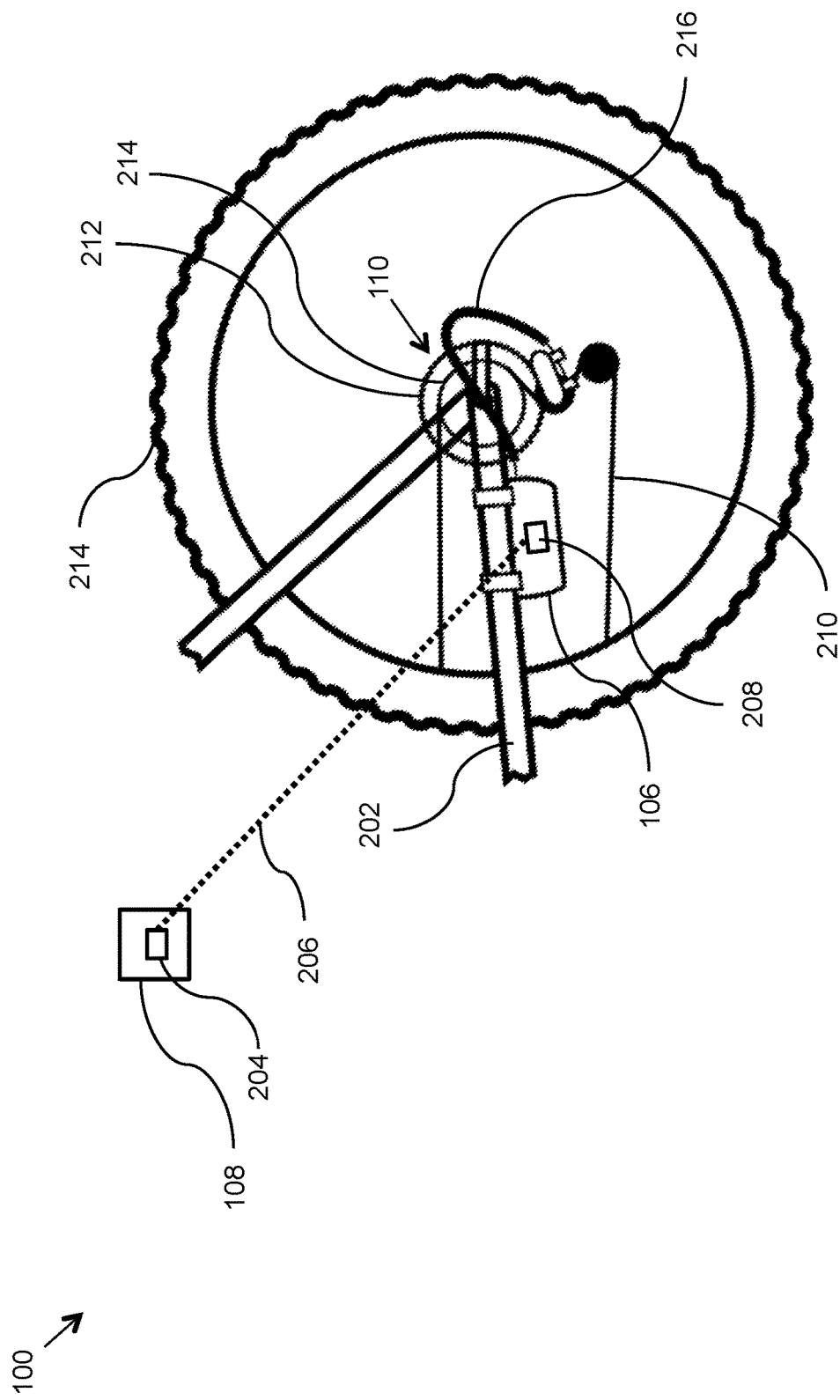
FIG. 2A is a more detailed block diagram of the first preferred embodiment of the invented system of FIG. 1.

Referring now generally to the Figures and particularly to FIG. 2A, FIG. 2A illustrates a first preferred embodiment of the first system 100 with a chain-stay frame section 202, (hereinafter, "the chain-stay" 202) of the bicycle 104. The first system 100 includes the shifter 106 adapted to the chain-stay 202 positioned next to a rear wheel 214 of the bicycle 104 and the remote control 108. A CM wireless communication circuit 204 of the control module 108 is adapted to transmit a wireless signal 206 to a shifter wireless communication circuit 208 of the shifter 106 directing the shifter 106 to change a chain 210 coupling position between a plurality of sprockets 212 & 214 within the derailleur 110. The shifter wireless communication circuit 208 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

The shifter 106 is coupled with a Bowden cable wire tension and compression element 216, (hereinafter, "the Bowden wire" 216) wherein the shifter 106 uses the Bowden wire 216 for controlling the connection between the chain 210 and the sprockets 210 and 214 of the derailleur 110. The CM wireless communication circuit 204 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

Figure 2B:
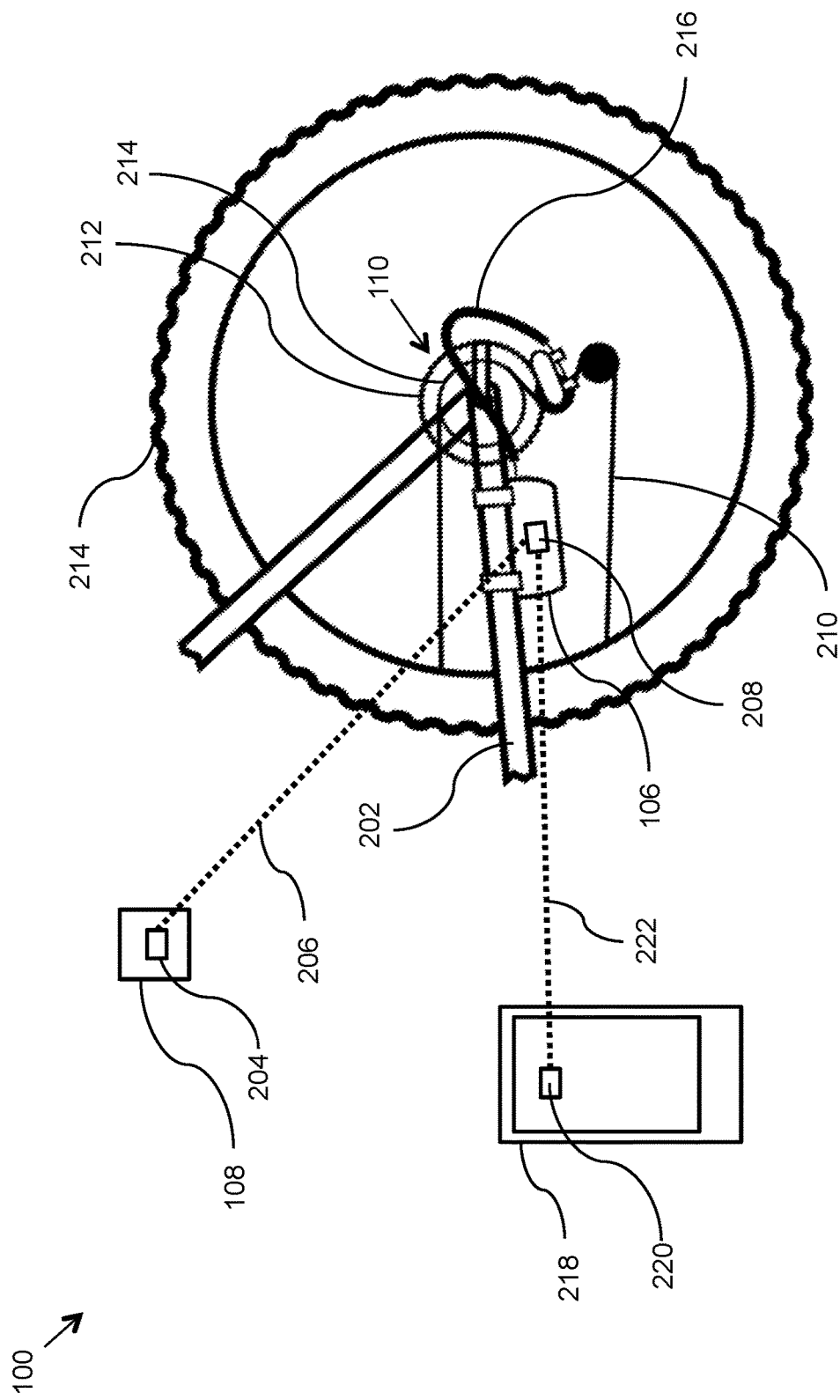
FIG. 2B is a detailed block diagram of the first preferred embodiment of the invented system of FIG. 1 with an optional smartphone.

Referring now generally to the Figures and particularly to FIG. 2B, FIG. 2B illustrates a first system 100 with additional optional aspects. The invented system 100 optionally includes the shifter 106 coupled with the chain-stay 202 and positioned next to the rear wheel 214 of the bicycle 104 and an optional electronic communication device 218, (hereinafter, "the smartphone" 218). The smartphone 218 may be or comprise a wireless communications-enabled product or system such as, but not limited, to an IPHONE™ mobile phone that includes bundled software and is marketed by Apple, Inc. of Cupertino, Calif., or other suitable communications device known in the art.

The CM wireless communication circuit 204 of the control module 108 is adapted to transmit a wireless signal 206 to the shifter wireless communication circuit 208 of the shifter 106 and thereby directing the shifter 106 to change the chain 210 coupling position between the sprockets 212 and 214 within the derailleur 110. Furthermore, the shifter 106 is coupled with the Bowden wire 216 wherein the shifter 106 uses the Bowden wire 216 for controlling the connection between the chain 210 and the sprockets 210 and 214 of the derailleur 110. Additionally, a third wireless communication circuit 220 of the smartphone 218 is adapted to transmit a wireless signal 222 containing a configuration set point data to the shifter wireless communication circuit 208 of the shifter 106 wherein the configuration set point data is used for configuring the control of the connection between the chain 210 and the sprockets 212 and 214 of the derailleur 110. The third wireless communications circuit 220 is preferably adapted and configured to send and receive wireless communications in conformance with a wireless communications standard, such as but not limited the BLUETOOTH™ wireless communications standard as maintained by the Bluetooth Special interest Group of Kirkland, Wash., or other suitable wireless communications standard known in the art.

Figure 3A:
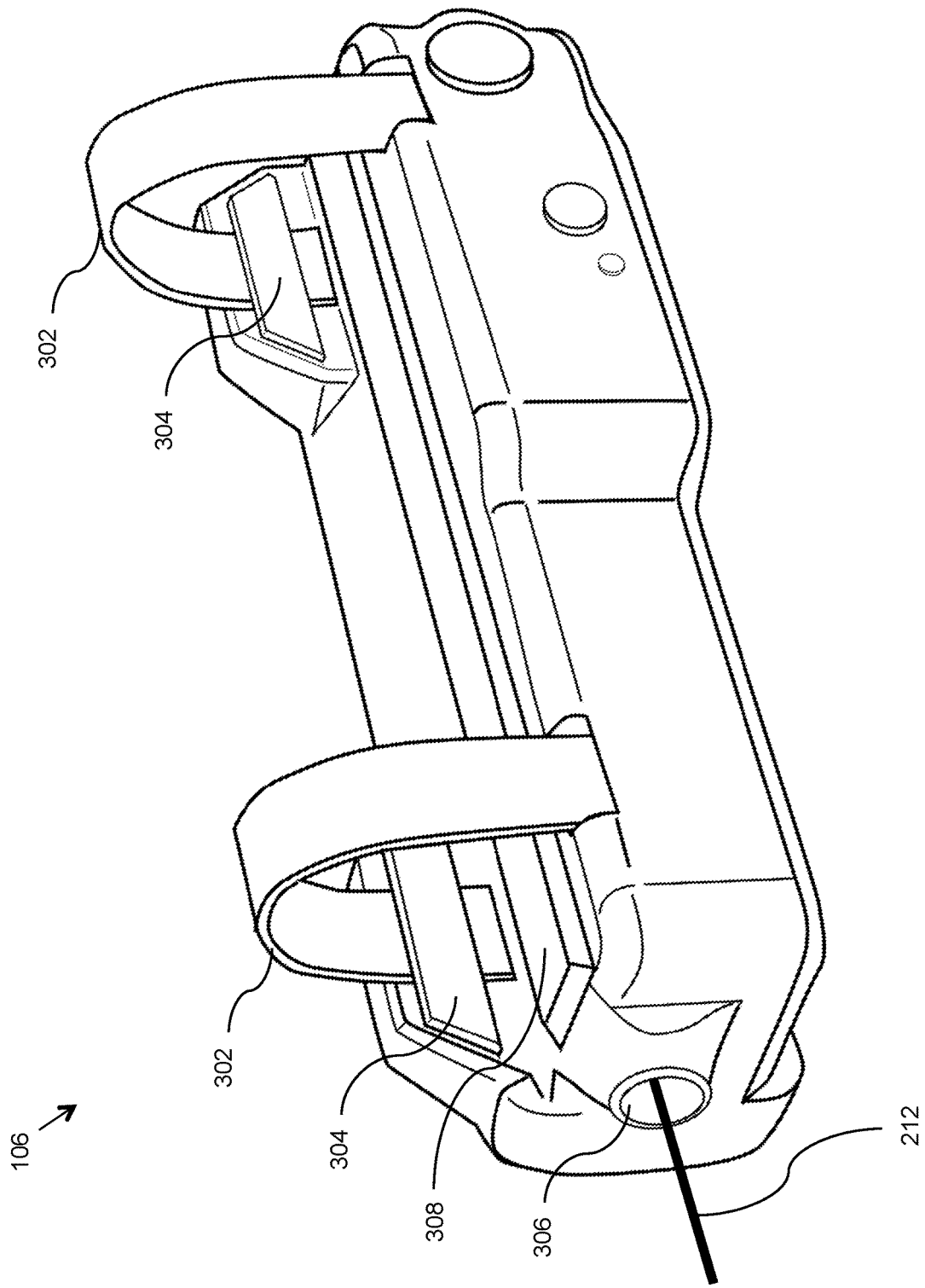
FIG. 3A is a perspective view of the shifter module of the first preferred embodiment of the invented system of FIG. 1.

Referring now generally to the Figures and particularly to FIG. 3A, FIG. 3A illustrates a first preferred embodiment of the shifter 106 of the first system 100 coupled with the Bowden wire 216 wherein the Bowden wire 216 is inserted into the shifter 106 through a cable housing 302 of the shifter 106. The shifter 106 is adapted with a PVC coated vinyl straps 304, (hereinafter, "the straps") 304 wherein the straps 304 are securely coupled with the shifter body 106 with a clamps 306. Furthermore, the straps 304 are positioned directly above a molded rubber bumper 308 for allowing a frictionless coupling of the shifter 106 to the chain-stay 202.

Figure 3B:
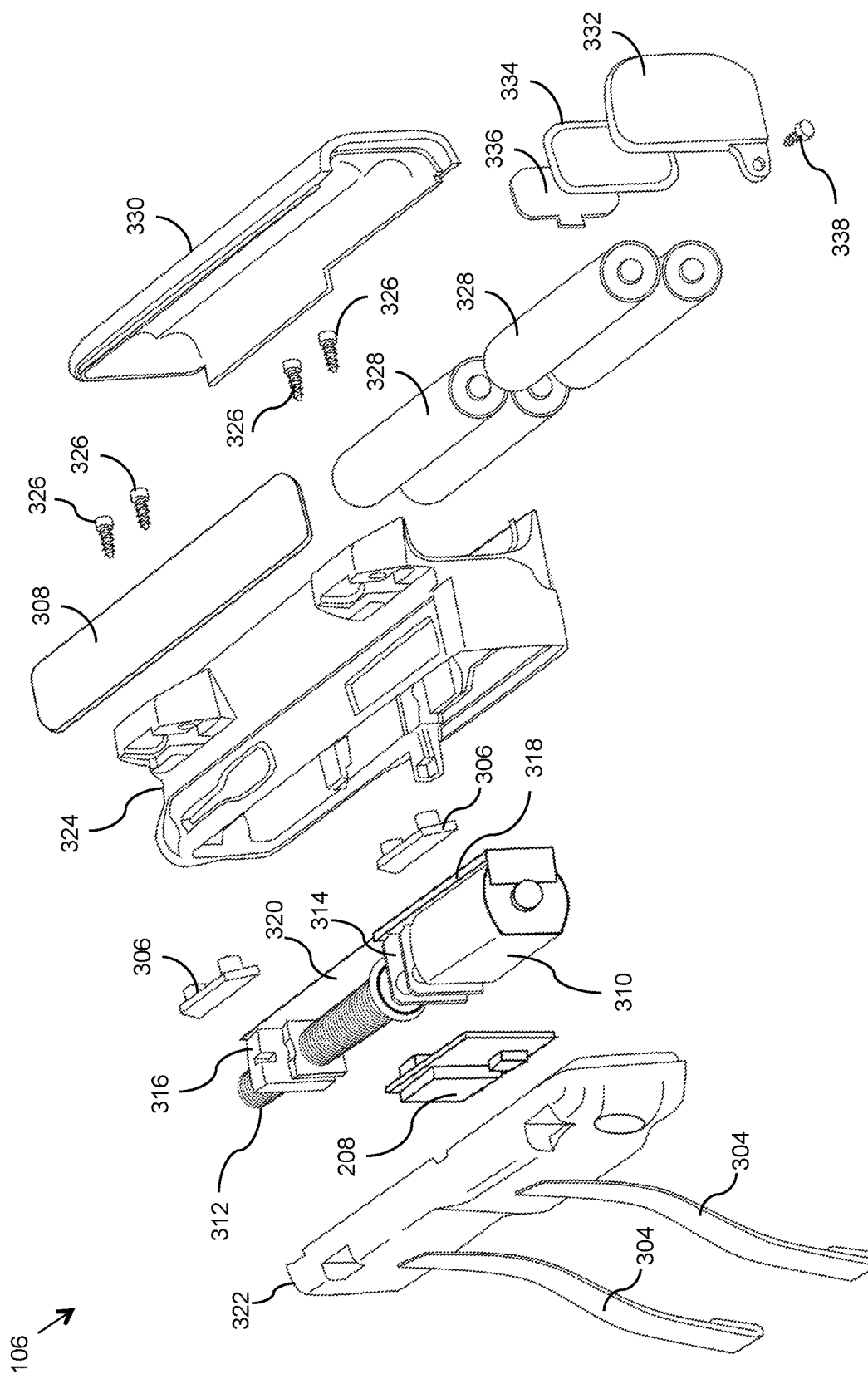
FIG. 3B is an exploded detailed view of the shifter module of the first preferred embodiment of the invented system of FIG. 1.

Referring now generally to the Figures and particularly to FIG. 3B, FIG. 3B illustrates the exploded view of a first preferred embodiment of the shifter 106 of the first system 100. The shifter 106 mechanism for controlling the connection between the chain 210 and the sprockets 210 and 214 of the derailleur 110 consists of a servomotor 310 communicatively coupled with a drive screw 312 using a spur gear reduction transmission 314, (hereinafter, "the transmission" 314), a drive nut 316 a servo control circuit 318, (hereinafter, "the microcontroller" 318), and a potentiometer 320 for electronically measuring the position of the drive nut 316 along the axis of the drive screw 312.

It is understood that the servomotor 310 may be or comprise a linear actuator, a brushless DC motor, a brush DC motor, a motor encoder, a driveshaft, a drive screw, a linear drive screw, a linear potentiometer and/or other suitable motor or actuator known in the art. As the servomotor 310 through transmission 314 changes the position of the drive nut 316 along the axis of the drive screw 312 the drive nut 316 applies tension or compression to the Bowden wire 216 attached to the drive nut 316 causing it to switch the connection between the chain 210 and the sprockets 210 and 214 of the derailleur 110. Furthermore, the position of the drive nut 316 for switching to each of the sprockets 210 and 214 is electrically measured by the potentiometer resistance values and saved into a shifter memory 321 of the microcontroller 318, a shown in FIG. 5. Thereafter, when the microcontroller 318 receives the instruction for changing the chain 210 coupling with the sprockets 210 or 214 from the shifter wireless communication circuit 208 the microcontroller 318 uses saved potentiometer values for directing servomotor 310 to move the drive nut 316 into a position corresponding to each of the sprockets 210 or 214 coupling with the chain 210.

The shifter 106 enclosure body consists of an assembly plates 322 and 324 and the molded rubber bumper 308 wherein the straps 304 are securely coupled with the shifter 106 body using the clamps 306 and a screws 326. Additionally, the shifter 106 receives electric power from a batteries 328 located behind a battery compartment plate 330 accessible through a battery compartment door 332 coupled with a O-ring 334, a positive contact plate 336 and secured with a screw 338.

Referring now generally to the Figures and particularly to FIG. 4A, FIG. 4A illustrates a first preferred embodiment of the remote control 108 of the first system 100 coupled with a handlebar 112 of the bicycle 104 using a handlebar mount 402 and a handlebar mount fastener 404. The remote control 108 contains a shift-up button 406 and a shift-down button 408 for initiating commands to change the connection between the chain 210 and the sprockets 210 and 214 of the derailleur 110, a low power light indicator 410 and a remote broadcast mode button 412 for initiating the wireless pairing process between the shifter 106 and the remote control 108. Optionally, the remote control 108 includes a gear configuration initiation button 416, a configuration test button 418, a configuration save button 420, a next sprocket selection button 422 and a configuration confirmation light 424 for optionally providing a configuration set point data to the shifter 106 wherein the configuration set point data is used for configuring the control of the connection between the chain 210 and the sprockets 210 and 214 of the derailleur 110.

Figure 4B:
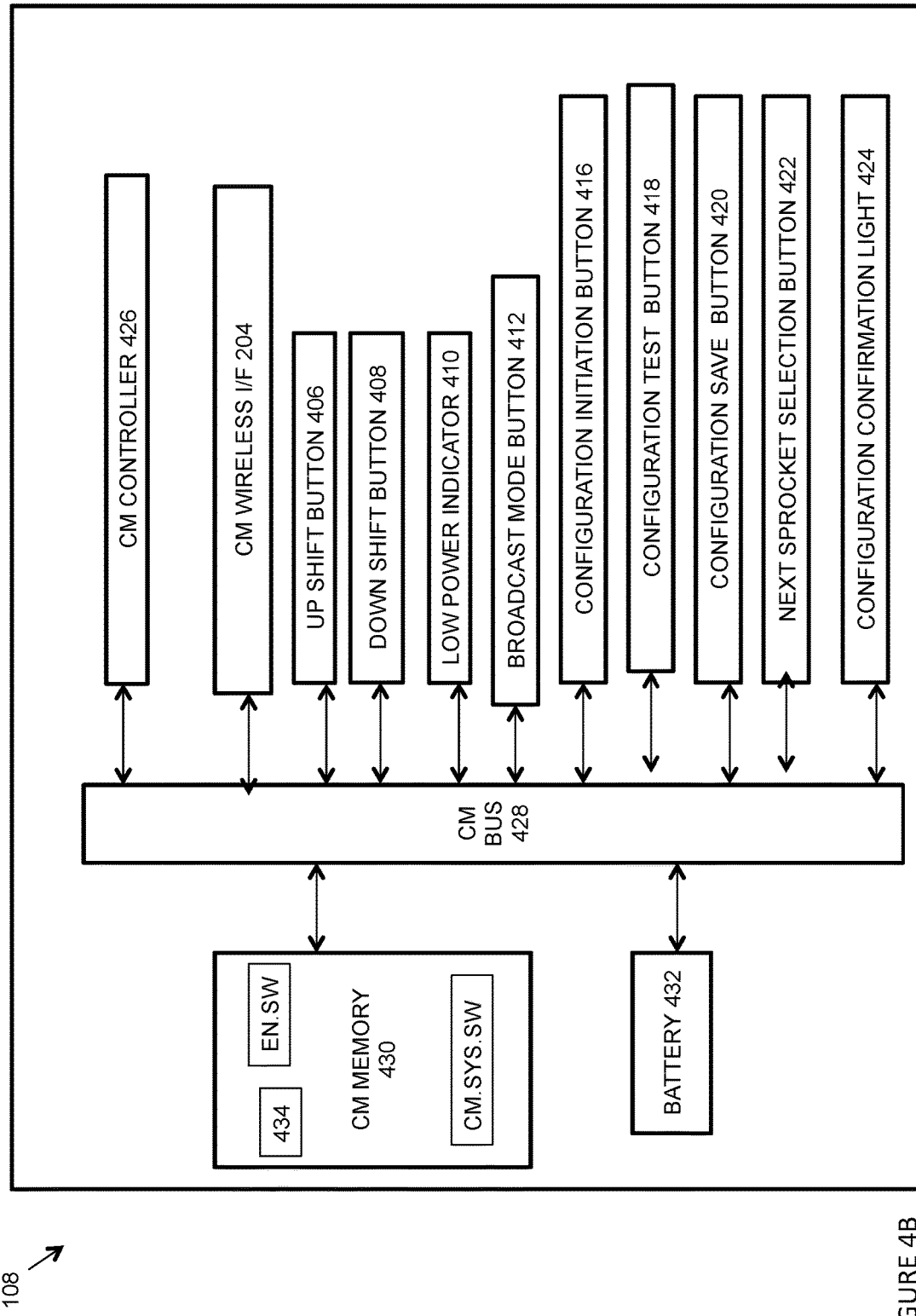
FIG. 4B is a block diagram of the control module of the first preferred embodiment of the invented system of FIG. 1.

Referring now generally to the Figures and particularly to FIG. 4B, FIG. 4B is a block diagram of the control module 108. A control module controller 426 is bi-directionally communicatively coupled by a control module power and communications bus 428 (hereinafter, "the CM bus" 428) with the control module elements 204 & 406-430. The CM bus 428 additionally distributes electrical power from the control module battery 432 to the control module elements 204 & 406-430. A control module memory 430 (hereinafter, "the CM memory" 430) stores a control module system software 434 (hereinafter "the CM software" 434). The CM software 434 includes software encoded instruction that enable the control module 108 to instantiate and perform all relevant tasks in the operation of the control module 108 as required or optionally directed by the invented method to include the method and the process steps of FIGS. 6 through 12 as disclosed herein. A copy of an encryption/decryption software EN.SW also maintained by the CM memory 430 enables the control module 108 to encrypt messages prior to transmission and decrypt messages after receipt as required or directed by the invented method to include the method and the process steps of FIGS. 6 through 12 as disclosed herein. For example, the encryption/decryption software EN.SW enables the control module 108 to selectively encrypt information transmitted in step 606 of FIG. 6, 706 of FIG. 7, and step 1210 of FIG. 12 prior to said transmissions.

Figure 5:
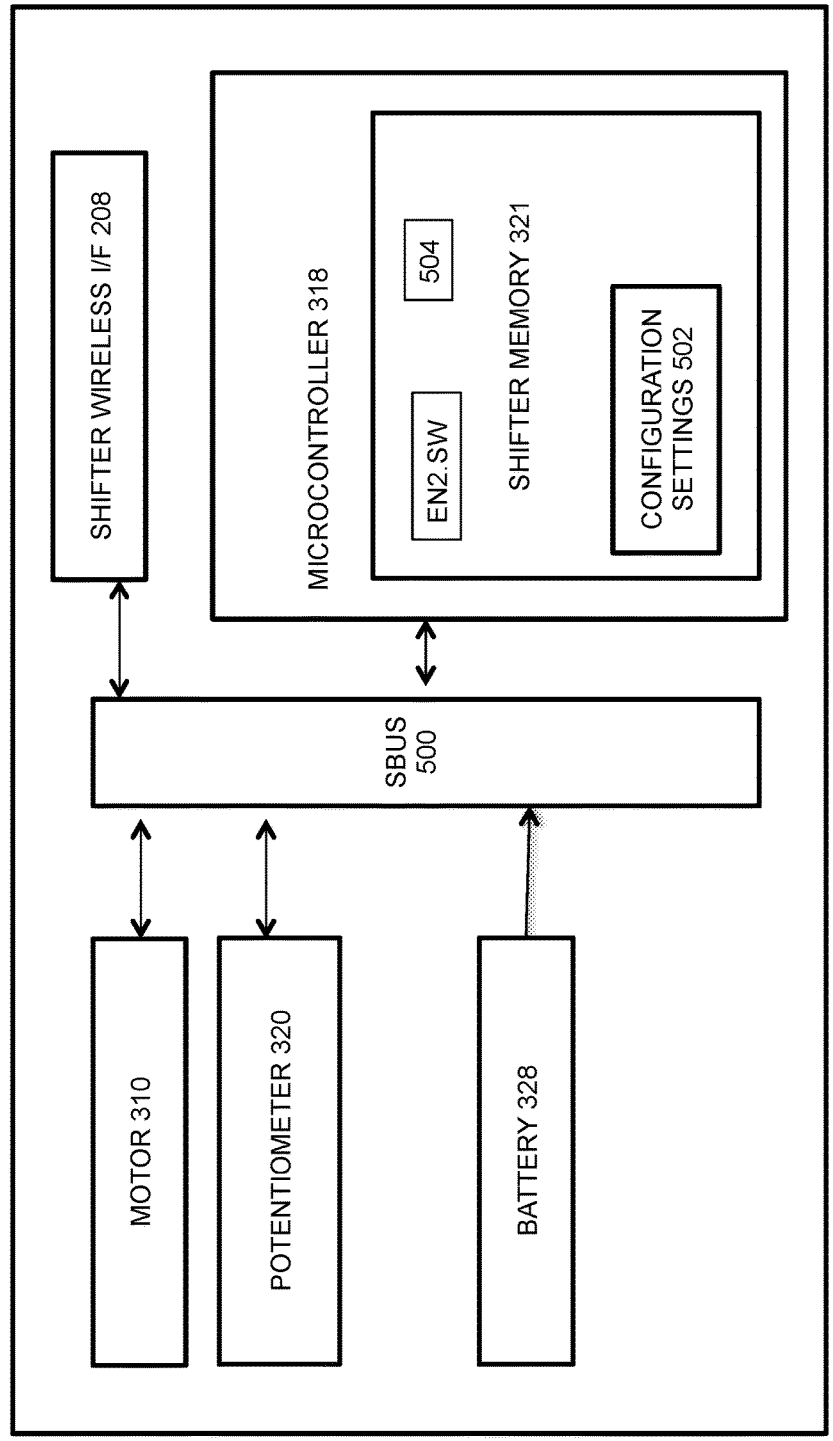
FIG. 5 is a block diagram of the shifter module of the first preferred embodiment of the invented system of FIG. 1.

Referring now generally to the Figures and particularly to FIG. 5, FIG. 5 is a block diagram of aspects of the shifter 106 and shows shifter power and control bus 500 (hereinafter "SBUS" 500) bi-directionally communicatively coupling the microcontroller 318 with the shifter wireless communications interface 208, the servomotor 310 and the potentiometer 320. The SBUS 500 additionally distributes electrical power from the shifter batteries 328 to certain other elements 208, 310-321 of the shifter 106. The shifter memory 321 stores a plurality of configuration set point data 502, a second copy of the encryption/decryption software EN2.SW and a shifter system software 504 (hereinafter "the S software" 504). The S software 504 includes software encoded instruction that enable the shifter 106 to instantiate and perform all relevant tasks in the operation of the shifter as required or optionally directed by the invented method and the process steps of FIGS. 6 through 12 as disclosed herein. The second copy of encryption/decryption software EN2.SW enables the shifter 106 to encrypt messages prior to transmission and decrypt messages after receipt as required or directed by the invented method to include the method and the process steps of FIGS. 6 through 12 as disclosed herein. For example, the second encryption/decryption software EN2.SW enables the shifter 106 to selectively decrypt encrypted information received in step 608 of FIG. 6, 708 of FIG. 7, step 814 of FIG. 8, 914 of FIG. 9, 1014 of FIG. 10, 1118 of FIG. 11, and step 1212 of FIG. 12 after receipt of transmissions.

Figure 6:
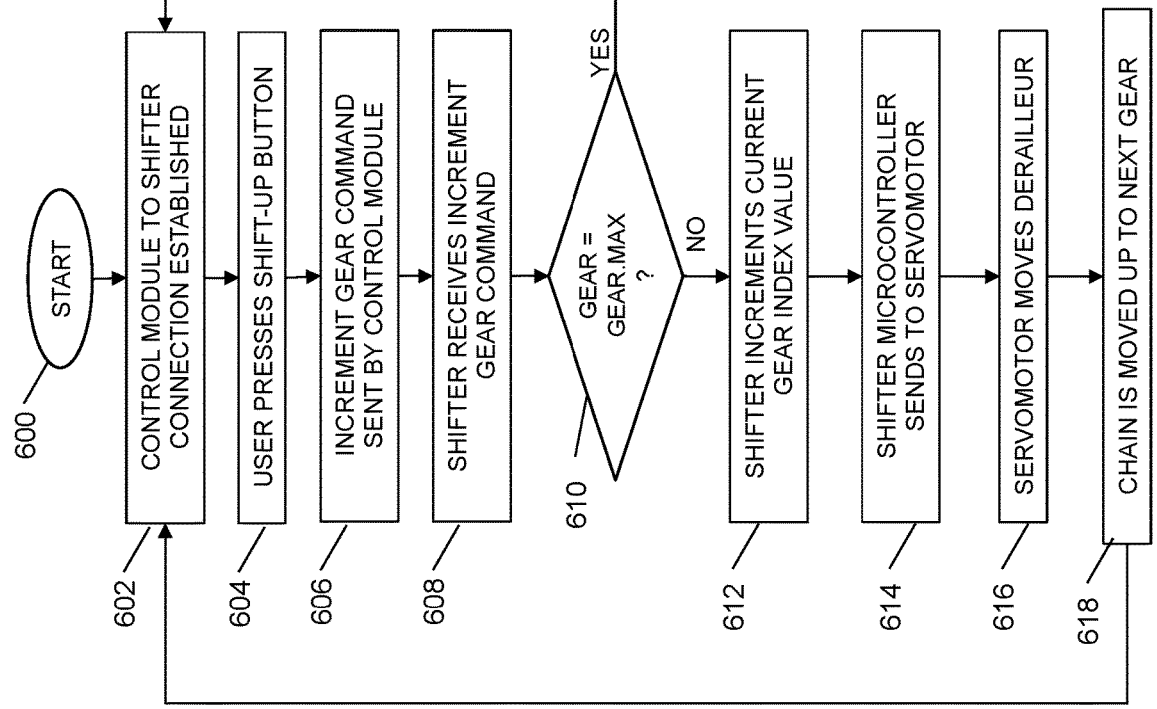
FIG. 6 is a flowchart of a method of shifting up the gears of the first preferred embodiment of the invented system of FIG. 1.

Referring now generally to the Figures and particularly to FIG. 6, FIG. 6 is a flowchart of operations of the first system 100 wherein the control module 108 is in communication with the shifter 106 and the control module 108 directs the actions of the shifter 106 to apply up shifting the derailleur 110. In step 600 the control module 108 is energized and in step 602 the control module establishes wireless communications connectivity with the shifter 106. In step 604 the control module 108 detects a user selection of the shift-up button 406 and in step 606 wirelessly transmits a gear up shift command to the shifter 106. The shifter 106 receives the wireless gear up shift command of step 606 in step 608.

The shifter 106 determines whether the chain 210 is currently engaged with the highest gear of the derailleur 110 in step 610, and if the shifter 106 determines that the chain 210 is not currently engaged with the highest gear of the derailleur 110, the shifter 106 proceeds on from step 610 to step 612 and then causes the chain 210 to move up to engage a next higher gear of the derailleur 110 in steps 612 through 618. In step 612 the shifter 106 increments a gear index value and provides the incremented gear index value to the servomotor 310 in step 614. The servomotor 310 causes the derailleur 110 to move to implement the instant gear up instruction and the chain 210 thereupon engages with a next higher gear in step 618. The first system 100 proceeds from step 618 and back to step 602.

In the alternative outcome to step 610, when the shifter 106 determines that the chain 210 is currently engaged with the highest gear of the derailleur 110, the shifter 106 proceeds back to step 602.

Figure 7:
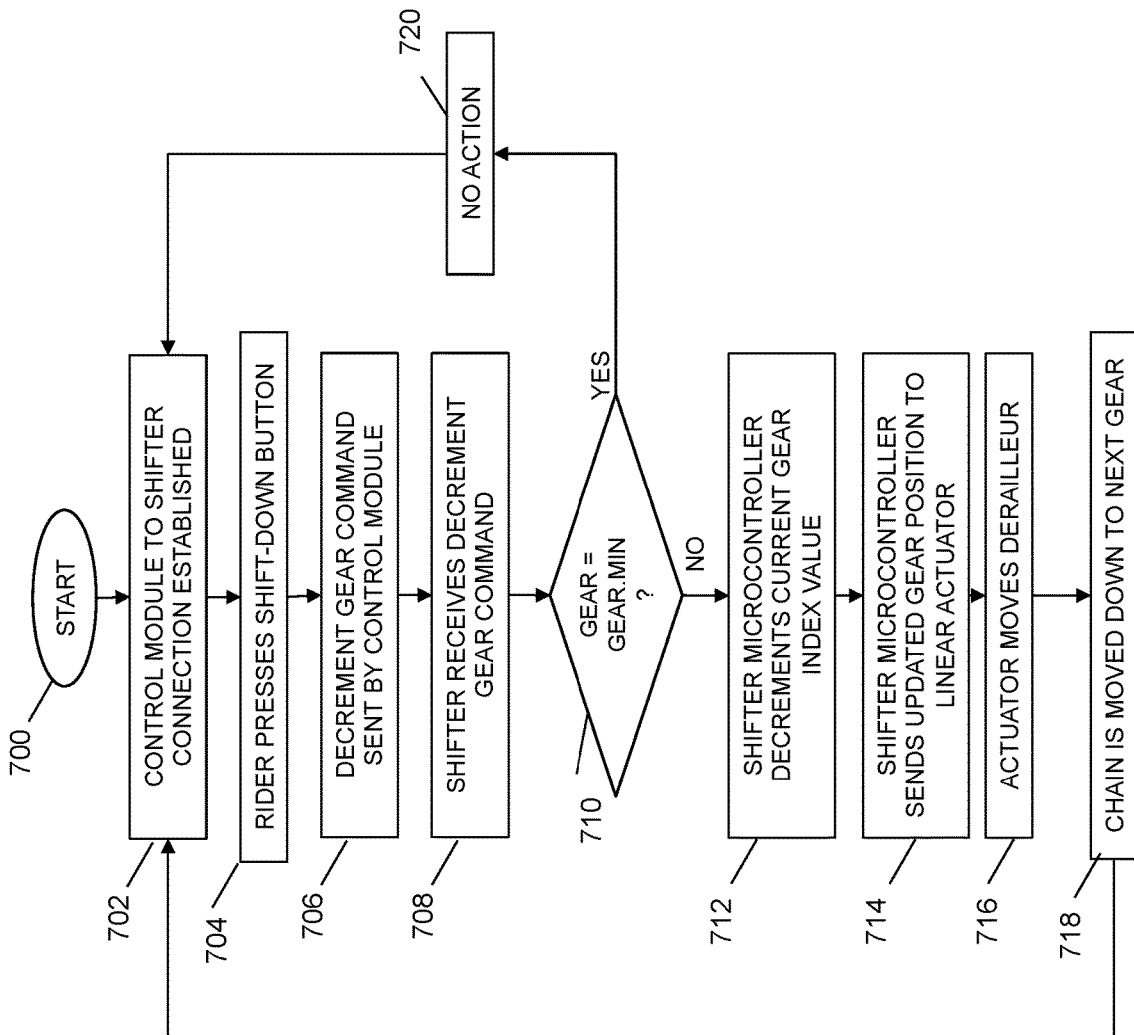
FIG. 7 is a flowchart of a method of shifting down the gears of the first preferred embodiment of the invented system of FIG. 1.

Referring now generally to the Figures and particularly to FIG. 7, FIG. 7 is a flowchart of operations of the first system 100 wherein the control module 108 is in communication with the shifter 106 and the control module 108 directs the actions of the shifter 106 to apply down shifting of the derailleur 110. In step 700 the control module 108 is energized and in step 702 the control module 108 establishes wireless communications connectivity with the shifter 106. In step 704 the control module 108 detects a user selection of the shift-down button 408 and in step 706 wirelessly transmits a gear down shift command to the shifter 106. The shifter 106 receives the wireless gear down shift message of step 706 in step 708.

The shifter 106 determines whether the chain 210 is currently engaged with the lowest gear of the derailleur 110 in step 610, and if the shifter 106 determines that the chain 210 is not currently engaged with the lowest gear of the derailleur 110, the shifter proceeds on from step 710 to step 712 and then causes the chain 210 to move down to engage a higher gear of the derailleur 110 in steps 712 through 718. In step 712 the shifter 106 decrements the gear index value and provides the decremented gear index value to the servomotor 310 in step 714. The servomotor 310 causes the derailleur 110 to move to implement the instant gear down instruction and the chain 210 thereupon engages with a next lower gear in step 718. The first system 100 proceeds from step 718 and back to step 702.

In the alternative outcome to step 710, when the shifter 106 determines that the chain 210 is currently engaged with the lowest gear of the derailleur 110, the shifter 106 proceeds back to step 702.

Figure 8:
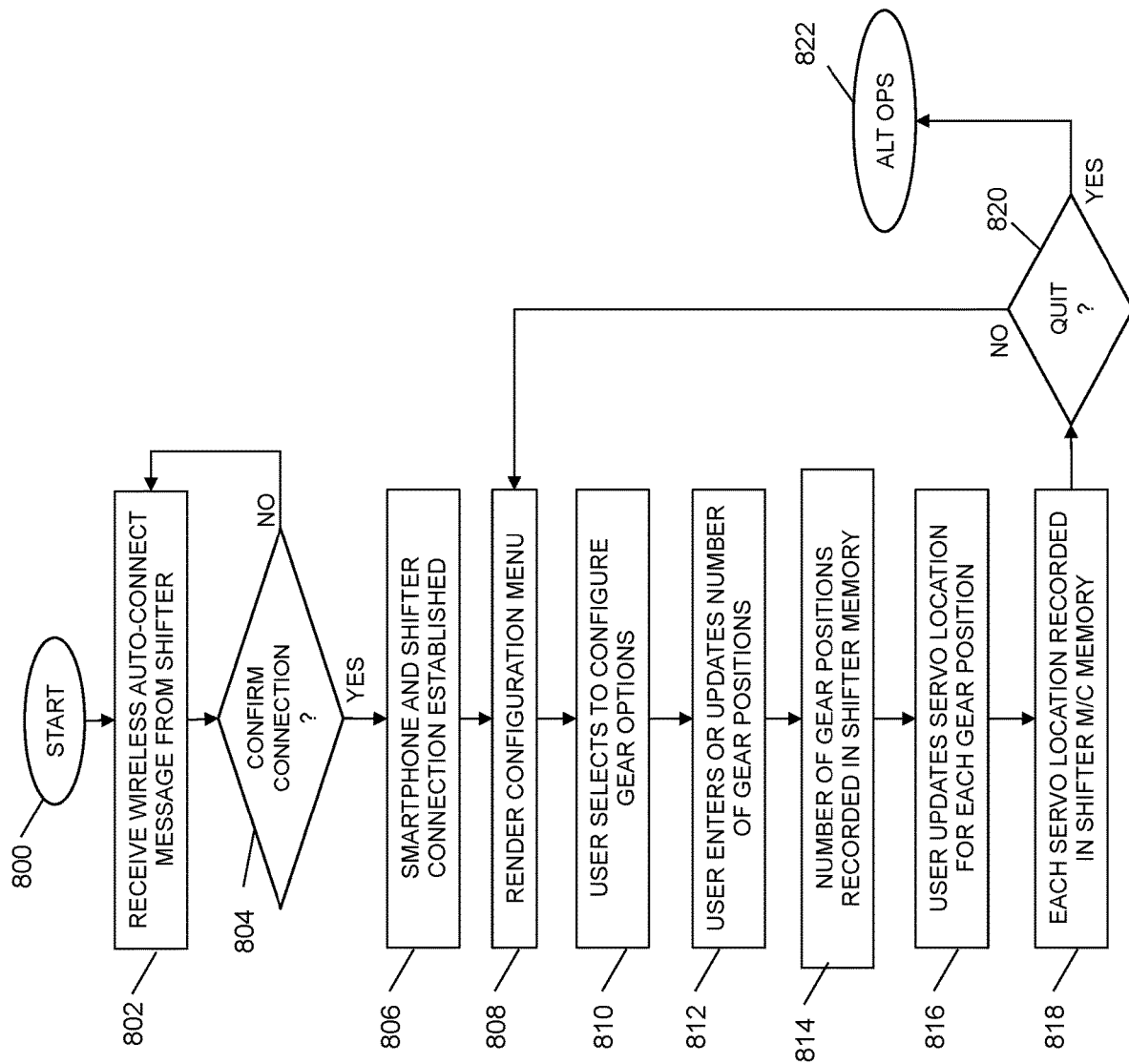
FIG. 8 is a flowchart of a method of applying the smartphone of the first preferred embodiment of the invented system of FIG. 2 to configure the servomotor of the shifter module of FIG. 1 in relation to the gears of the bicycle of FIG. 1.

Referring now generally to the Figures and particularly to FIG. 8, FIG. 8 is a flowchart of operations of the first system 100 wherein the optional smartphone 218 is in communication with the shifter 106 and whereby the user is enabled to configure gear options as would thereafter be applied by the shifter 106. In step 800 the smartphone 218 is energized and in step 802 the smartphone 218 is available to receive an automated wireless communications connectivity request from the shifter 106. In step 804 the smartphone 218 determines whether an automated wireless communications connectivity request has been received from the shifter 106 and proceeds back to step 802 when no such connectivity request message receipt is detected.

In the alternative, when the smartphone 218 determines in step 804 that a connectivity request message from the shifter 106 has been received, the first system 100 initiates a communications session between the smartphone 218 and the shifter 106 in step 806. The first system 100 proceeds from step 806 to perform an iteration of the loop of steps 808 through 820. In step 808 the smartphone 218 renders a configuration menu of gear options as informed by information received from the shifter 106. In step 810 the user optionally directs the smartphone 218 to enable a modification of gear option information optionally as received from the shifter 106. The user enters gear position updates and modifications into the smartphone 218 in step 812, and in step 814 the shifter 106 receives this gear position updates and modification information and stores the received gear position updates and modification information in the shifter memory 321.

The user further optionally enters servomotor location specifications for one or more individual gear positions into the smartphone 218 in step 816, and in step 818 the shifter 106 receives this servomotor location specification information and stores the received servomotor location specification information in the shifter memory 321. The user next directs the smartphone 218 in step 820 whether to proceed onto alternate computational operations in step 822, or in the alternative to proceed back to an additional execution of step 808.

Figure 9:
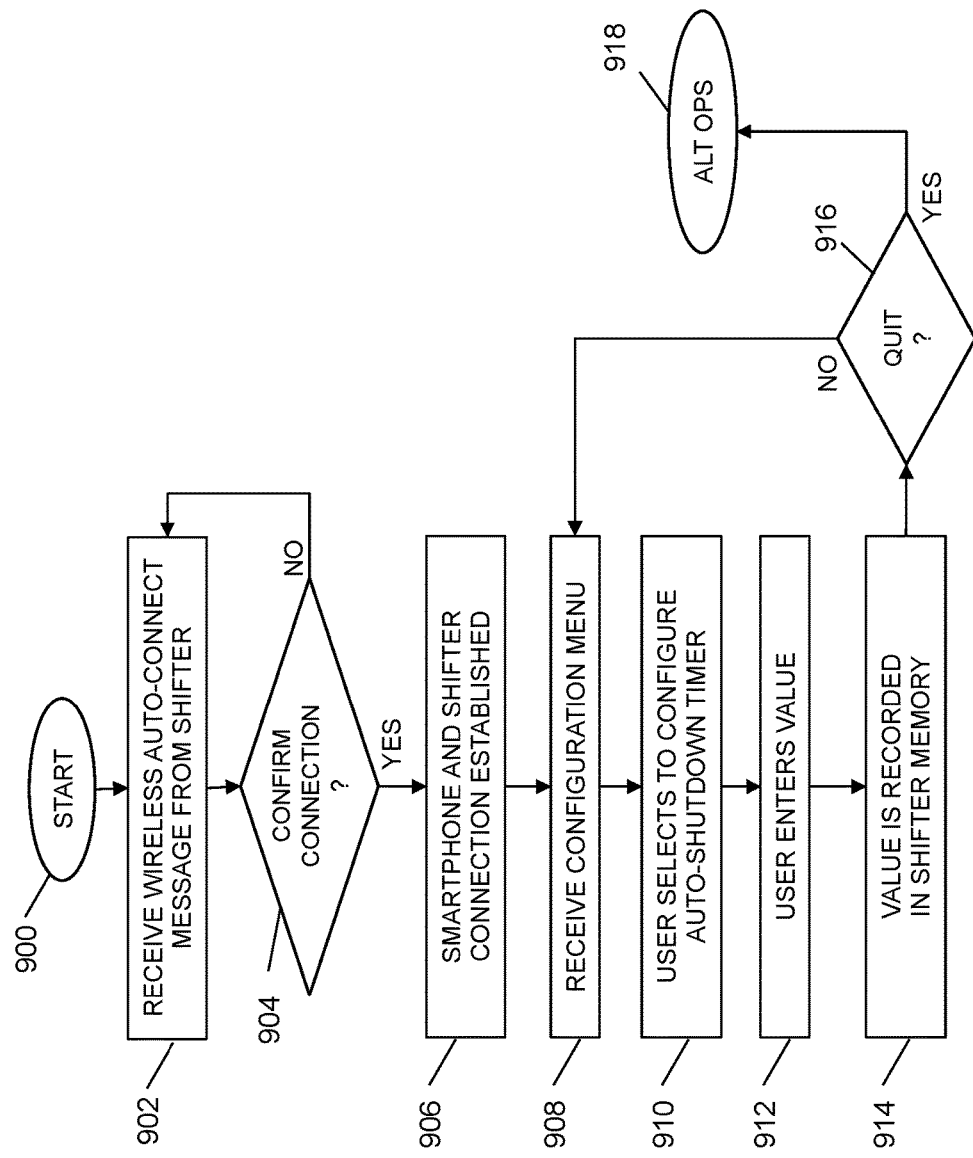
FIG. 9 is a flowchart of a method of applying the smartphone of the first preferred embodiment of the invented system of FIG. 2 to configure a shutdown timer of the shifter module of FIG. 1.

Referring now generally to the Figures and particularly to FIG. 9, FIG. 9 is a flowchart of operations of the first system 100 wherein the optional smartphone 218 is in communication with the shifter 106 and whereby the user is enabled configure an automatic shutdown timer function the of the shifter 106. In step 900 the smartphone 218 is energized and in step 902 the smartphone 218 is available to receive an automated wireless communications connectivity request from the shifter 106. In step 904 the smartphone 218 determines whether an automated wireless communications connectivity request has been received from the shifter 106 and proceeds back to step 902 when no such connectivity request message receipt is detected.

In the alternative, when the smartphone 218 determines in step 904 that a connectivity request message from the shifter 106 has been received, the first system 100 initiates a communications session between the smartphone 218 and the shifter 106 in step 906. The first system 100 proceeds from step 906 to perform an iteration of the loop of steps 908 through 916. In step 908 the smartphone 218 renders a configuration menu as informed by information received from the shifter 106. In step 910 the user optionally selects and initiates an automatic shutdown time value configuration utility of the smartphone system software M.SYS.SW. The smartphone 218 optionally in step 912 receives a user entered or user selected time value and communicates the user specified time value to the to the shifter 106. When received, the shifter 106 stores the time value as transmitted in step 912 and stores this time value in the shifter memory 321 as an automatic shut down time value in step 916.

The user next directs the smartphone 218 in step 916 whether to proceed onto alternate computational operations in step 918, or in the alternative to proceed back to an additional execution of step 908.

Figure 10:
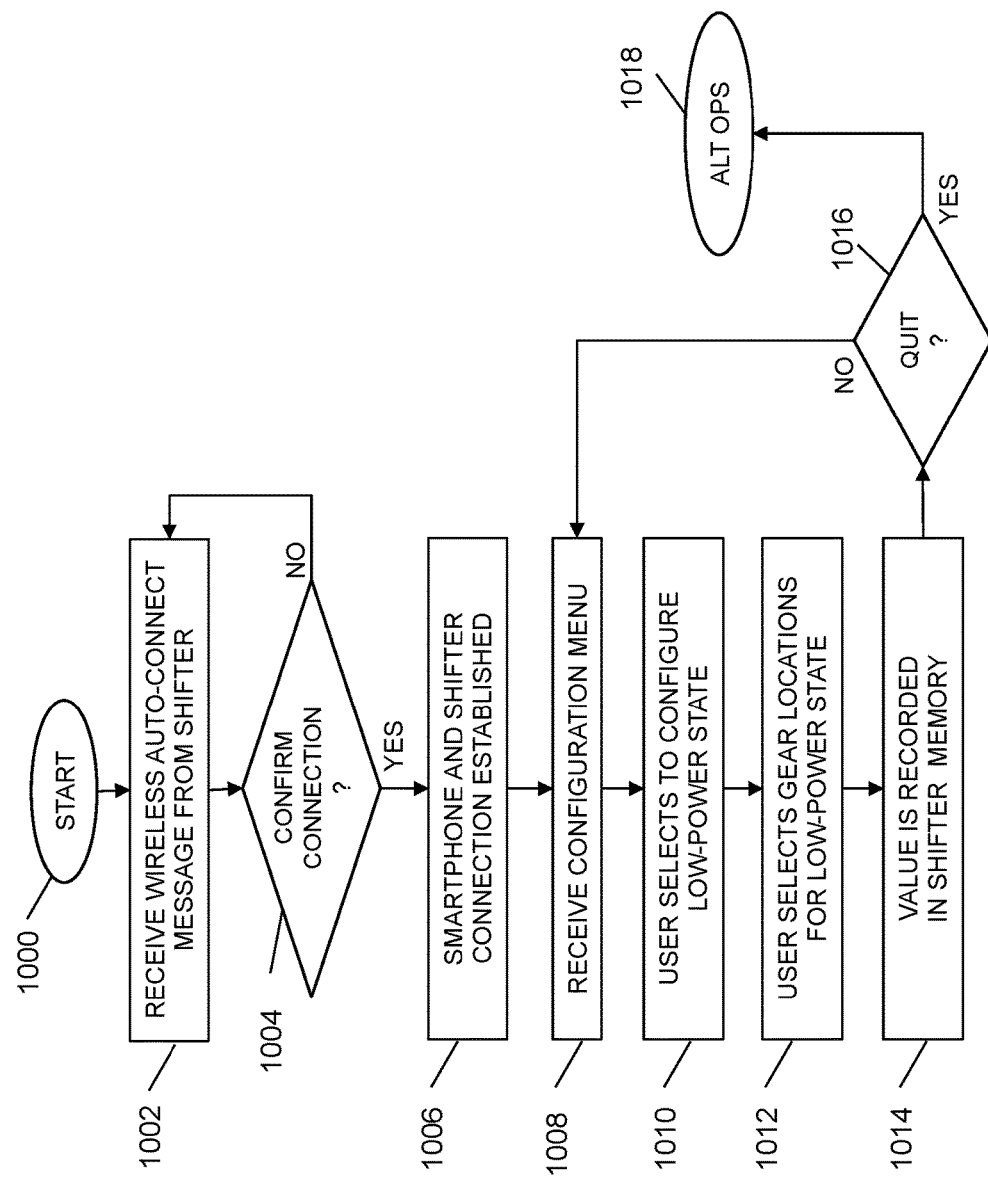
FIG. 10 is a flowchart of a method of applying the smartphone of the first preferred embodiment of the invented system of FIG. 2 to configure low-power state of the shifter module of FIG. 1.

Referring now generally to the Figures and particularly to FIG. 10, FIG. 10 is a flowchart of operations of the first system 100 wherein the optional smartphone 218 is in communication with the shifter 106 whereby the user is enabled configure a low power state of the shifter 106. In step 1000 the smartphone 218 is energized and in step 1002 the smartphone 218 is available to receive an automated wireless communications connectivity request from the shifter 106. In step 1004 the smartphone 218 determines whether an automated wireless communications connectivity request has been received from the shifter 106 and proceeds back to step 1002 when no such connectivity request message receipt is detected.

In the alternative, when the smartphone 218 determines in step 1004 that a connectivity request message from the shifter 106 has been received, the first system 100 initiates a communications session between the smartphone 218 and the shifter 106 in step 1006. The first system 100 proceeds from step 1006 to perform an iteration of the loop of steps 1008 through 1016. In step 1008 the smartphone 218 renders a configuration menu as informed by information received from the shifter 106. In step 1010 the user optionally selects and initiates a low power configuration utility of the smartphone system software M.SYS.SW. The smartphone 218 optionally in step 1012 receives a user entered or user selected low power gear location specifications intended to define a low power state of the shifter 106, and thereupon transmits the low power gear location specifications to the to the shifter 106. When received, the shifter 106 stores the low power gear location specifications as transmitted in step 1012 and stores these specifications in the shifter memory 321 in step 1014.

The user next directs the smartphone 218 in step 1016 whether to proceed onto alternate computational operations in step 1018, or in the alternative to proceed back to an additional execution of step 1008.

Figure 11:
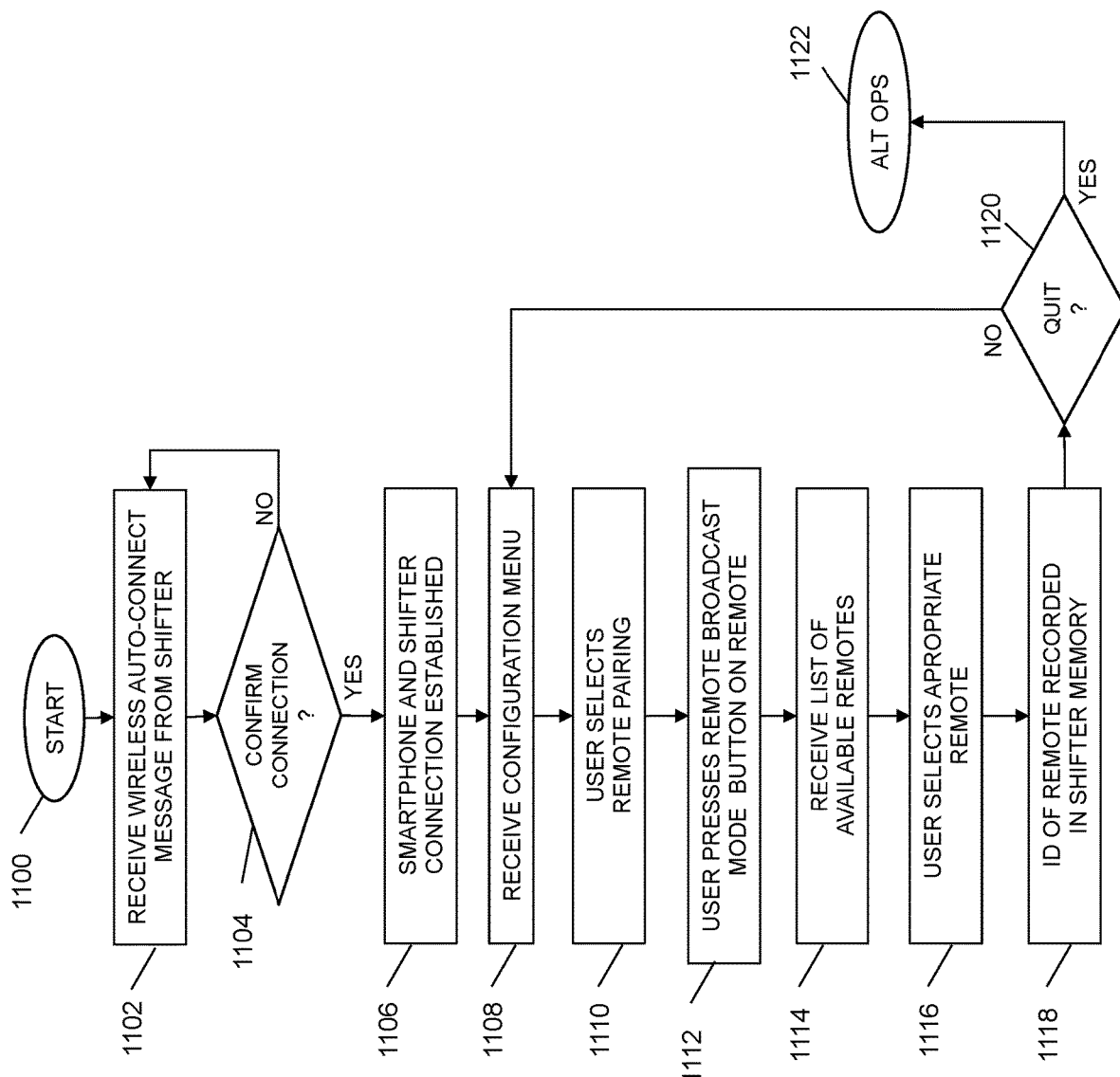
FIG. 11 is a flowchart of a method of applying the smartphone of the first preferred embodiment of the invented system of FIG. 2 to configure a pairing of the shifter module of FIG. 1 in relation to the gears of the bicycle of FIG. 1.

Referring now generally to the Figures and particularly to FIG. 11, FIG. 11 is a flowchart of operations of the first system 110 wherein the optional smartphone 218 is in communication with the shifter 106 whereby the user is enabled to perform a wireless communications pairing of the shifter 106 and an additional remote communications device (not shown). In step 1100 the smartphone 218 is energized and in step 1102 the smartphone 218 is available to receive an automated wireless communications connectivity request from the shifter 106. In step 1104 the smartphone 218 determines whether an automated wireless communications connectivity request has been received from the shifter 106 and proceeds back to step 1102 when no such connectivity request message receipt is detected.

In the alternative, when the smartphone 218 determines in step 1104 that a connectivity request message from the shifter 106 has been received, the first system 110 initiates a communications session between the smartphone 218 and the shifter 106 in step 1106. The first system 110 proceeds from step 1106 to perform an iteration of the loop of steps 1108 through 1120. In step 1108 the smartphone 218 renders a configuration menu as informed by information received from the shifter 106. In step 1110 the user optionally selects and initiates a remote pairing configuration utility of the smartphone system software M.SYS.SW. The smartphone 218 optionally in step 1112 receives a user selection of a remote broadcast mode and in step 1114 renders a listing of device identifiers of possible devices for selection by the use for communications pairing with the shifter 106.

The smartphone 218 optionally in step 1116 receives a user selection of a remote device identifier as rendered in step 1114 and a device identifier, e.g., universally unique identifier, known in the art as a UUID, associated with the selected remote device identifier as a network address, i.e. a or unique identifier is transmitted from the smartphone 218 to the shifter 106. The shifter 106 in step 1118 stores the device identifier received from the smartphone 218 in the shifter memory 321.

The user next directs the smartphone 218 in step 1120 whether to proceed onto alternate computational operations in step 1124, or in the alternative to proceed back to an additional execution of step 1108.

Figure 12:
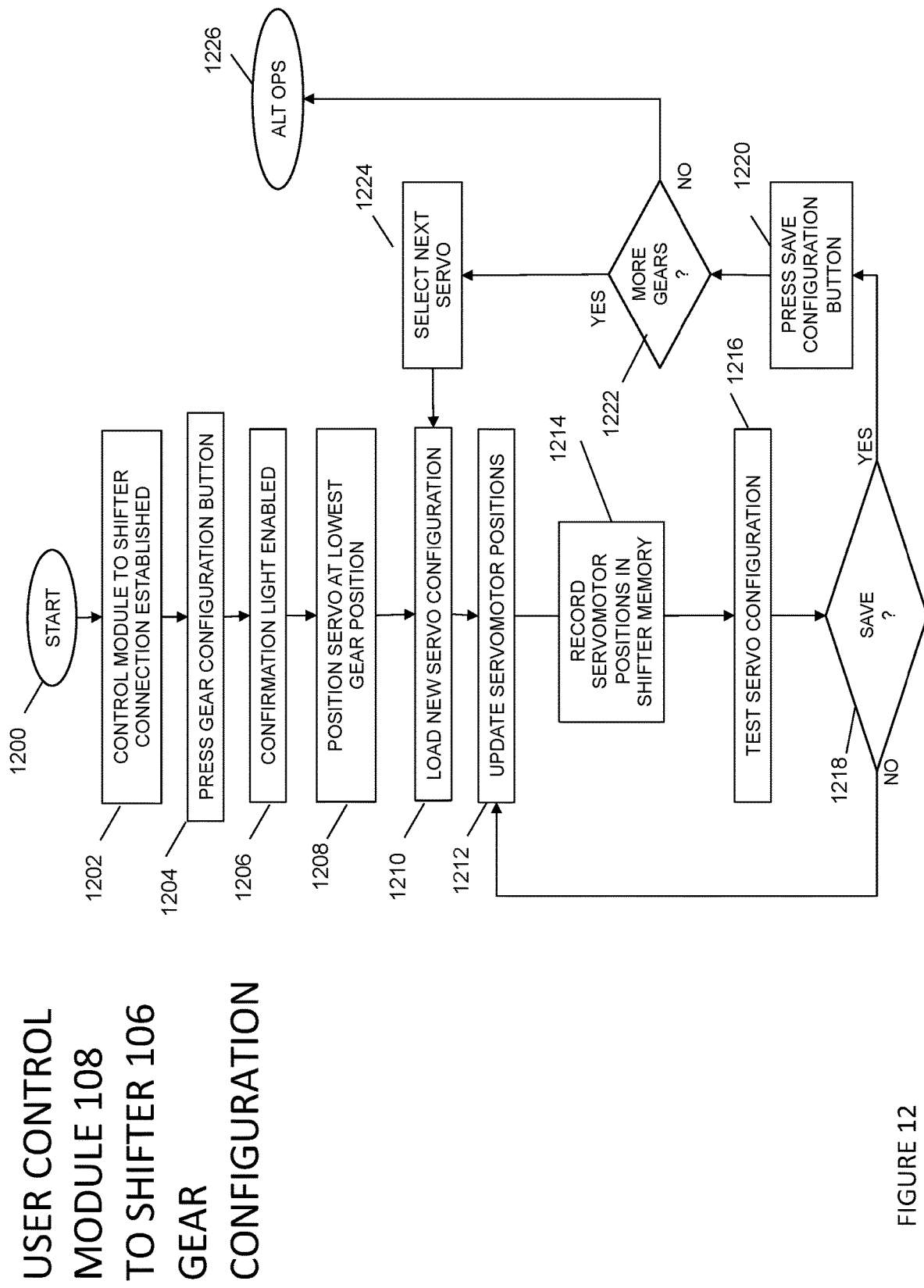
FIG. 12 is a flowchart of a method of applying the control module of the first preferred embodiment of the invented system of FIG. 1 to configure servomotor positions of the shifter module of FIG. 1 in relation to the gears of the bicycle of FIG. 1.

Referring now generally to the Figures and particularly to FIG. 12, FIG. 12 is a flowchart of operations of the first system 120 wherein the control module 108 is in communication with the shifter 106 and whereby the user is enabled to perform a configuration of the servomotor set points of the shifter 106 relative to one or more gears of the derailleur 110. These servomotor settings of the shifter 106 will be implemented upon receipt by the shifter of user gear selection commands as entered via the control module 108 by the user in later operation of the bicycle 104. In step 1200 the control module 108 is energized and in step 1202 the first system 120 initiates a communications session between the control module 108 and the shifter 106 in step 1202. The first system 120 proceeds from step 1206 wherein the user may optionally selects and initiates a servomotor configuration utility of the control module 108 CM.SYS.SW by pressing the gear configuration button 416 of the control module 106. The control module 108 optionally in step 1206 illuminates the user module confirmation light 424 to assure and inform the user that the servomotor configuration utility of the control module 108 CM.SYS.SW is activated. In step 1208 the servomotor 310 is positioned at the lowest gear selection position and in step 1210 the user enters a new servomotor configuration set point data into the control module 106 and the user control module 106 transmits this newly received servomotor configuration set point data to the shifter 106.

The shifter 106 updates the servomotor position settings as stored in the shifter memory 321 with the newly received servomotor configuration set point data in step 1214. The user may optionally test, by operation of the invented system 100, the effect of application by the shifter 106 of the newly received servomotor configuration set point data in gear shifting of the derailleur 110 in step 1216. The user directs the shifter in step 1218 to either proceed onto save the newly received servomotor configuration set point data for continued application by pressing the save gear configuration button 420 of the control module 108. When the control module 108 does not detect a selection of the save gear configuration button in step 1218, the invented system 100 proceeds back to another execution of step 1212.

In the alternative, when the control module 108 does not detect a selection of the save gear configuration button in step 1218, the control module 108 directs the shifter 106 in step 1220 to save the new configuration set point data in the shifter memory 321 for continued in application in operation of the shifter 106. In step 1222 the first system 100 determines via inputs to the user module 108 if the user has directed the control module 108 to receive additional servomotor configuration set point data.

When the first system 100 determines in step 1222 that the user has directed the control module 108 to receive additional servomotor configuration set point data, the first system 100 proceeds onto step 1224 and receives an additional gear selection by the user via the control module 108.

The first system 100 proceeds from step 1224 to an additional execution of step 1210.

When the first system 100 determines in step 1222 that the user has not directed the control module 108 to receive additional servomotor configuration set point data, the first system 100 proceeds onto alternate operations of step 1226.

Figure 13:
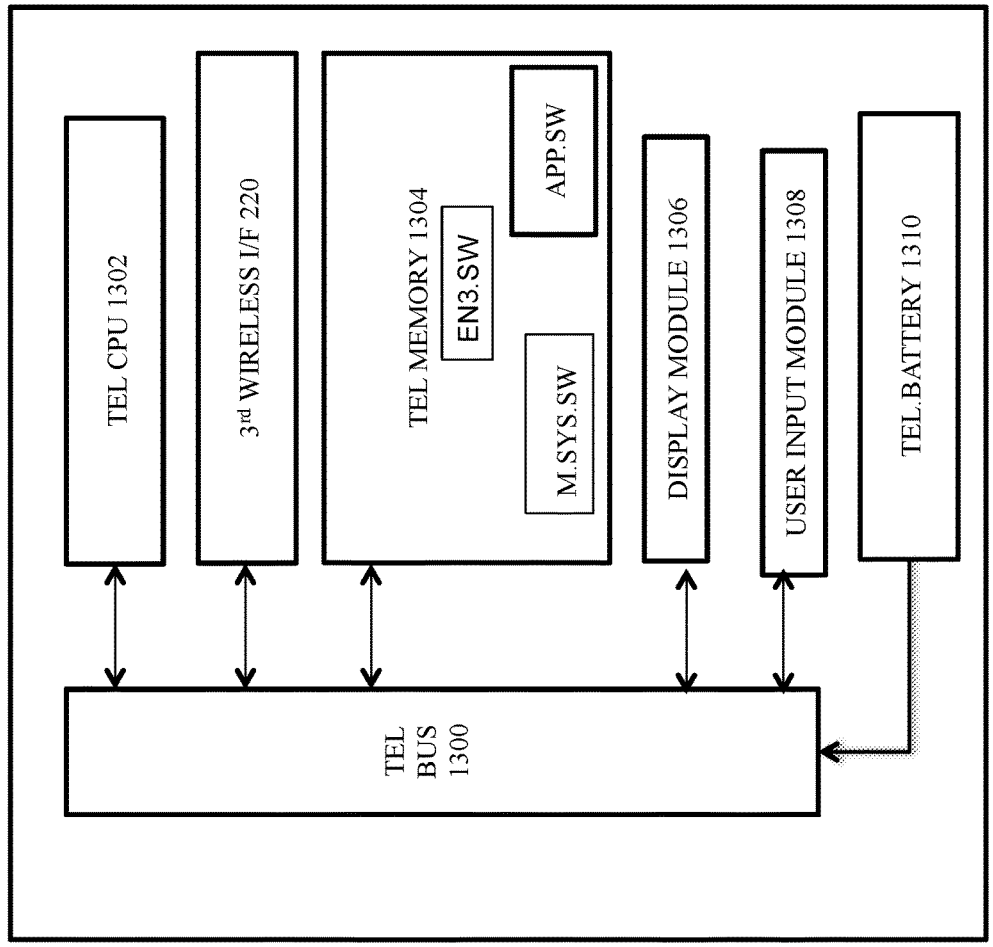
FIG. 13 is a block diagram of the smartphone of the first preferred embodiment of the invented system of FIG. 2.

Referring now generally to the Figures and particularly to FIG. 13, FIG. 13 is a block diagram of aspects of the smartphone 218 and shows a telephone communications and power bus 1300 (hereinafter "TEL BUS" 1300) bi-directionally communicatively coupling a telephone CPU 1302 with the third wireless communications interface 220, a telephone memory 1304, a visual display module 1306, and a user input module 1308. The TEL BUS 1300 additionally distributes electrical power from a telephone battery 1310 to certain other elements 220 & 1300-1308 of the shifter 106. The telephone memory 1304 stores third copy of an encryption/decryption software EN2.SW and an applications software APP.SW. The applications software APP.SW includes software encoded instruction that enable the smartphone 218 to instantiate and perform all relevant tasks in the operation of the shifter as required or optionally directed by the invented method and the process steps of FIGS. 6 through 12 as disclosed herein. The third copy of encryption/decryption software EN3.SW enables the smartphone 218 to encrypt messages prior to transmission and decrypt messages after receipt as required or directed by the invented method to include the method and the process steps of FIGS. 6 through 12 as disclosed herein. For example, the third copy of then encryption/decryption software EN3.SW enables the control module 108 to selectively encrypt information transmitted in step 812 of FIG. 8, 912 of FIG. 9, step 1012 of FIG. 10, and step 1116 of FIG. 11 prior to said transmissions.

Figure 14:
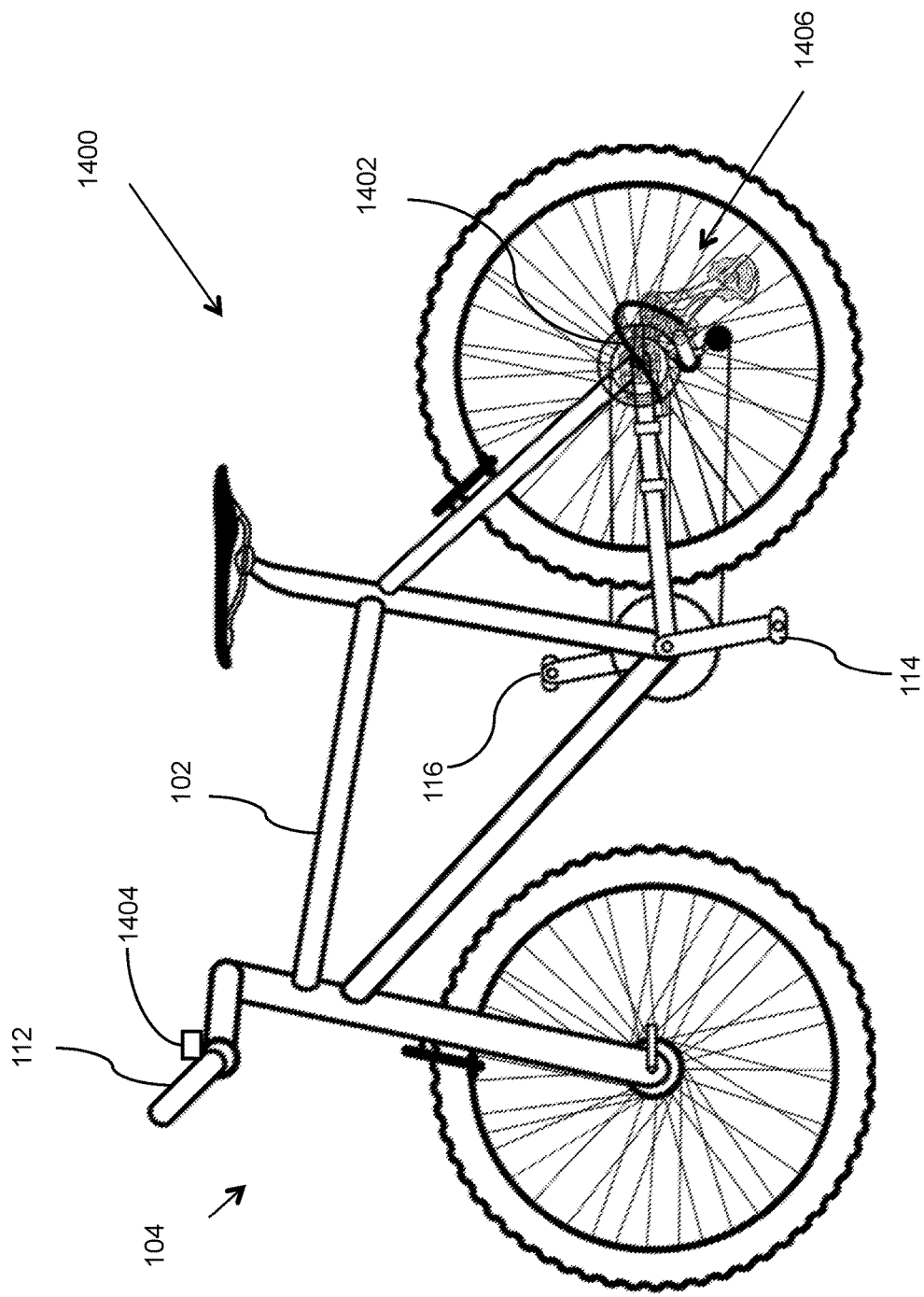
FIG. 14 is an illustration of a second preferred embodiment of the invented system having an alternate second invented control module and an invented derailleur installed on the bicycle of FIG. 1.

Referring now generally to the Figures and particularly to FIG. 14, FIG. 14 illustrates a second preferred embodiment of the invented system 1400, (hereinafter, "the invented gearshift system" 1400) coupled with the frame 102 of the bicycle 104. The invented gearshift system 1400 includes an invented derailleur module 1402 (hereinafter, "the derailleur" 1402) and a second control module 1404 (hereinafter, "the second control module" 1404). The derailleur 1402 is coupled with the frame 102 of the bicycle 104 and a plurality of sprockets 1406 and the second control module 1404 is coupled with a handlebar 112 of the bicycle 104. The plurality of sprockets 1406 include the sprockets 212 & 214.

One or more elements of the derailleur 1402 may consist of or comprise metal, a metal alloy, aluminum, machined aluminum, plastic, molded plastic, injection molded plastic, or other suitable material known in the art in singularity or in combination.

Figure 15A:
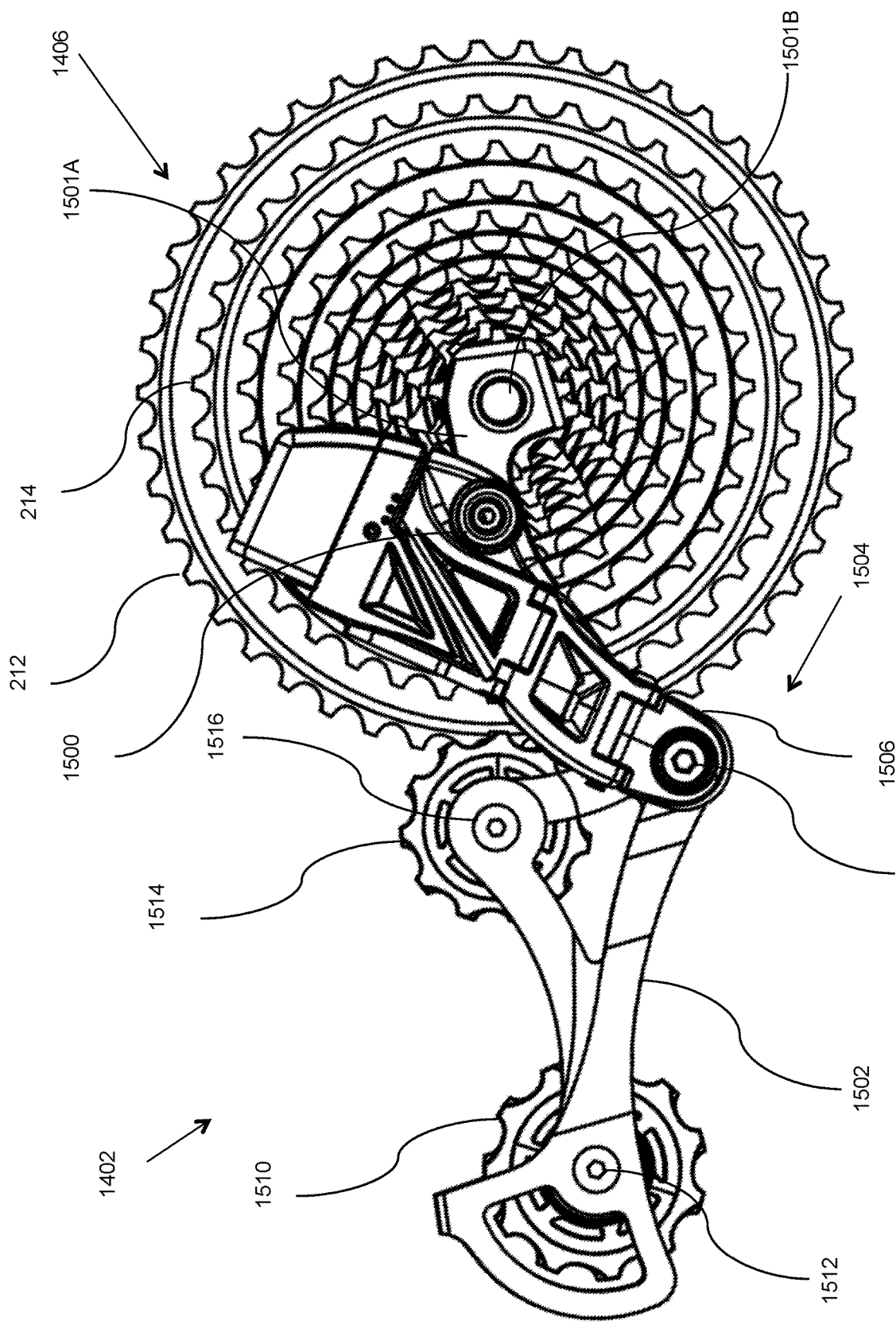
FIG. 15A is a side view of the derailleur of FIG. 14 while coupled with the bicycle frame of FIG. 1.

Referring now generally to the Figures and particularly to FIG. 15A, FIG. 15A is a side view of the derailleur 1402 while coupled with the bicycle frame 102 by a detachable dropout bolt 1500 that extends through a connecting plate 1501 of the bicycle 104. The connecting plate 1501A is rigidly and optionally detachably coupled with the bicycle 104 at the central rotational axis of the plurality of sprockets 1406 by a bolt 1501B.

The derailleur 1402 includes a cage plate 1502 and a damping element assembly 1504 that are rotatably coupled. The damping element assembly 1504 includes a damping element body 1506 and a damping element bolt 1508 as further discussed herein and particularly in reference to FIG. 18. The cage plate 1502 is rotatably connected to a tension pulley 1510 by a tension pulley bolt 1512, wherein the tension pulley bolt 1512 extends through both the cage plate 1502 and the tension pulley 1510 and permits the tension pulley 1510 to rotate.

The cage plate 1502 is additionally rotatably connected to a guide pulley 1514 by a guide pulley bolt 1516, wherein the guide pulley bolt 1516 extends through both the cage plate 1502 and the guide pulley 1514 and permits the guide pulley 1514 to rotate.

Figure 15B:
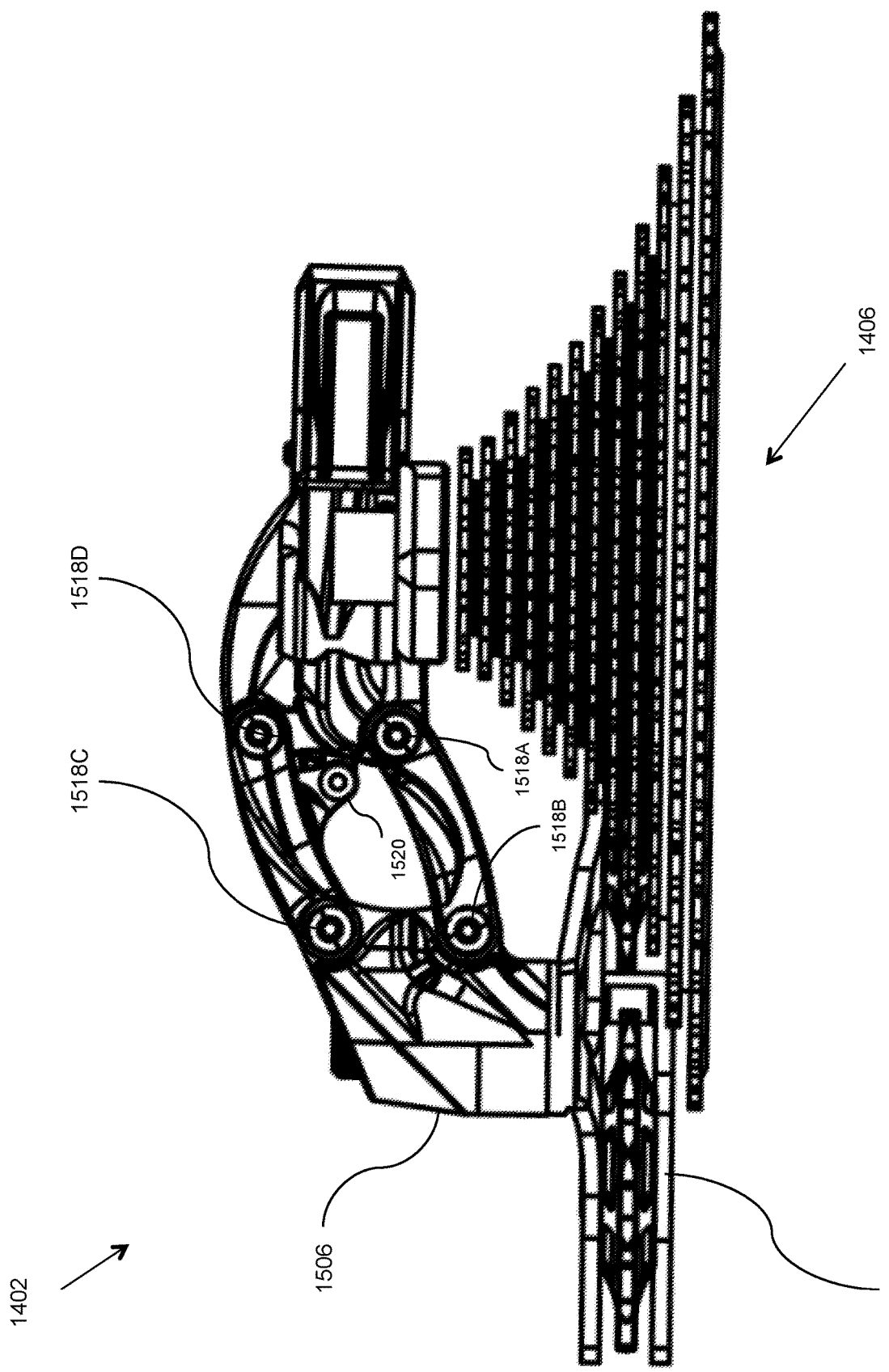
FIG. 15B is a top view of the derailleur of FIG. 14 while coupled with the bicycle frame of FIG. 1.

Referring now generally to the Figures and particularly to FIG. 15B, FIG. 15B is a top view of the derailleur 1402. A plurality of four bracket bolts 1518A-1518D of the derailleur 1402 each define separate and preferably parallel axes of rotation within the derailleur 1402. An actuator arm bolt 1520 of the derailleur 1402 extends along a fifth axis of rotation within the derailleur 1402, wherein the fifth axis of rotation is preferably parallel to the axes of rotation of the bracket bolts 1518A-1518D.

Figure 16A:
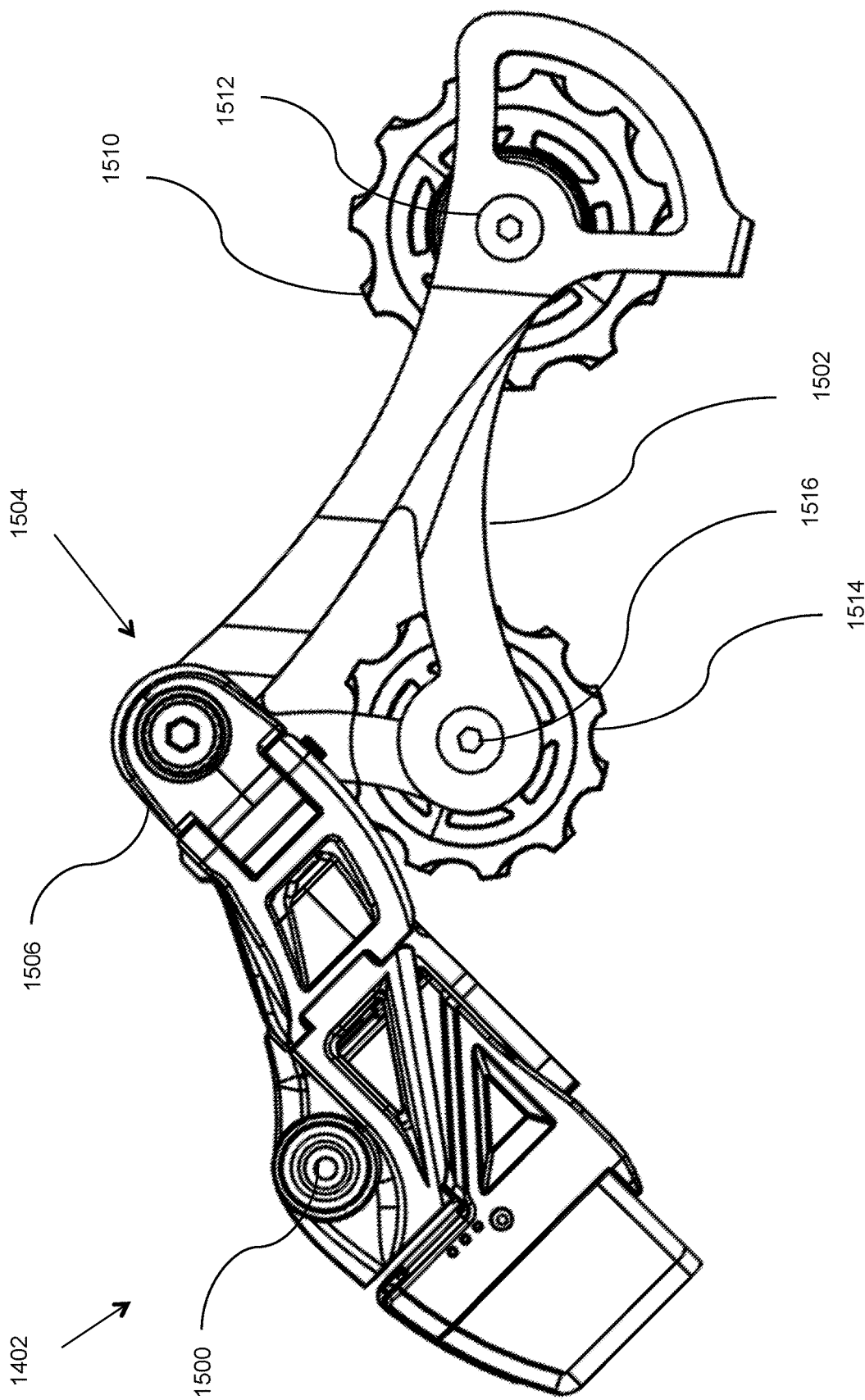
FIG. 16A is a side view the derailleur of FIG. 14 with a dropout bolt of FIG. 15A shown in isolation from the bicycle of FIG. 1.

Referring now generally to the Figures and particularly to FIG. 16A, FIG. 16A is a side view the derailleur 1402 with the dropout bolt 1500 and shown in isolation from both the bicycle 104 and from the second control module 1404 of the invented gearshift system 1400. As discussed in reference to FIG. 15A, the derailleur 1402 includes the cage plate 1502 and the damping element assembly 1504 that are rotatably coupled. The cage plate 1502 is rotatably connected to the tension pulley 1510 by the tension pulley bolt 1512, wherein the tension pulley bolt 1512 extends through both the cage plate 1502 and the tension pulley 1510 and permits the tension pulley 1510 to rotate.

The cage plate 1502 is additionally rotatably connected to the guide pulley 1514 by the guide pulley bolt 1516, wherein the guide pulley bolt 1516 extends through both the cage plate 1502 and the guide pulley 1514 and permits the guide pulley 1514 to rotate.

Figure 16B:
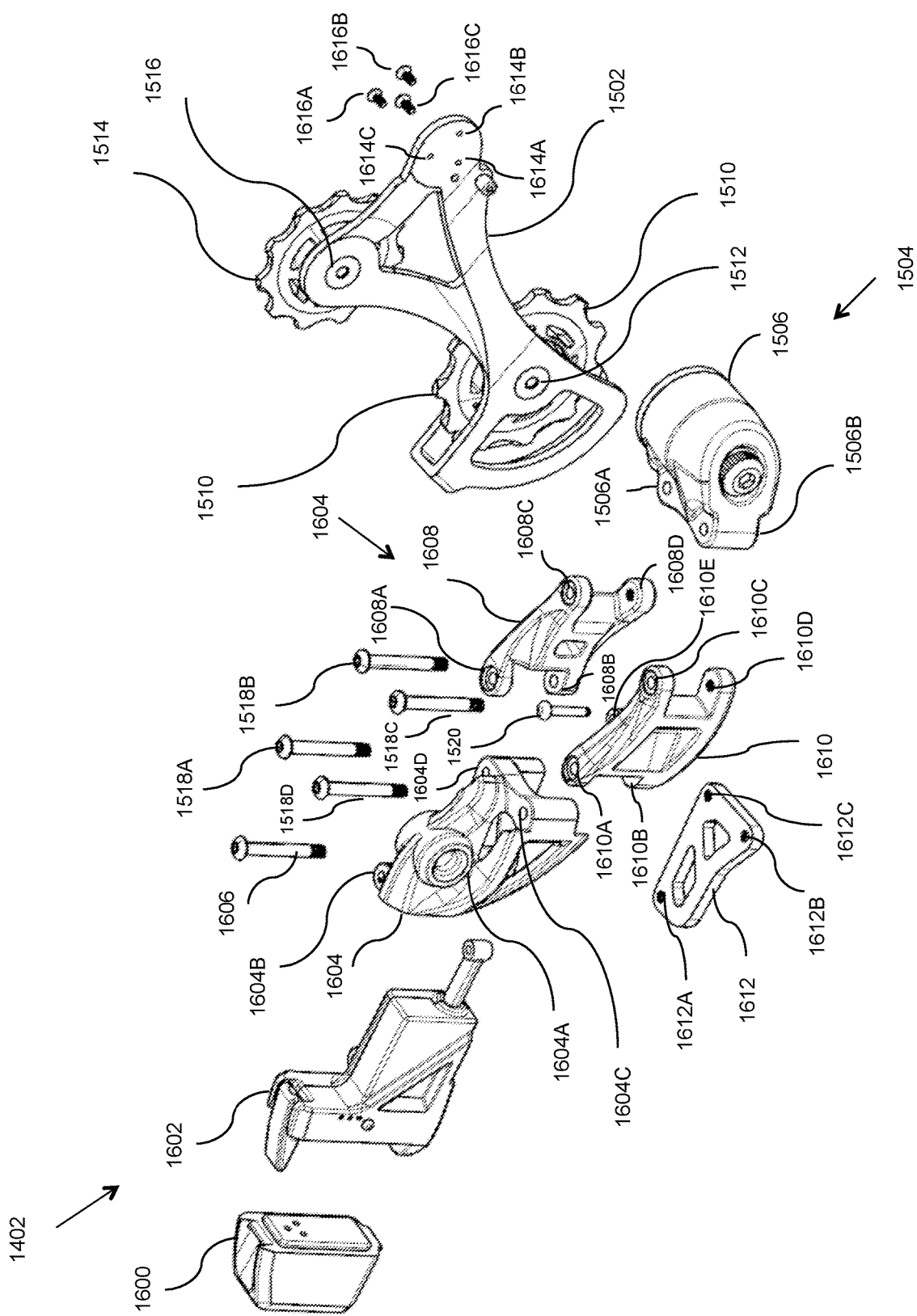
FIG. 16B is an exploded view the derailleur of FIG. 14.

Referring now generally to the Figures and particularly to FIG. 16B, FIG. 16B is an exploded view the derailleur 1402 shown in isolation from both the bicycle 104 and from the second control module 1402 of the invented gearshift system 1400. A detachably attachable battery module 1600 is shown separated from a linear actuator 1602. A device frame 1604 includes a drop out bolt aperture 1604A shaped and sized to allow the dropout bolt 1500 to extend fully trough the device frame 1604. A tapped b-tension screw receiver 1604B is adapted to accept a prior art threaded b-tension screw (not shown) for further attachment of device frame 1604 to the bicycle frame 102. A first frame receiver 1604C is adapted to accept a traversal of the fourth bracket bolt 1518D fully therethrough. A second frame receiver 1604D is adapted to accept a traversal of the first bracket bolt 1518A fully therethrough.

Figure 16C:
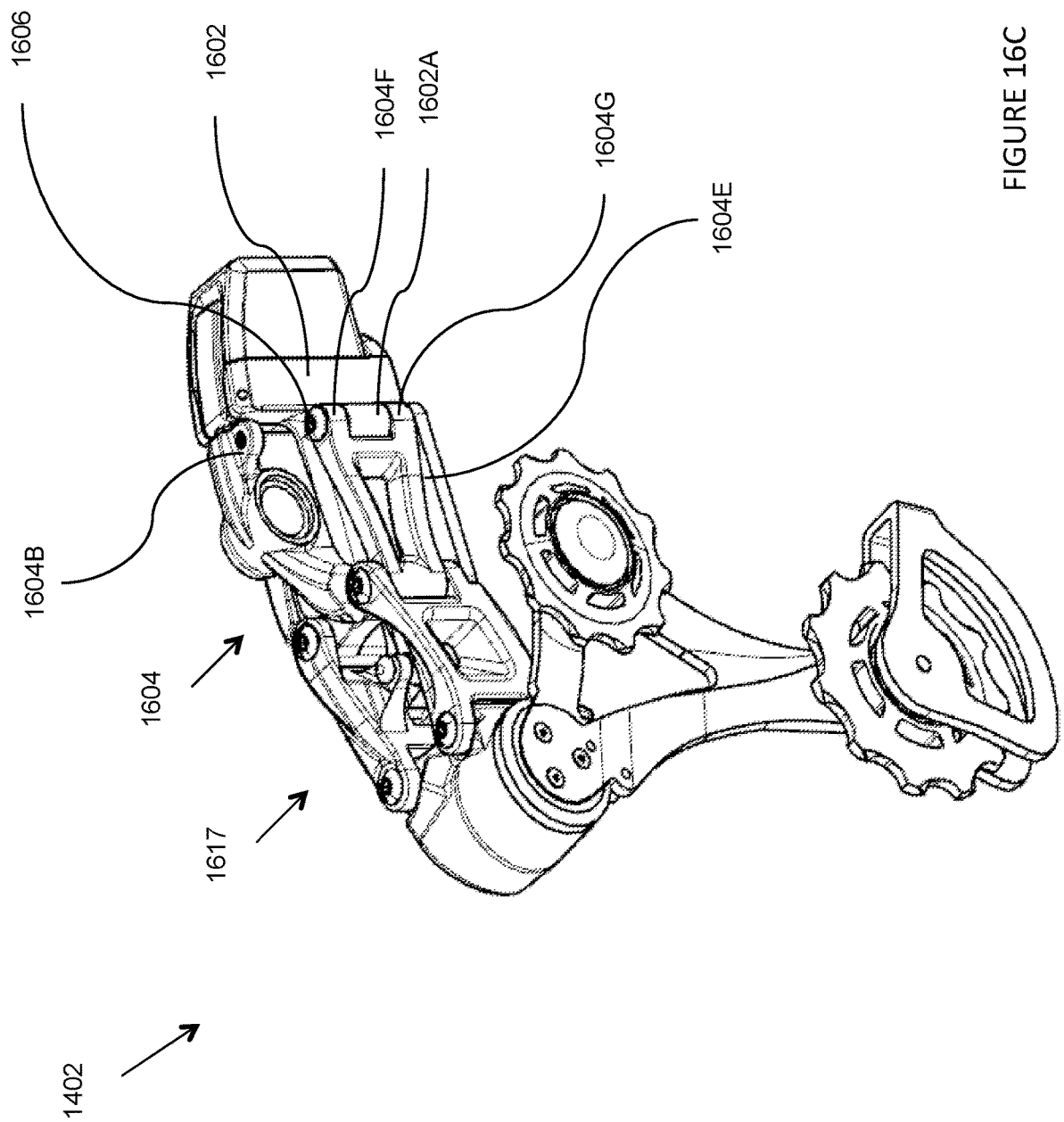
FIG. 16C is a perspective side view of the derailleur of FIG. 14 shown in an assembled state.
Figure 17A:
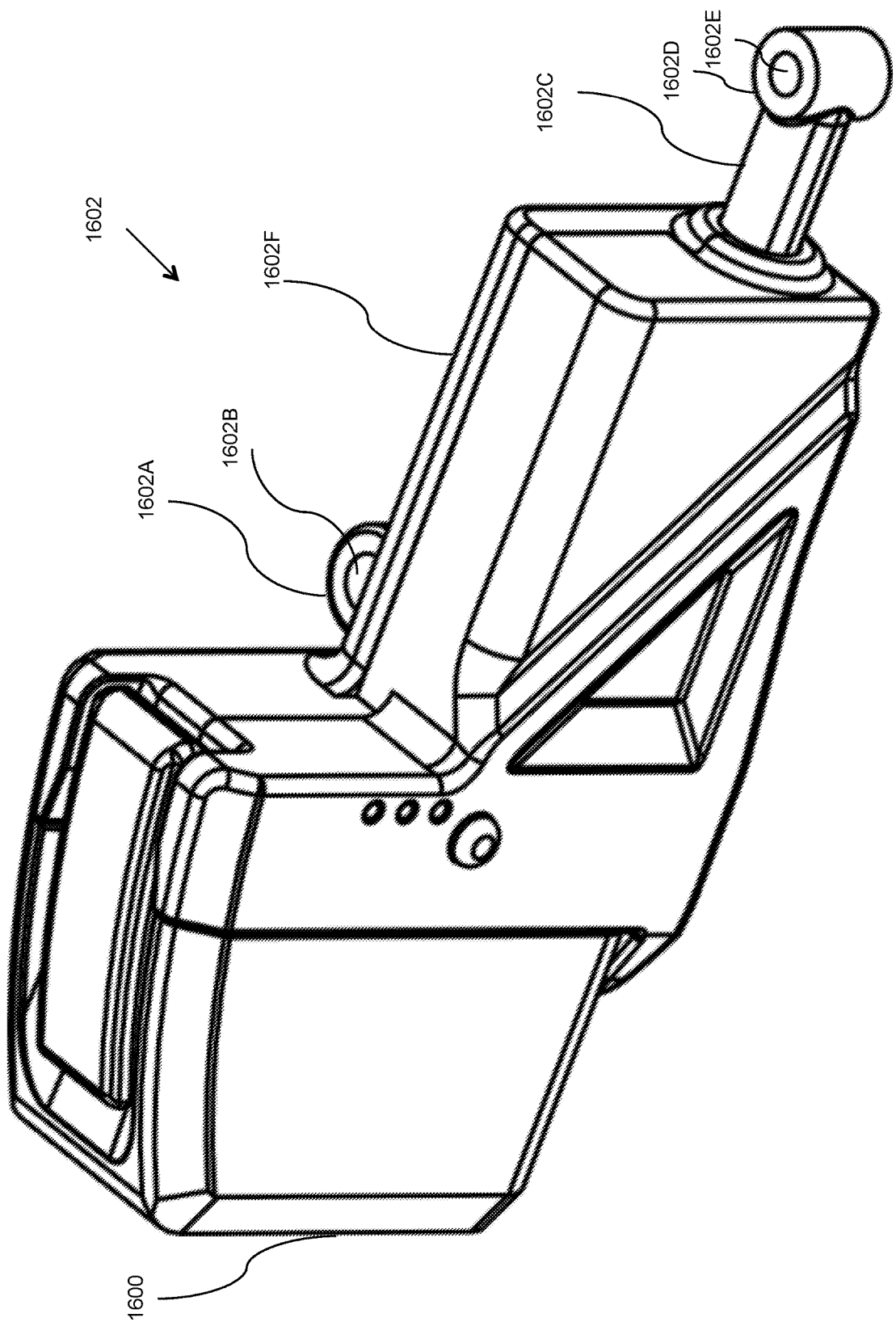
FIG. 17A is a perspective side view of the linear actuator of FIG. 16B coupled with the battery module of FIG. 16B.
Figure 17B:
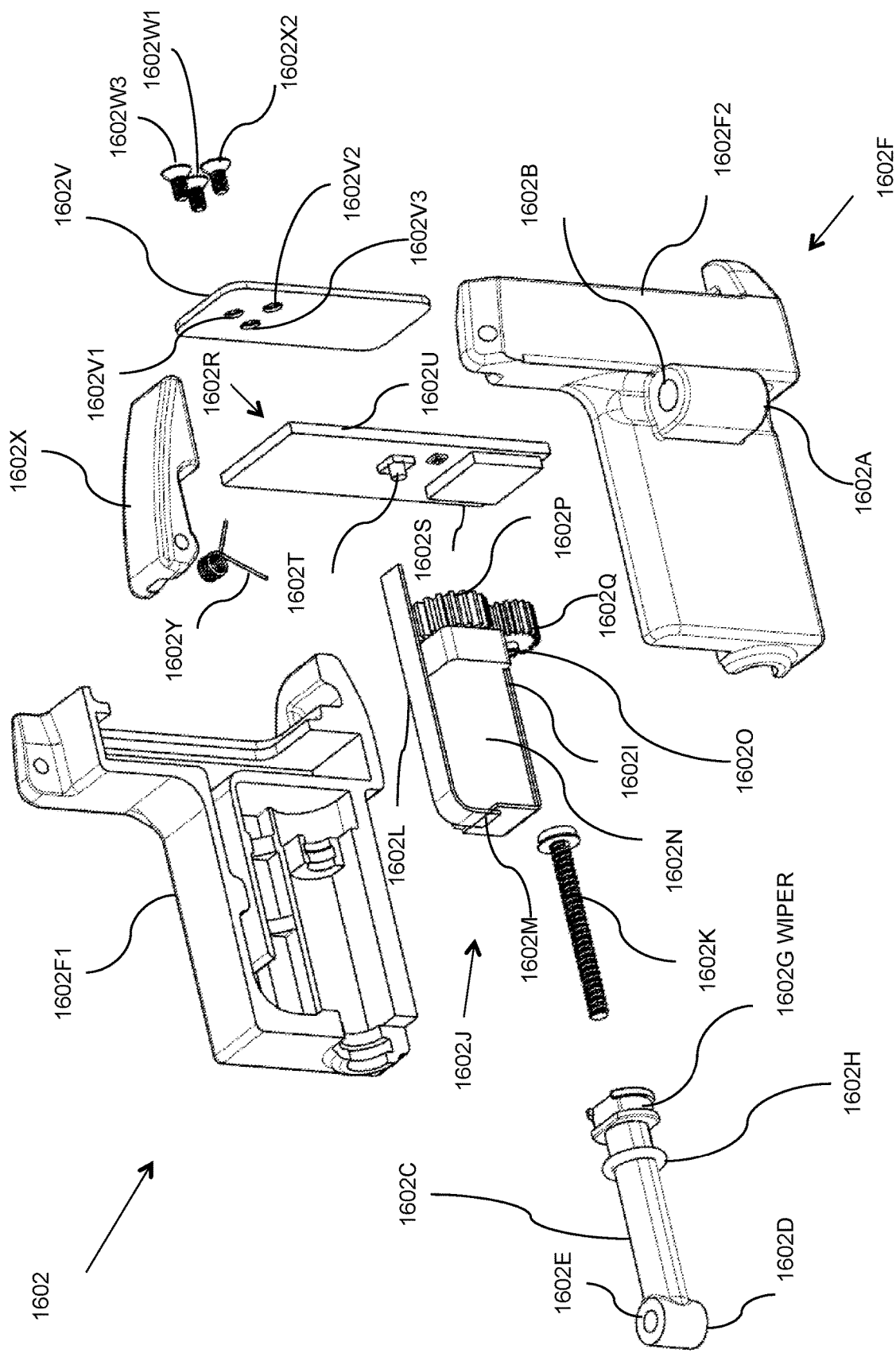
FIG. 17B is a perspective side view of the linear actuator of FIG. 16B.

A connecting bolt 1606 is applied to rotatably couple the device frame 1604 to the linear actuator 1602 as further described in reference to FIG. 16C and FIG. 17B.

A guide arm 1608 includes a first untapped bracket receiver 1608A and a first untapped bracket receiver 1608B. The first untapped bracket receiver 1608A is adapted to accept a traversal of the first bracket bolt 1518A and the first untapped bracket receiver 1608B is adapted to accept a traversal of the first bracket bolt 1518A. The guide arm 1608 further includes a second untapped bracket receiver 1608C and a second tapped bracket receiver 1608D. The second untapped bracket receiver 1608C is adapted to accept a traversal of the second bracket bolt 1518B and the second tapped bracket receiver 1608D is adapted to accept and engage with a threaded end of the second bracket bolt 1518B.

The damping element assembly 1504 includes the damping body 1506 that forms a first damping receiver 1506A and a second damping receiver 1506B. The first damping receiver 1506A is adapted to accept a traversal of the second bracket bolt 1518B fully therethrough. The second damping receiver 1506B is adapted to accept a traversal of the third bracket bolt 1518C fully therethrough.

A drive arm 1610 includes a third untapped bracket receiver 1610A and a third untapped bracket receiver 1610B. The third untapped bracket receiver 1610A is adapted to accept a traversal of the fourth bracket bolt 1518D and the third untapped bracket receiver 1610B is adapted to accept a traversal of the fourth bracket bolt 1518D. The drive arm 1610 further includes a fourth untapped bracket receiver 1610C and a fourth tapped bracket receiver 1610D. The fourth untapped bracket receiver 1610C is adapted to accept a traversal of the third bracket bolt 1518C and the fourth tapped bracket receiver 1610D is adapted to accept and engage with a threaded end of the third bracket bolt 1518C. An additional arm bolt receiver 1610E of the drive arm 1610 is adapted to receive and enable a full traversal of the actuator arm bolt 1520.

Referring still generally to the Figures and particularly to FIG. 16B, FIG. 16B is and as discussed in reference to FIG. 15A and FIG. 16A, the derailleur 1402 includes the cage plate 1502 and the damping element assembly 1504 that are rotatably coupled. The cage plate 1502 is rotatably connected to the tension pulley 1510 by the tension pulley bolt 1512, wherein the tension pulley bolt 1512 extends through both the cage plate 1502 and the tension pulley 1510 and permits the tension pulley 1510 to rotate. The cage plate 1502 is additionally rotatably connected to the guide pulley 1514 by the guide pulley bolt 1516, wherein the guide pulley bolt 1516 extends through both the cage plate 1502 and the guide pulley 1514 and permits the guide pulley 1514 to rotate.

A frame bottom plate 1612 includes a trio of tapped frame plate apertures 1612A, 1612B & 1612C that are sized, shaped and positioned in the frame bottom plate 1612 to separately accept and permit traversal of tapped portions of connecting bolts 1606, 1518A and 1518D. Whereby the frame bottom plate 1612 is detachably coupled with the device frame 1604.

A trio of untapped plate apertures 1614A, 1614B & 1614C are sized, shaped and positioned in the cage plate 1502 to separately accept and permit traversal of threaded portions of any one of a trio of cage screws 1616A, 1616B & 1616C. The cage screws 1616A, 1616B & 1616C are sized and shaped to engage with a trio of tapped cap receivers 1812A, 1812B & 1812C as presented in FIG. 18C.

It is understood that the linear actuator 1602, the damping element assembly 1504, the drive arm 1610, and the guide arm 1608 form a parallelogram bracket 1617 that has four vertices, wherein one bolt 1518A, 1518B, 1518C & 1518D is separately and individually placed at a vertex of the parallelogram bracket 1617. It is further understood that in the fully assembled derailleur that the actuator arm bolt 1520 of the derailleur 1402 is intentionally positioned at a location that is not equidistant between the operational locations of the third bracket bolt 1518C fourth bracket bolt 1518D. This offset placement of the actuator arm bolt 1520 relative to the third bracket bolt 1518C fourth bracket bolt 1518 causes the parallelogram bracket 1617 to be biased relation to the cage plate 1502.

Referring now generally to the Figures and particularly to FIG. 16C, FIG. 16C is a perspective side view of the invented derailleur 1402 shown in an assembled state.

Figure 16D:
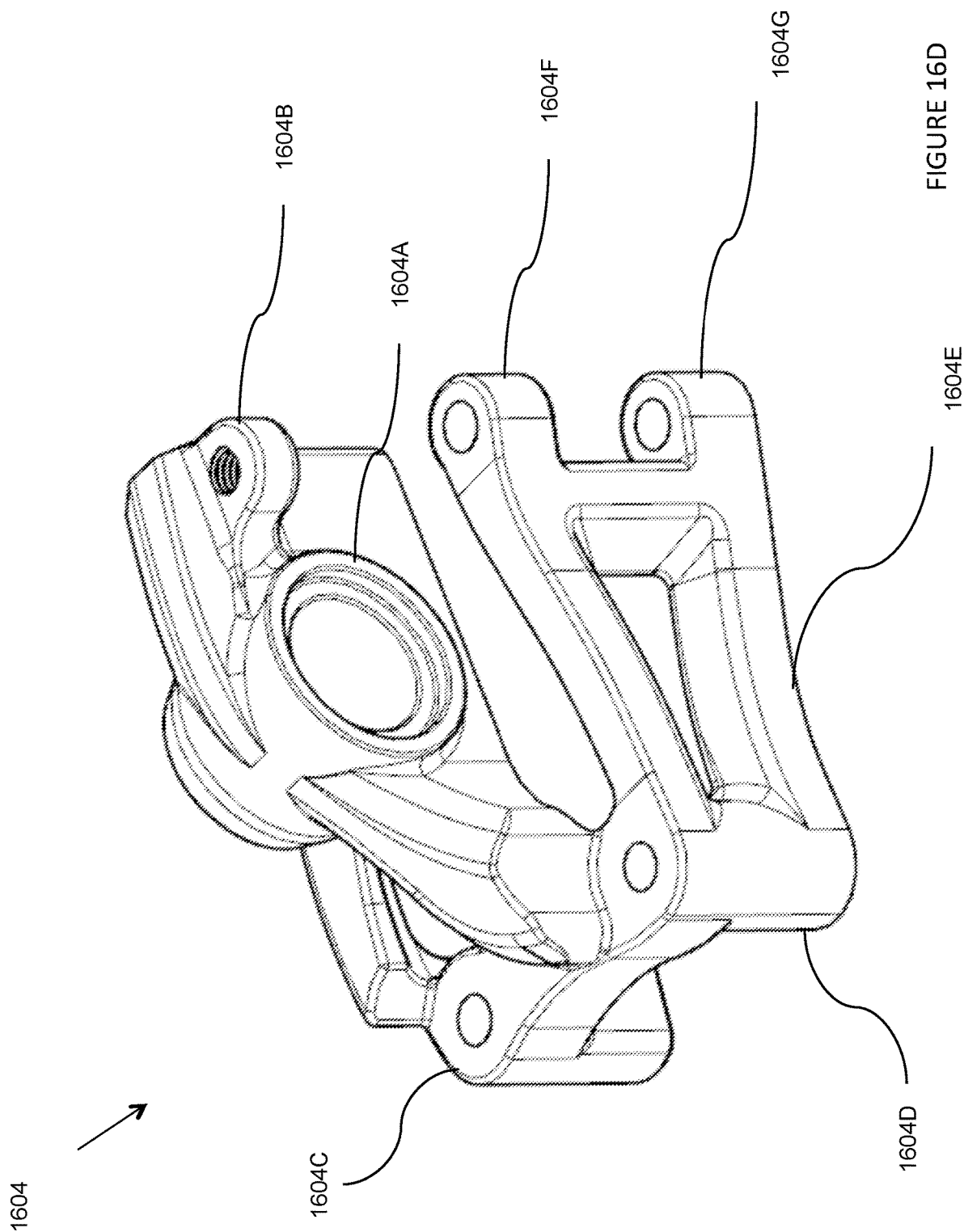
FIG. 16D is a perspective side view of the device frame of FIG. 16B.

The device frame 1604 includes an extension 1604E that forms both an untapped connecting bolt receiver 1604F and an untapped connecting bolt receiver 1604G. The untapped connecting bolt receiver 1604F is adapted to accept a traversal of the connecting bolt 1606 fully therethrough, and the tapped connecting bolt receiver 1604G is adapted to accept a traversal of the connecting bolt 1606 fully therethrough. In addition, the linear actuator 1602 forms an untapped connecting bolt actuator receiver 1602A that is adapted to accept a traversal of the connecting bolt 1606 fully therethrough. Referring now generally to the Figures and particularly to FIG. 16D and FIG. 16B, FIG. 16D is a perspective side view of the device frame 1604 shown in isolation. As described in reference to FIG. 16B, the drop out bolt aperture 1604A shaped and sized to allow the dropout bolt 1500 to extend fully through the device frame 1604; the tapped connection receiver 1604B is adapted to accept a prior art b-tension screw (not shown) for further coupling of attachment to of the device frame 1604 to the bicycle frame 102; the first frame receiver 1604C is adapted to accept a traversal of the fourth bracket bolt 1518D fully therethrough; and the second frame receiver 1604D is adapted to accept a traversal of the first bracket bolt 1518A fully therethrough.

Referring now generally to the Figures and particularly to FIG. 16D and FIG. 16C, the device frame 1604 includes the extension 1604E that forms both the untapped connecting bolt receiver 1604F and the tapped connecting bolt receiver 1604G. The untapped connecting bolt receiver 1604F is adapted to accept a traversal of the connecting bolt 1606 fully therethrough, and the tapped connecting bolt receiver 1604G is adapted to engage with the threaded end of the connecting bolt 1606.

Referring now generally to the Figures and particularly to FIG. 17A, FIG. 17A is a perspective side view of the linear actuator 1602 coupled with the battery module 1600 and shown otherwise in isolation from the remainder of the derailleur 1402 and the invented gearshift system 1400. As disclosed in the description accompanying FIG. 16C, the untapped connecting bolt actuator receiver 1602A is adapted to accept a traversal of the connecting bolt 1606 fully through an actuator bolt aperture 1602B. An actuator arm 1602C of the linear actuator 1602 is provided integrated with an arm connection feature 1602D that forms an untapped tapped arm receiving aperture 1602E. The untapped arm receiving aperture 1602E is adapted to enable a full traversal of the of the actuator arm bolt 1520.

Figure 17C:
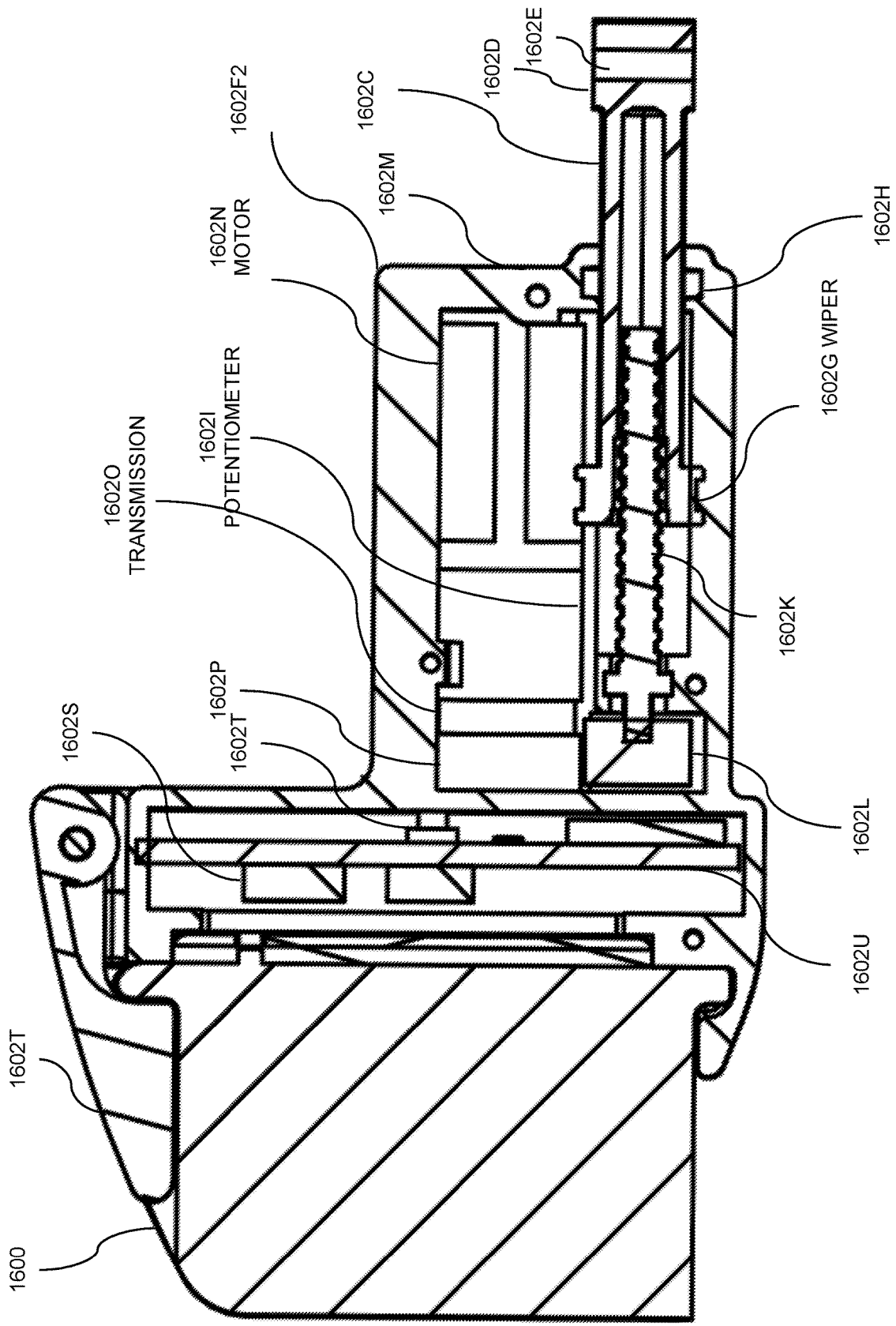
FIG. 17C is a cutaway side view of the linear actuator of FIG. 16B.

Referring now generally to the Figures and particularly to FIG. 17B and FIG. 17C, FIG. 17B is a perspective side view of the linear actuator 1602 and FIG. 17C is a cutaway side view of the linear actuator 1602. As disclosed in the description accompanying FIG. 17A, the untapped connecting bolt actuator receiver 1602A is adapted to accept a traversal of the connecting bolt 1606 fully through the actuator bolt aperture 1602B. the actuator arm 1602C of the linear actuator 1602 is provided integrated with the arm connection feature 1602D that forms the untapped arm receiving aperture 1602E. The untapped arm receiving aperture 1602E is adapted to enable a full traversal of the of the actuator arm bolt 1520.

An actuator body 1602F formed by a first actuator body half 1602F1 that join with a second actuator body half 1602F2 to provide a platform and/or protect various actuator elements 1604A-1604X, such as the actuator arm 1602C and the actuator arm features of a wiper 1602G and O-ring seal 1602H. The wiper is electrically conductive and is adapted and positioned to move along a length dimension of a potentiometer 1602I of a linear actuator motor assembly 1602J. The linear actuator motor assembly 1602I further includes a lead screw 1602K, a power and signal pathway 1602L, a linear actuator microcontroller 1602M, a motor 1602N, a transmission 16020, a first gear 1602P, a second gear 1602Q. The motor 1602N may be electrically powered, such as but not limited a direct current brush motor or a direct current brushless motor, and may be powered by a electrical power source, such as but not limited to the electrical battery module 1600, that is internal or alternatively external to the device.

Electrical power and signals received by the power and signal pathway 1602L from a derailleur controller module 1602R are delivered to the linear actuator microcontroller 1602M, whereupon a pre-established logic of the linear actuator microcontroller 1602M determines how received power is transferred to the linear actuator motor 1602N and in view of the position of wiper 1602G in relation to, and detected via, the potentiometer 1602I. The linear actuator motor 1602N rotates the first gear 1602P and the first gear 1602P in return rotates the second gear 1602Q. The second gear 1602Q engages with the lead screw 1602K and the rotation of the second gear 1602Q causes the lead screw 1602K to accurately and detectably, i.e., by signal strength of the potentiometer 1602I as detected by the linear actuator microcontroller 1602M, to vary the position of the arm 1602C. It is understood that the linear actuator microcontroller 1602M applies the means and method of the electrically conductive wiper 1602G making electrical contact with the potentiometer 1602I and having a feedback logic of the linear actuator microcontroller 1602M varying the position of the arm 1602C until the desired measurement relevant to the last pulse width modulated signal received from the 1602R is detected by the linear actuator microcontroller 1602M.

The derailleur controller module 1602R includes a derailleur microprocessor 1602S and an intermediate power and signal pathway 1602T. An interposed plate 1602V includes a trio of tapped plate apertures 1602V1, 1602V2 & 1602V3 that separately engage with one of a trio of electrically conductive threaded contacts 1602W1, 1602W2 & 1602W3. The threaded contacts 1602BW1, 1602W2 & 1602W3 are adapted to provide electrical power to the derailleur controller module 1602R.

A top clip 1602X is rotatably coupled to both the actuator body 1602F and is adapted to detachably secure the battery module 1600 to the linear actuator 1602; a spring 1602Y is positioned to drive the top clip 1602X into the battery module 1600.

BRIEF DESCRIPTIONS OF THE DRAWINGS

Figure 18A:
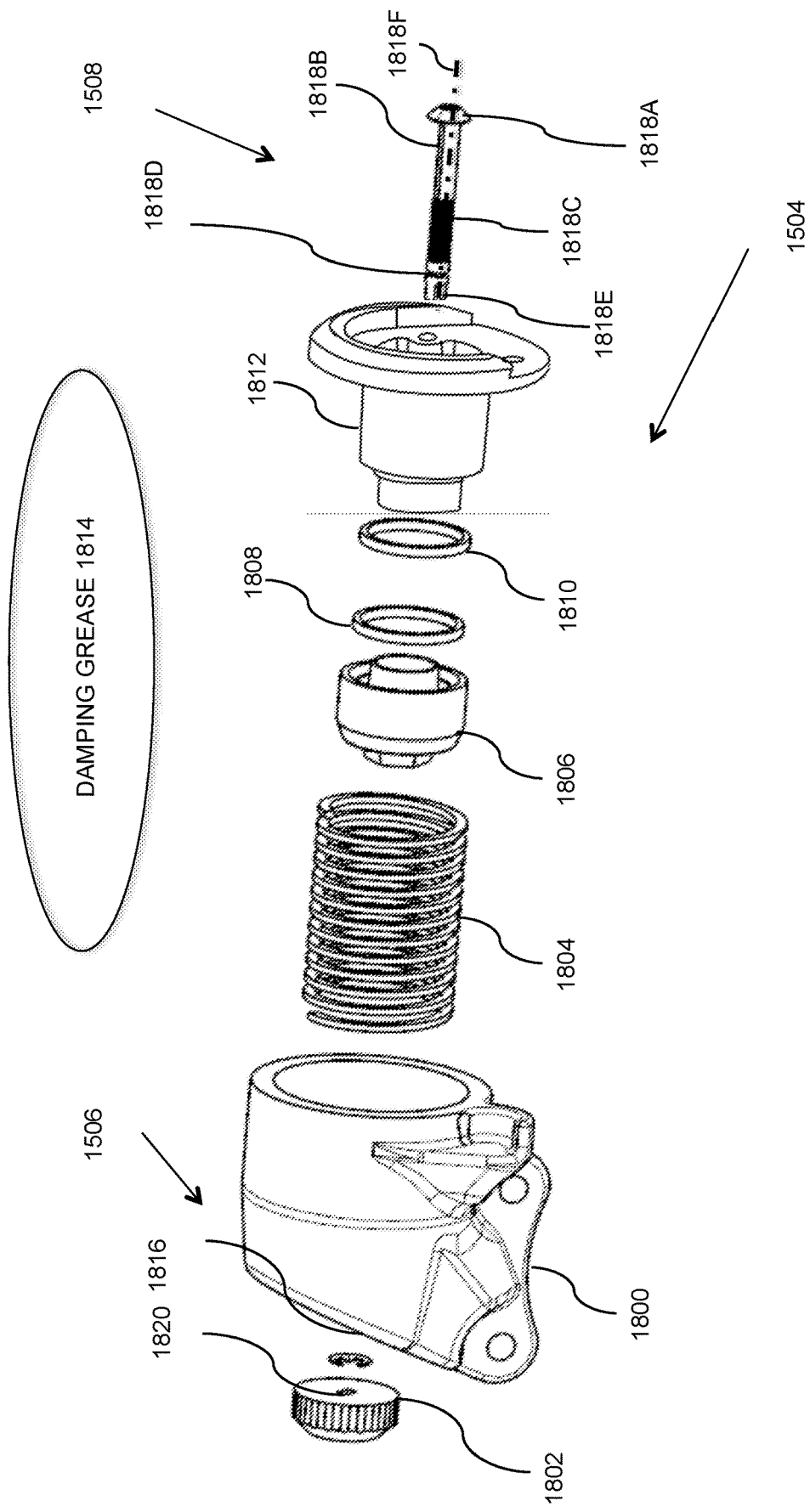
FIG. 18A is an exploded front view of the damping element assembly of FIG. 15A.
Figure 18B:
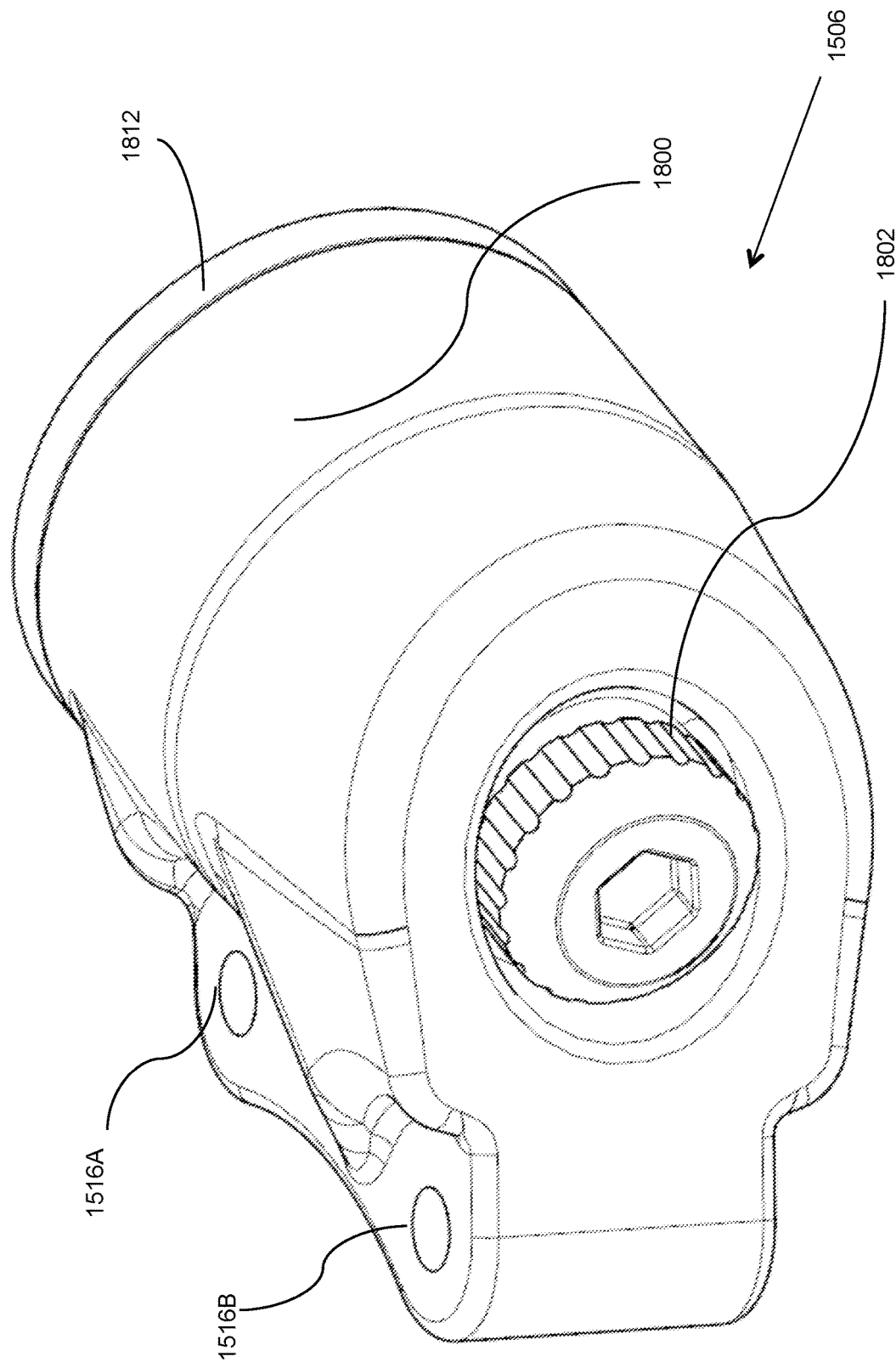
FIG. 18B is a partial right back perspective view of an annular chamber of FIG. 18A coupled with a thumbscrew of the damping element assembly of FIG. 18A.
Figure 18C:
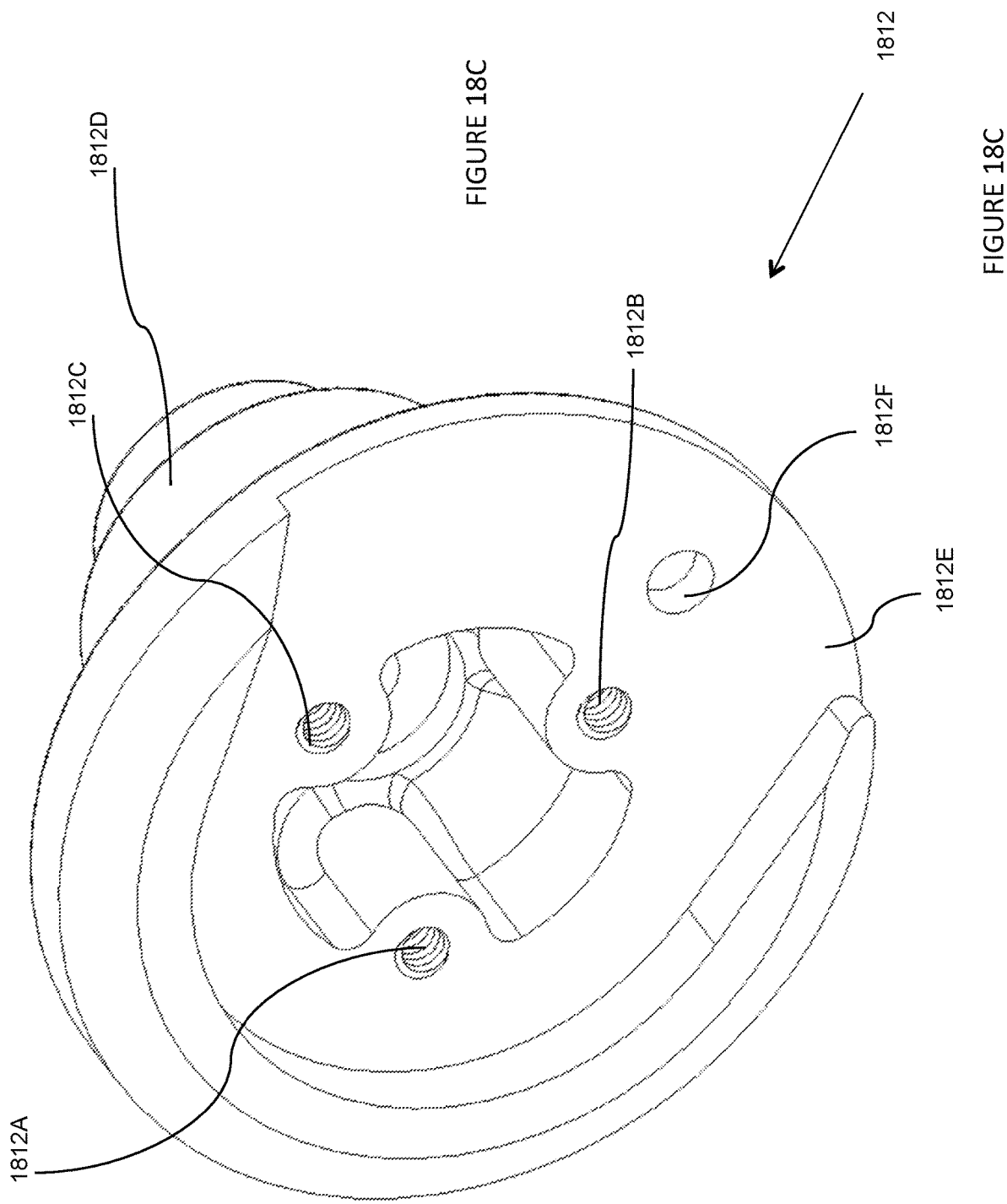
FIG. 18C is a side perspective view of a rotatable tapped cap of the damping element assembly of FIG. 15A and FIG. 18A.
Figure 18D:
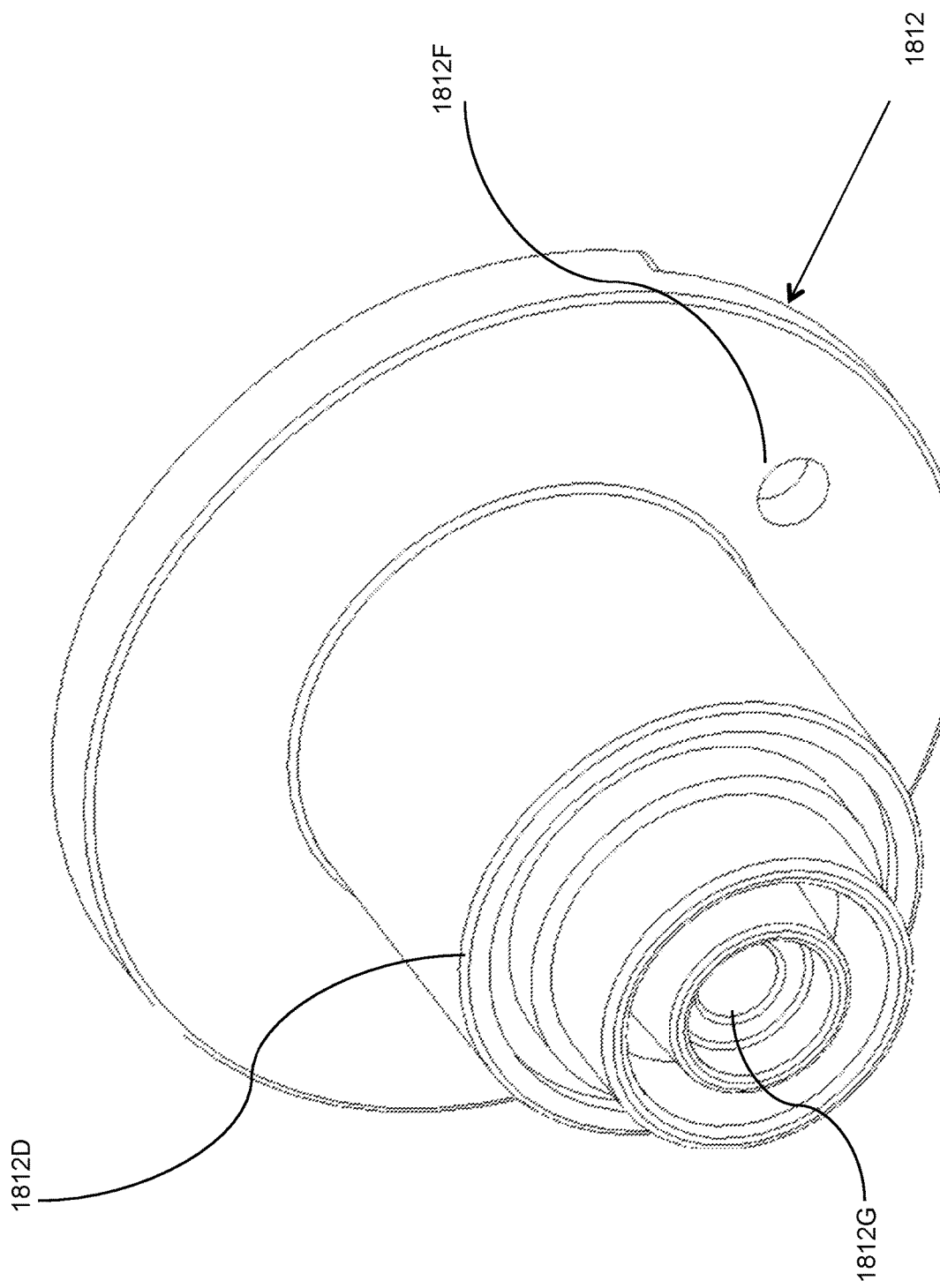
FIG. 18D is an opposing side perspective view of the rotatable tapped cap of FIG. 18C.
Figure 18E:
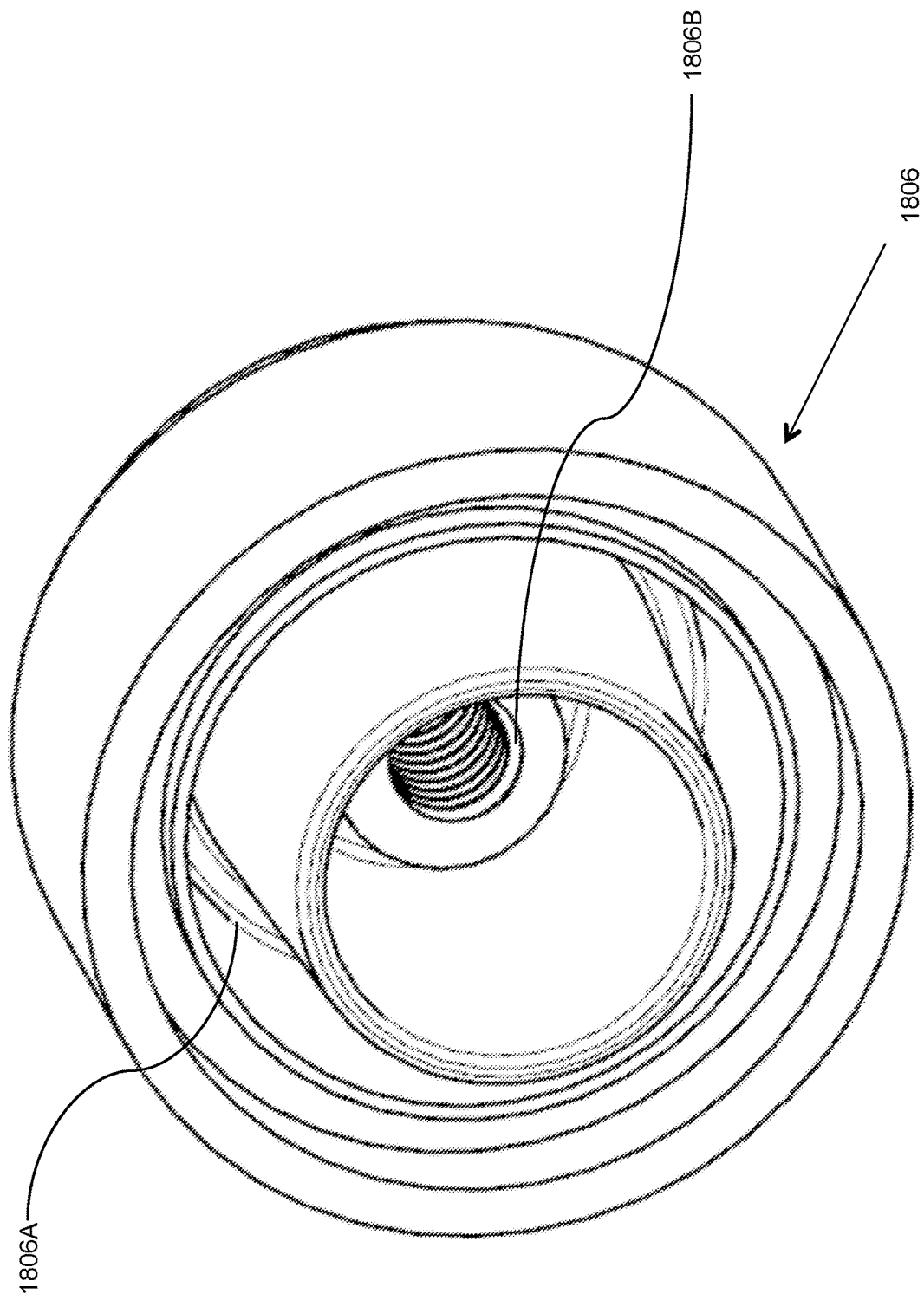
FIG. 18E is a side perspective view of a fixed element of the damping element assembly of FIG. 15A and FIG. 18A.
Figure 18F:
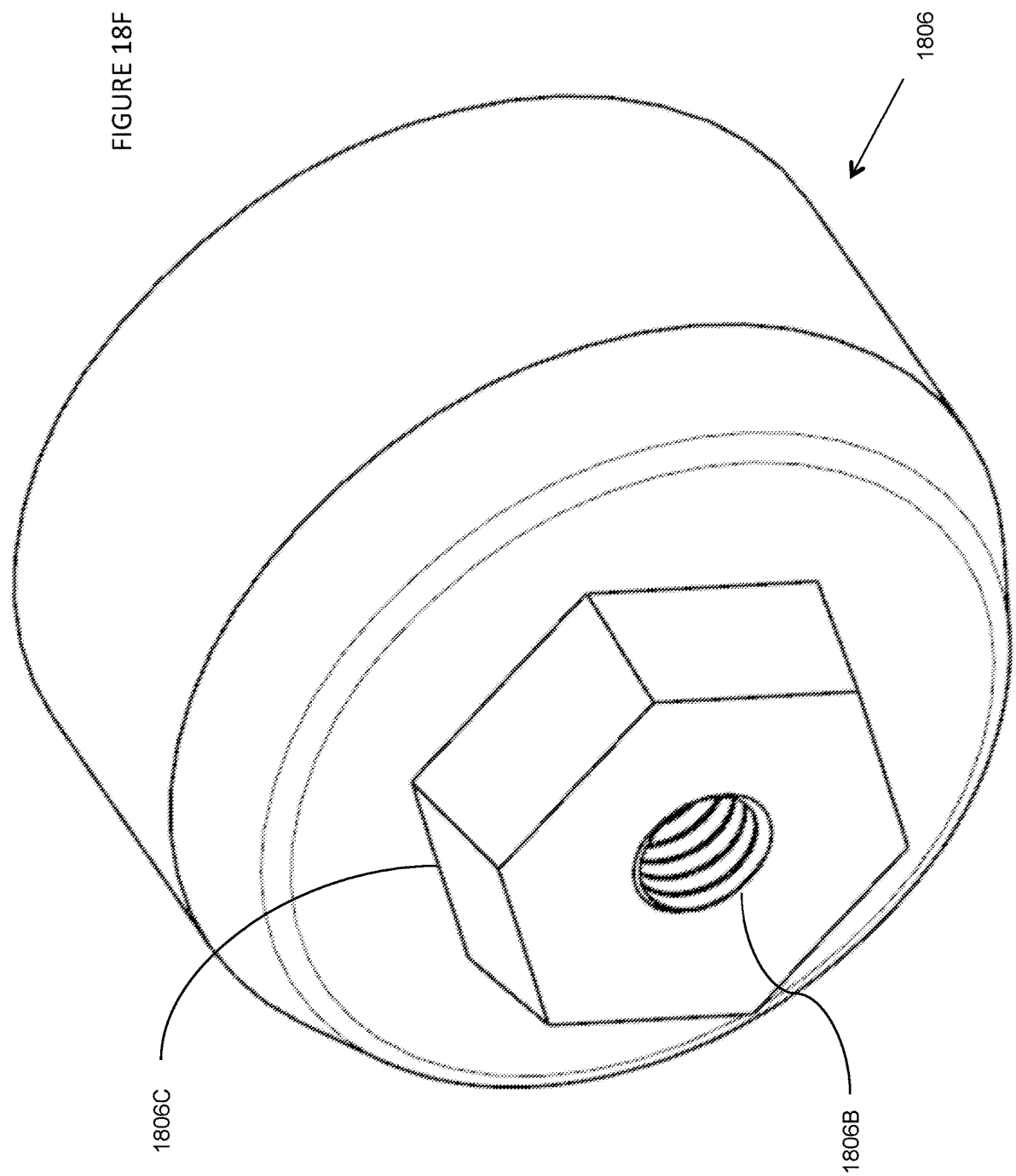
FIG. 18F is an opposing perspective view of the fixed element of FIG. 18E.
Figure 18G:
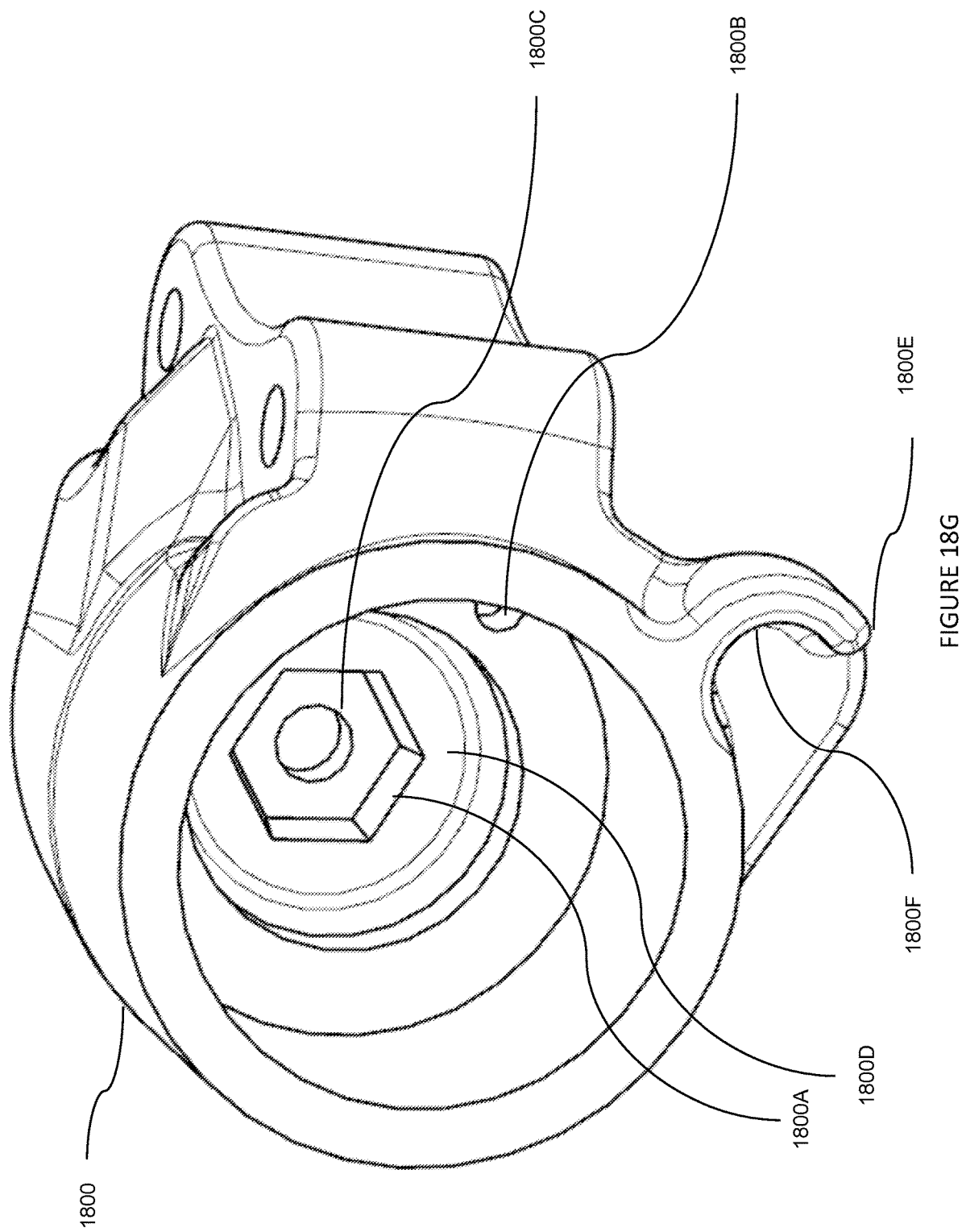
FIG. 18G is an internal perspective view of the damping element chamber of FIG. 18A that fits together with the hexagonal feature on the fixed element of FIG. 18A and holds the fixed element of FIG. 18A in place.
Figure 18H:
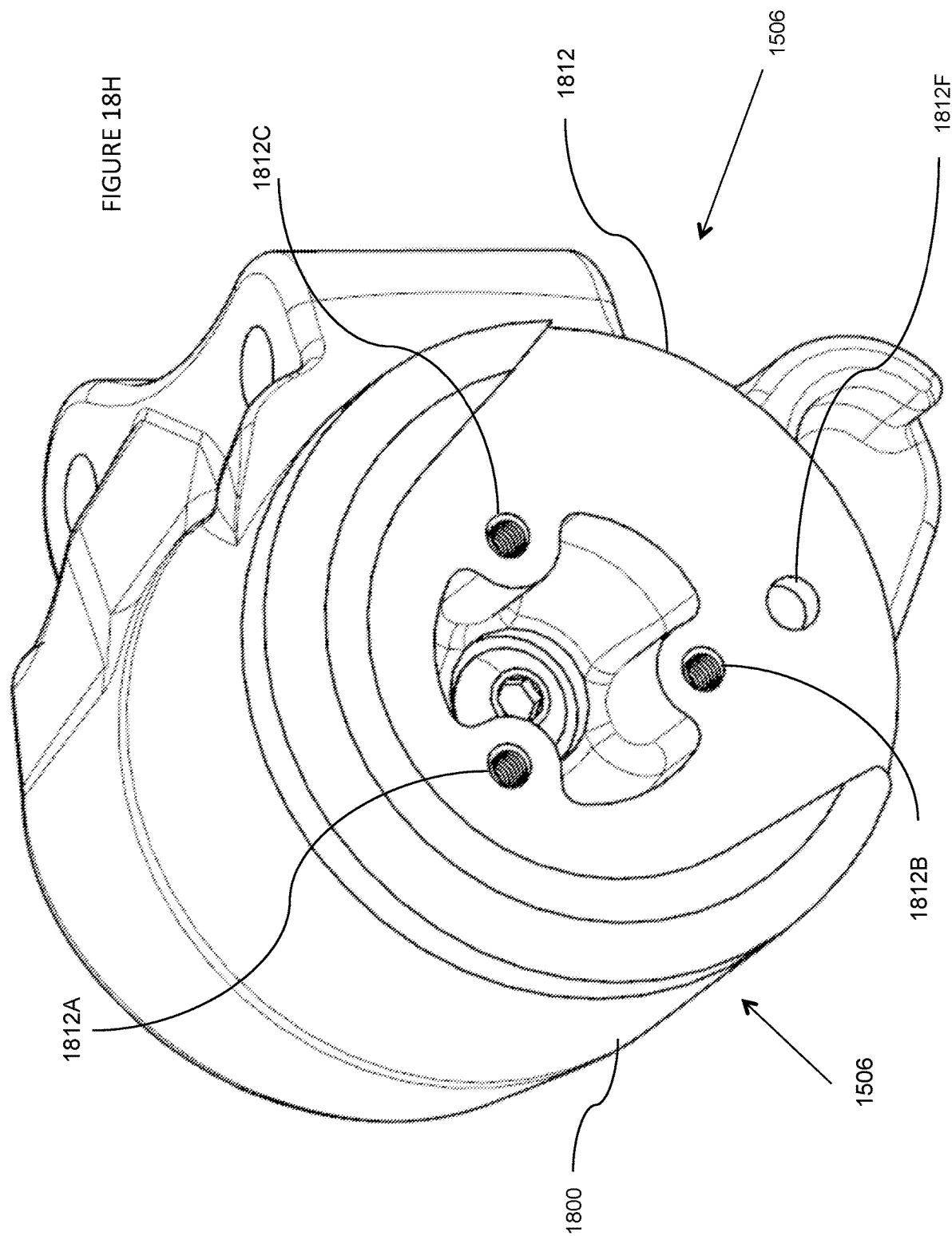
FIG. 18H is a partial perspective view of the rotatable tapped cap of FIG. 18C seated within the chamber of FIG. 18B.
Figure 18I:
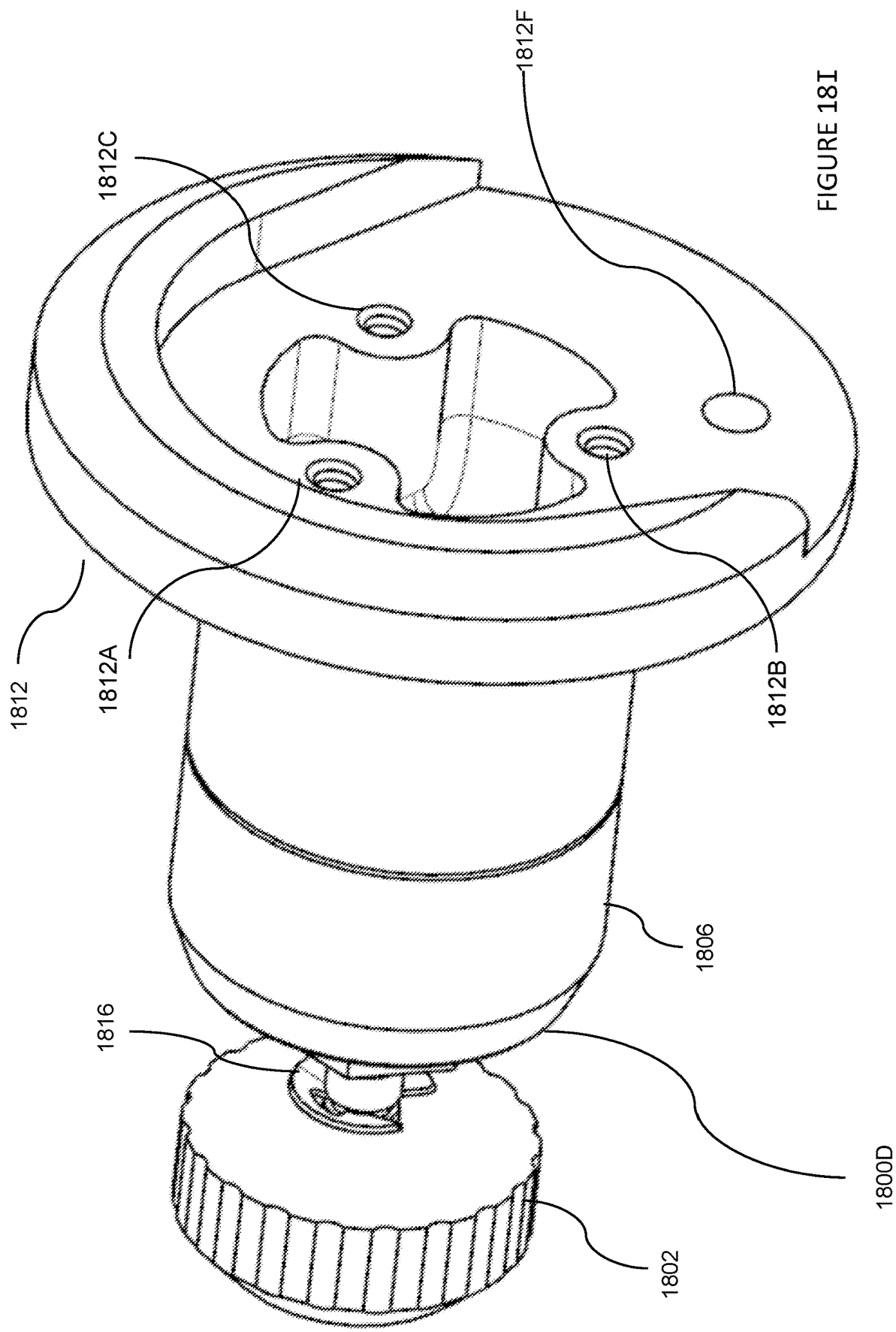
FIG. 18I is a perspective isolated view of the thumbscrew of FIG. 18A, and also the rotatable tapped cap of FIG. 18A rotatably coupled with the fixed element of the damping element assembly of FIG. 18A.
Figure 18J:
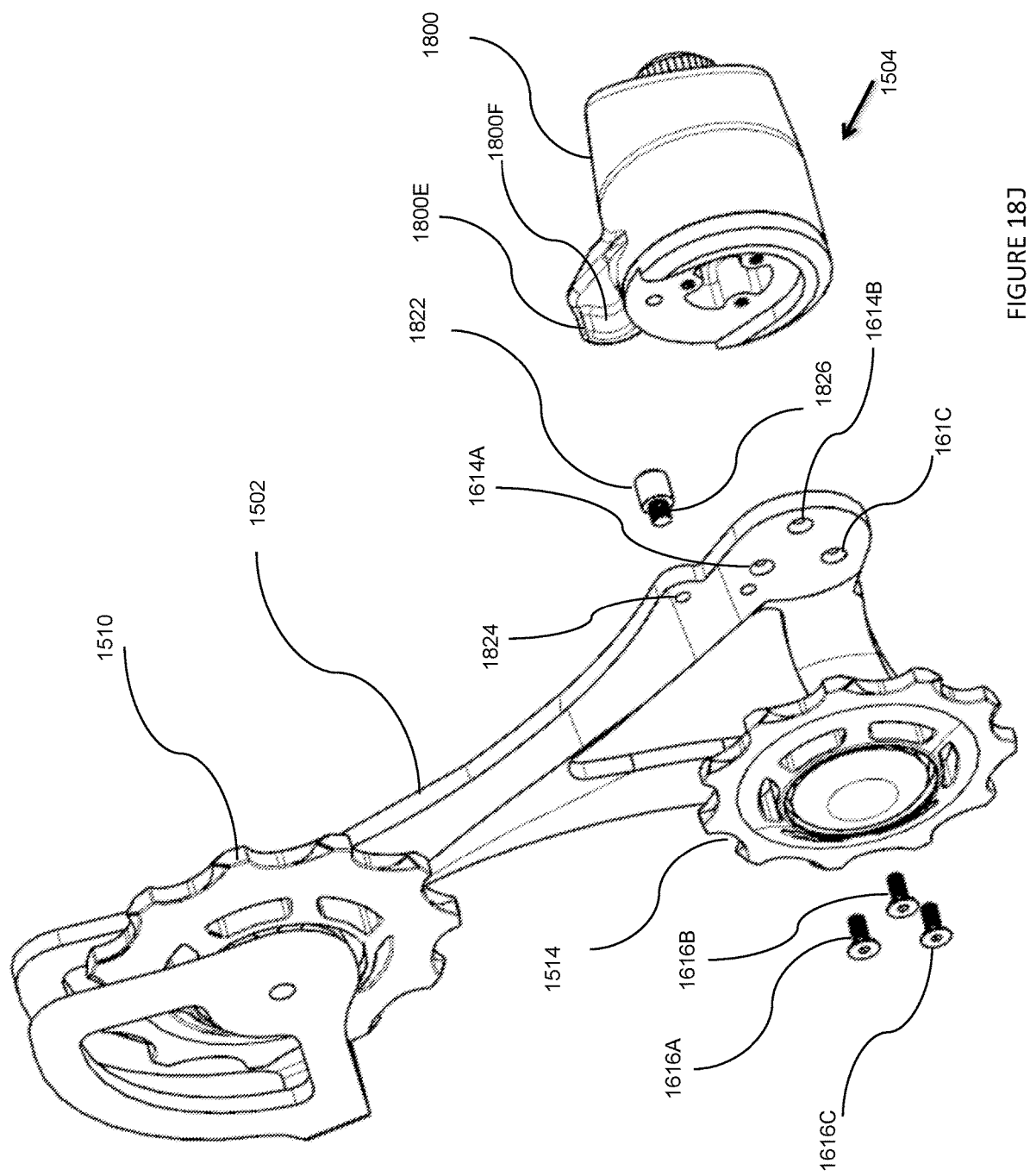
FIG. 18J is an exploded perspective view of a cage bolt that is adapted to be rotatably seated within a concave surface of a cage bolt stop wall of the damping element chamber of FIG. 18G.
Figure 18K:
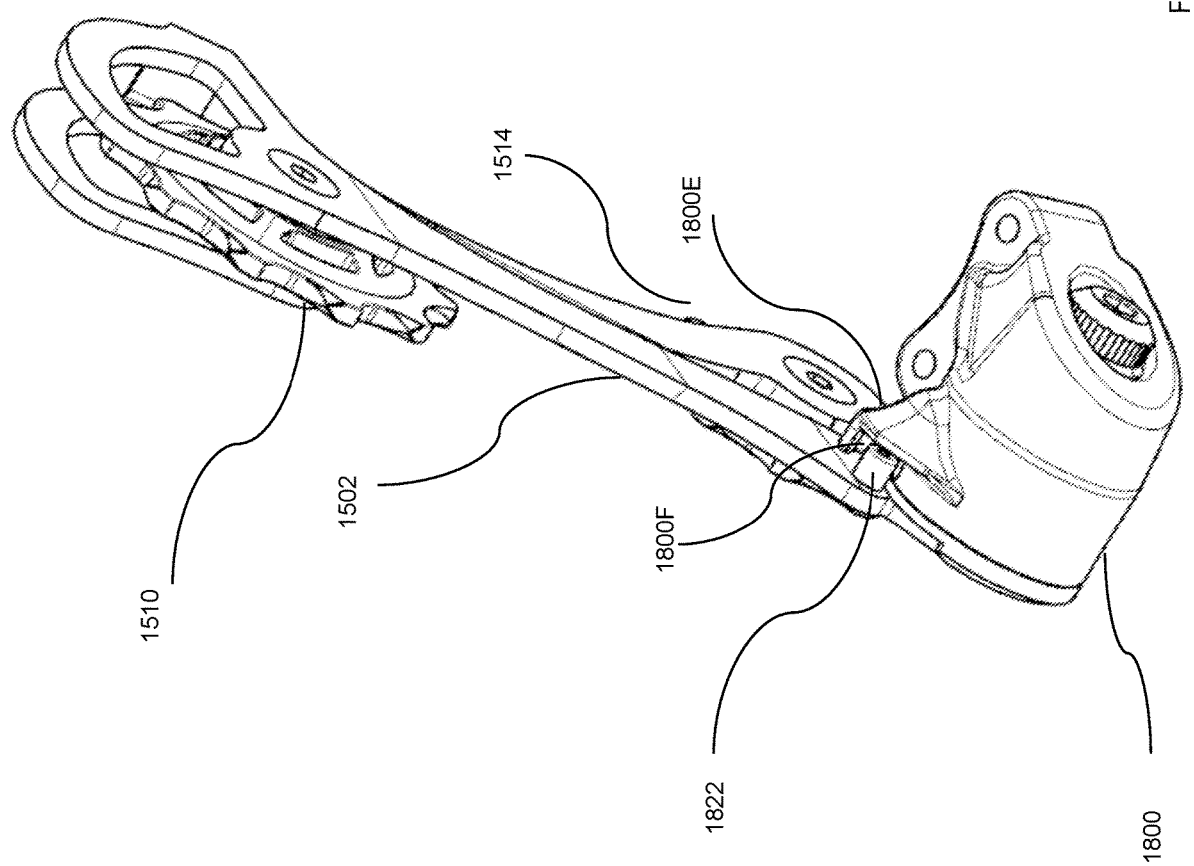
FIG. 18K is a perspective side view of the cage bolt of FIG. 18J rotatably seated within the concave surface of the cage bolt stop wall of FIG. 18G.
Figure 18L:
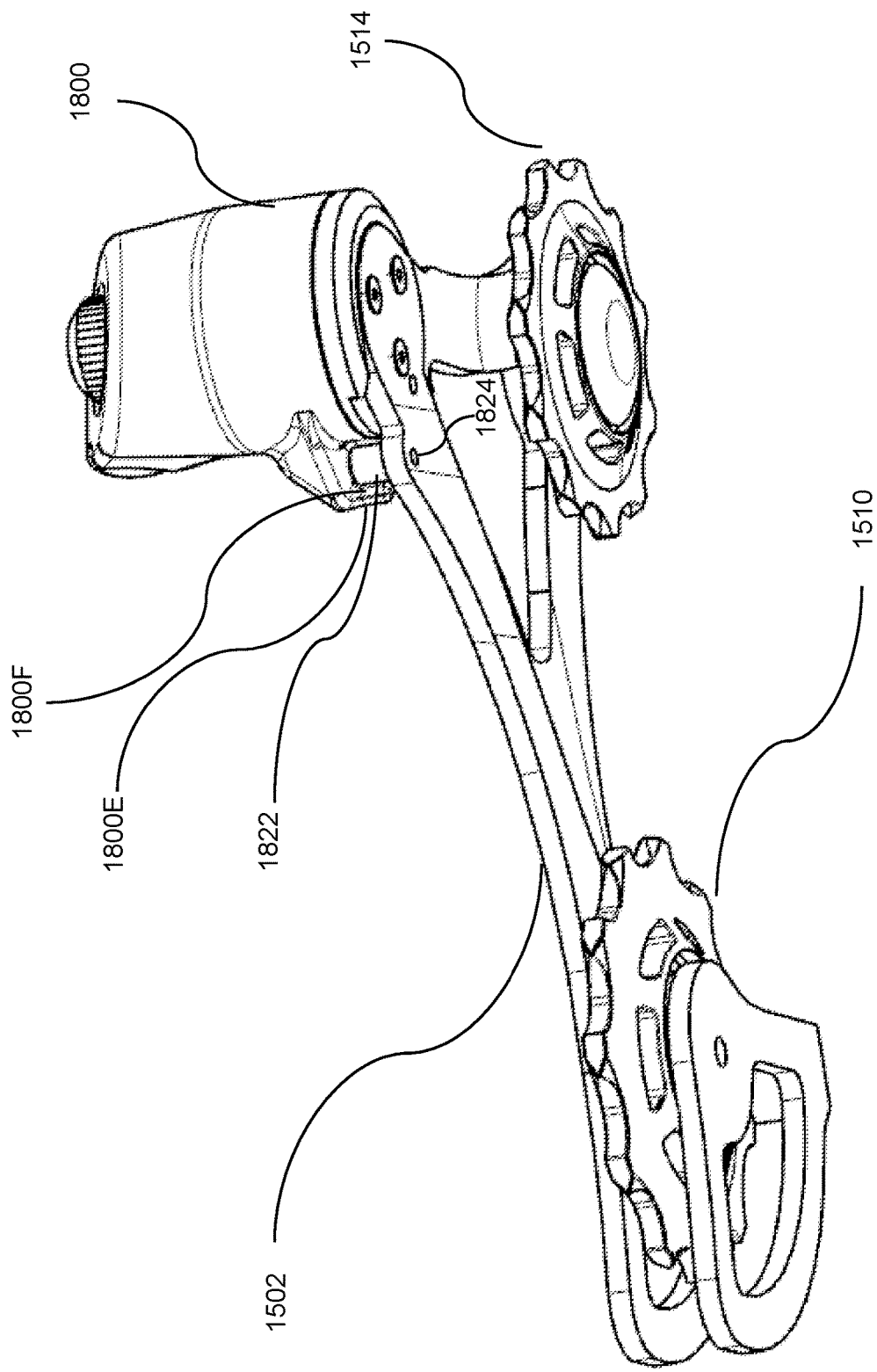
FIG. 18L is an alternate perspective side view of the cage bolt of FIG. 18J rotatably seated within the concave surface of the cage bolt stop wall of FIG. 18G.

FIG. 18A is an exploded front view of the damping element assembly of FIG. 15A;

FIG. 18B is a partial right back perspective view of an annular chamber of FIG. 18A coupled with a thumbscrew of the damping element assembly of FIG. 18A;

FIG. 18C is a side perspective view of a rotatable tapped cap of the damping element assembly of FIG. 15A and FIG. 18A;

FIG. 18D is an opposing side perspective view of the rotatable tapped cap of FIG. 18C;

FIG. 18E is a side perspective view of a fixed element of the damping element assembly of FIG. 15A and FIG. 18A;

FIG. 18F is an opposing perspective view of the fixed element of FIG. 18E;

FIG. 18G is an internal perspective view of the damping element chamber of FIG. 18A that fits together with the hexagonal feature on the fixed element of FIG. 18A and holds the fixed element of FIG. 18A in place;

FIG. 18H is a partial perspective view of the rotatable tapped cap of FIG. 18C seated within the chamber of FIG. 18B;

FIG. 18I is a perspective isolated view of the thumbscrew of FIG. 18A, and also the rotatable tapped cap of FIG. 18A rotatably coupled with the fixed element of the damping element assembly of FIG. 18A;

FIG. 18J is an exploded perspective view of a cage bolt that is adapted to be rotatably seated within a concave surface of a cage bolt stop wall of the damping element chamber of FIG. 18G;

FIG. 18K is a perspective side view of the cage bolt of FIG. 18J rotatably seated within the concave surface of the cage bolt stop wall of FIG. 18G; and FIG. 18L is an alternate perspective side view of the cage bolt of FIG. 18J rotatably seated within the concave surface of the cage bolt stop wall of FIG. 18G.

Referring now generally to the Figures and particularly to FIG. 18A and FIG. 15A, FIG. 18A is an exploded view of the damping element assembly 1504 shown in the side view of FIG. 15A. In operation, an annular chamber 1800 is rotatably coupled with a thumbscrew 1802 to form the damping element body 1506 of the damping element assembly 1504. The damping element assembly 1504 further includes a helical torsion spring 1804, a fixed element 1806, a first bushing 1808 and a second bushing 1810 and a rotatable tapped cap 1812. The chamber 1800 and the rotatable tapped cap 1812 are rotatably coupled by the bolt 1508 and support the maintenance of the a helical torsion spring 1804. The helical torsion spring 1804 provides a restoring moment against the oscillation of the chain 210 of when the bike 104 is traversing rocky or otherwise uneven terrain.

The bolt 1508 includes a bolt head 1818A, a shaft 1818B having a threaded length 1818C, a relieved feature 1818D, and a distal tip 1818E. The distal tip 1818E is located on the bolt 1508 distally from the bolt head 1818A along an elongate axis 1818F of the bolt 1508. The head 1818A extends peripherally beyond the shaft 1818B in relation to the elongate axis 1818F of the bolt 1508, whereby the shaft 1818B passes through the rotatable tapped cap 1812 but the bolt head 1818A is oversized to inhibit a traversal of the bolt head 1818B into the rotatable tapped cap 1812.

In operation and when the damping element assembly 1504 is fully assembled, a volume of a damping grease 1814 resides between the fixed element 1806 and the rotatable tapped cap 1812. The damping grease 1814 preferably comprises a high internal shear stress fluid, such as but not limited to a silicone based solution, that desirably transfers forces between rotating/static faces. The damping element bolt shaft 1818B extends fully through both the rotatable tapped cap 1812, the fixed element 1806, and the chamber 1800, while the threaded length 1818C engages with the fixed element 1806. The distal tip 1818E extends into and is at least partially enclosed by a bolt tip receiver 1820 of the thumbscrew 1802. The structure of the bolt 1508 limits the motion along the bolt elongate axis 1818F of the rotatable tapped cap 1812 in relation to the fixed element 1806. A notched washer 1816 partially encircles the damping element bolt 1508; the notched washer 1816 fits into and extends peripherally from the relieved feature 1818D of the damping element bolt 1508. The damping element bolt 1508 is held in place in the fully assembled damping element assembly 1504 along the bolt elongate axis 1818F by the combination of the notched washer 1816 emplaced about the relieved feature 1818D and the bolt head 1818A.

In operation of the fully assembled damping element assembly 1504, the rotatable tapped cap 1812 and the chamber 1800 are pressed between the notched washer 1816 and the bolt head 1818A. Manual tightening by a user of the thumbscrew 1802 in the counter-clockwise direction affects the engagement and positioning of the bolt threaded length 1818C of the bolt 1508 with the tapped hole 1806B of the fixed element 1806 and thereby causes increased compressive force to be applied between the fixed element 1806 and the rotatable tapped cap 1812 which increases the damping effect on rotation of the rotatable tapped cap 1812 and the cage plate 1502.

Referring now generally to the Figures and particularly to FIG. 16B and FIG. 18B, FIG. 18B is a perspective view of the chamber 1800 and the thumbscrew 1802 that form the damping element body 1506. In operation of the fully assembled derailleur 1402 as installed on the bicycle 104, the chamber 1800 is rotatably coupled to the guide arm 1608 at the first damping receiver 1506A and to the drive arm 1610 at second damping receiver 1506B.

Referring now generally to the Figures and particularly to FIG. 18C and FIG. 15B, each of the screws 1616A-1616C engage individually and directly into one of a trio of tapped cap receivers 1812A, 1812B & 1812C of the rotatable tapped cap 1812. The friction of the damping grease 1814 enables the damping element assembly 1504 to reduce undesirable oscillations of the cage plate 1502 and chain 210. A protruding feature of the rotatable tapped cap 1812D fits together with an indented feature 1806A located on the fixed element 1806. A flat top 1812E of the rotatable tapped cap 1812 includes an anchoring hole 1812F to which the spring 1804 is anchored at one end.

Referring now generally to the Figures and particularly to FIG. 18D, FIG. 18D is a partial perspective view of the rotatable tapped cap 1812, shown from a different angle. FIG. 18D presents a clarifying view of the protruding feature 1812D of the rotatable tapped cap 1812, and also shows the anchoring hole 1812F for the spring 1804 and a smooth-bore hole 1812G. The shaft 1818B of the threaded bolt 1508 extends fully through smooth-bore hole 1812G of the rotatable tapped cap 1812, whereby the rotatable tapped cap 1812 is free to rotate about the shaft 1818B of the threaded bolt 1508 in operation of the damping element assembly 1504.

Referring now generally to the Figures and particularly to FIG. 18E, FIG. 18E is a partial perspective view of the fixed element 1806 of the damping element assembly 1504. FIG. 18E presents the indented feature 1806A, which fits together with the protruding feature 1812D of the rotatable tapped cap 1812, and also a tapped hole 1806B with which the threaded length 1818C of the bolt 1508 engages the fixed element 1806.

Referring now generally to the Figures and particularly to FIG. 18F, FIG. 18F is a partial perspective view of the fixed element 1806, presenting an additional view of the tapped hole 1806B with which the threaded length 1818E of the bolt 1508 engages the fixed element 1806 in addition to an extended hexagonal feature 1806C that fits into an indented hexagonal feature 1800A in a base 1800D of the chamber 1800.

Referring now generally to the Figures and particularly to FIG. 18G, FIG. 18G is a view of an interior of the damping element chamber 1800 and the indented hexagonal feature 1800A that receives the extended hexagonal feature 1806C of the fixed element 1806 and holds the fixed element in place. Shown also is an anchoring hole 1800B for the spring 1804, and a non-threaded hole 1800C through which the bolt 1508 fully traverses the chamber 1800. A cage bolt stop wall 1800E of the chamber 1800 extends outwardly to form a concave surface 1800F.

Referring now generally to the Figures and particularly to FIG. 18G, FIG. 18J, FIG. 18K and FIG. 18L, in installation of the damping element chamber 1800, the cage plate 1502 may be rotatably wound around the spring 1804 to load a moment of force within the spring 1804 prior to installing the cage stop bolt 1822, whereby the cage bolt stop wall 1800E is configured to constrain movement of the cage bolt 1800E when the cage bolt 1800E applies force against the concave surface 1800F.

Referring now generally to the Figures and particularly to FIG. 18H, FIG. 18H is a partial perspective view of the damping assembly 1506. FIG. 18H presents the chamber 1800, the rotatable tapped cap 1812, and the trio of tapped cap receivers 1812A, 1812B & 1812C and anchoring hole 1812F of the rotatable tapped cap 1812.

Referring now generally to the Figures and particularly to FIG. 18I, FIG. 18I is a partial perspective view of the inside of the damping element assembly 1504 with the spring 1804 and the chamber 1800 not included in the illustration. FIG. 18I presents the thumbscrew 1802, notched washer 1816, fixed element 1806, rotatable tapped cap 1812, and the trio of tapped cap receivers 1812A, 1812B & 1812C and anchoring hole 1812F of the rotatable tapped cap 1812.

Referring now generally to the Figures and particularly to FIGS. 18A through 18I, the damper assembly provides damping and protection against road-generated vibration and perturbance of the chain 210 as shown in FIG. 2A that is generally transferred to the cage plate 1502 through the chain 210, the tension pulley 1510 and the guide pulley 1514, so the user can more reliably change gears while the vehicle is in motion. The damping element assembly 1504 forms a rotating joint between rotatable tapped cap 1812 and fixed element 1806 that allows these two elements 1812 and 1806 to shift independently of each other with reduction in transmission of kinetic energy from one to the other and avoiding the establishment of an inflexible or rigid connection between the two elements 1812 and 1806. The extended portion 1812D of rotatable tapped cap 1812 fits into the socket 1806A formed for the extended portion 1812D by the shape of the fixed element 1806, and the rotatable tapped cap 1812 rotates in articulation with the fixed element 1806, with bushings 1808 & 1810 fitting between the extended portion 1812D and socket 1806A and to reduce friction between the rotatable tapped cap 1812 and the fixed element 1806. The rotatable tapped cap 1812 is designed to allow a range of motion in which there is an increased flexibility and mobility of connection between the chain 210 as shown in FIG. 2A and the guide pulley 1514 and tension pulley 1510 during operation of the bicycle 104.

The fixed element 1806 and the rotatable tapped cap 1812 form a hermetic volume that contains damping grease 1814 and inhibits leakage of the damping grease 1814 into anywhere else in the damping element assembly 1504.

A key function of the spring 1804 is to provide a torsional counter-balancing force in damping element assembly 1504 against movement of the cage plate 1502. The spring 1804 is anchored to the rotatable tapped cap 1812 using the anchoring hole 1812F in the flat top part 1812E of the rotatable tapped cap 1812 at one end, and to the base 1800D of the chamber 1800 using the anchoring hole 1800B. The spring 1804 is further compressed between the fixed element 1806 and the base 1800D of the chamber 1800, such that the spring 1804 is always compressed and contained between the fixed element 1806 and the base 1800D of the chamber 1800.

Adjusting the thumbscrew 1802 can decrease or increase the compression force experienced by the damping grease 1814 which accordingly increases or decreases the damping force provided by the damping element assembly 1504. The engagement of the tapped hole 1806B of the fixed element 1806 along the threaded length 1818C of the bolt 1508 maintains the grease 1814 under compression between the fixed element 1806 and the rotatable tapped cap 1812. Turning the thumbscrew 1802 repositions the location of the engagement of the tapped hole 1806B of the fixed element 1806 along the threaded length 1818C of the bolt 1508 and thereby increases or decreases the compressive force applied to the grease 1814 by the enclosure of the grease 1814 between the fixed element 1806 and the rotatable tapped cap 1812.

These changes in compression force experienced by the damping grease 1814 correspondingly increase or decrease the damping effect acted upon the spring 1804 against force received by the damping element assembly 1504 from the cage plate 1502 and the chain 210. The protruding hexagonal feature 1806A on the bottom of the fixed element 1806 always fits into the indented hexagonal feature 1800A in the base 1800D of the chamber 1800 regardless of the current tension setting, and thus is locked into a fixed position relative to the chamber 1800, while articulating against the rotatable tapped cap 1812 which moves independently of the position of the chamber 1800.

Referring now generally to the Figures and particularly to FIG. 18C and FIG. 18J, FIG. 18J is an exploded perspective view of the cage bolt 1822 of the chamber 1800 that is adapted to be rotatably seated within and against the concave surface 1800F of the cage bolt stop wall 1800E. A tapped cage receiver 1824 extends wholly through the cage plate 1502 is adapted to engage with a threaded length 1826 of the cage bolt 1822.

A trio of untapped plate apertures 1614A, 1614B & 1614C are sized, shaped and positioned in the cage plate 1502 to separately accept and permit traversal of threaded portions of any one of a trio of cage screws 1616A, 1616B & 1616C. The cage screws 1616A, 1616B & 1616C are each sized and shaped to engage with one of a trio of tapped cap receivers 1812A, 1812B & 1812C as presented in FIG. 18C.

Referring now generally to the Figures and particularly to FIG. 18K, FIG. 18K is a perspective side view of the cage bolt 1822 rotatably seated within the concave surface 1800F of the cage bolt stop wall 1800E, and while the cage plate 1502 and the chamber 1800 are rotatably coupled. Threaded length 1826 of the cage bolt 1822 is inserted into and coupled with the tapped cage receiver 1824. The cage bolt 1822 acts to maintain the "wound" up helical spring inside the chamber 1800 in a compressed state. If the cage bolt 1822 was not present in the derailleur 1402, the spring 1804 would unwind and there would be no force provided by the spring 1804 against the chain 210 when the derailleur 1402 is installed on the bicycle 104. A main purpose of the cage bolt 1822 is to facilitate in the installation of the derailleur 1402 on the bicycle 104. Once the derailleur 1402 has been installed on the bicycle 104, the user passes the chain 210 about the plurality of sprockets 1406 and both pulleys 1510 & 1514 attached to the cage plate 1502. By coupling the two ends of the chain 210 together, force will be applied to the pulley 1510 & 1514 so that the cage plate 1502 is biased to extend downward against the force of the spring 1804, whereby this downward force relieves any force acting on the cage bolt 1800E. The cage bolt 1822 thus mainly has effect when there is no chain 210 passing through the derailleur cage plate 1502 and pulleys 1510 & 1514.

Referring now generally to the Figures and particularly to FIG. 18L, FIG. 18L is an alternate perspective side view of the cage bolt 1822 rotatably seated within the concave surface 1800E of the cage bolt stop wall 1800E while the cage plate 1502 and the chamber 1800 are rotatably coupled.

Figure 19A:
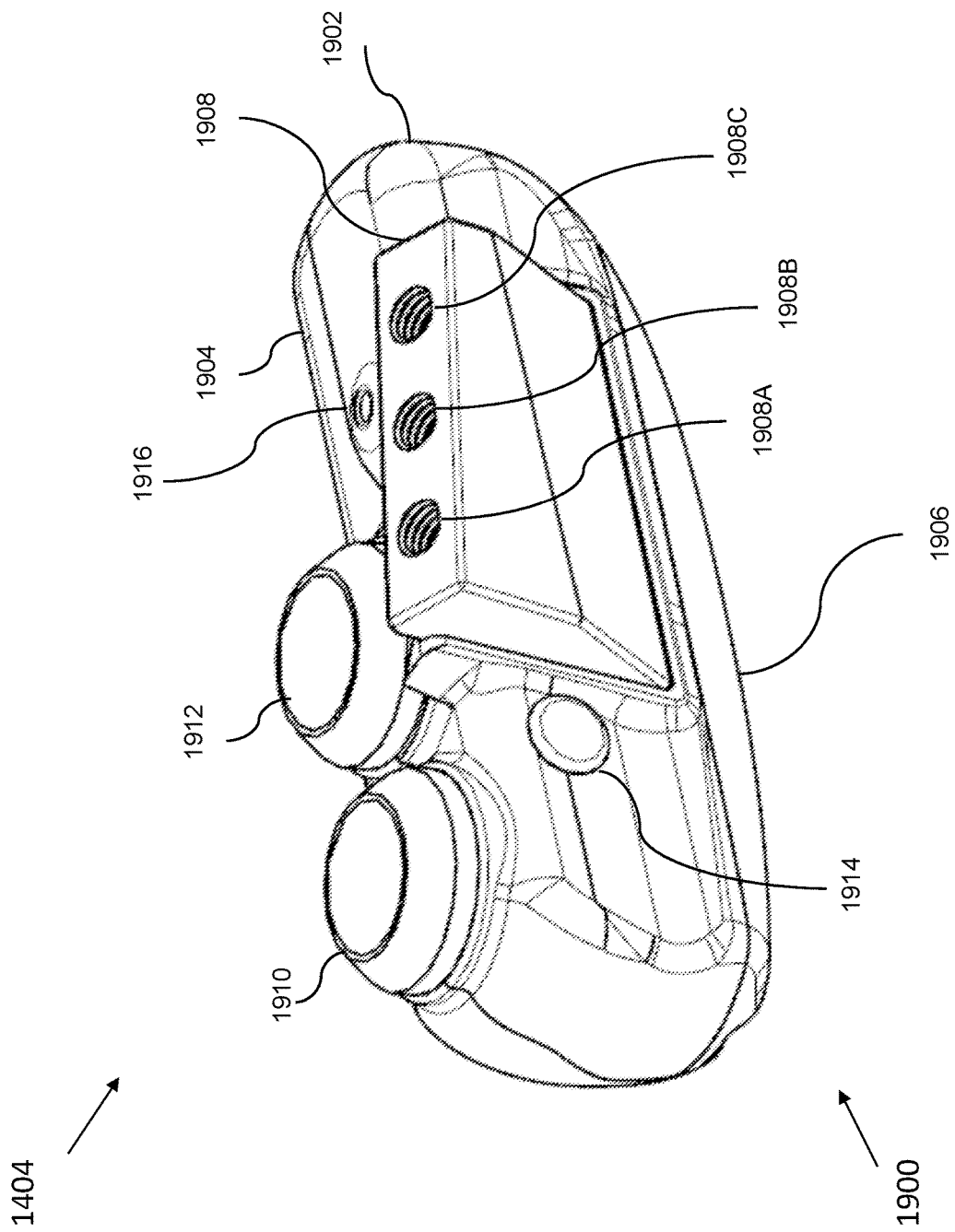
FIG. 19A is a perspective view of the second control module of FIG. 14 in an operational and fully assembled state.
Figure 19B:
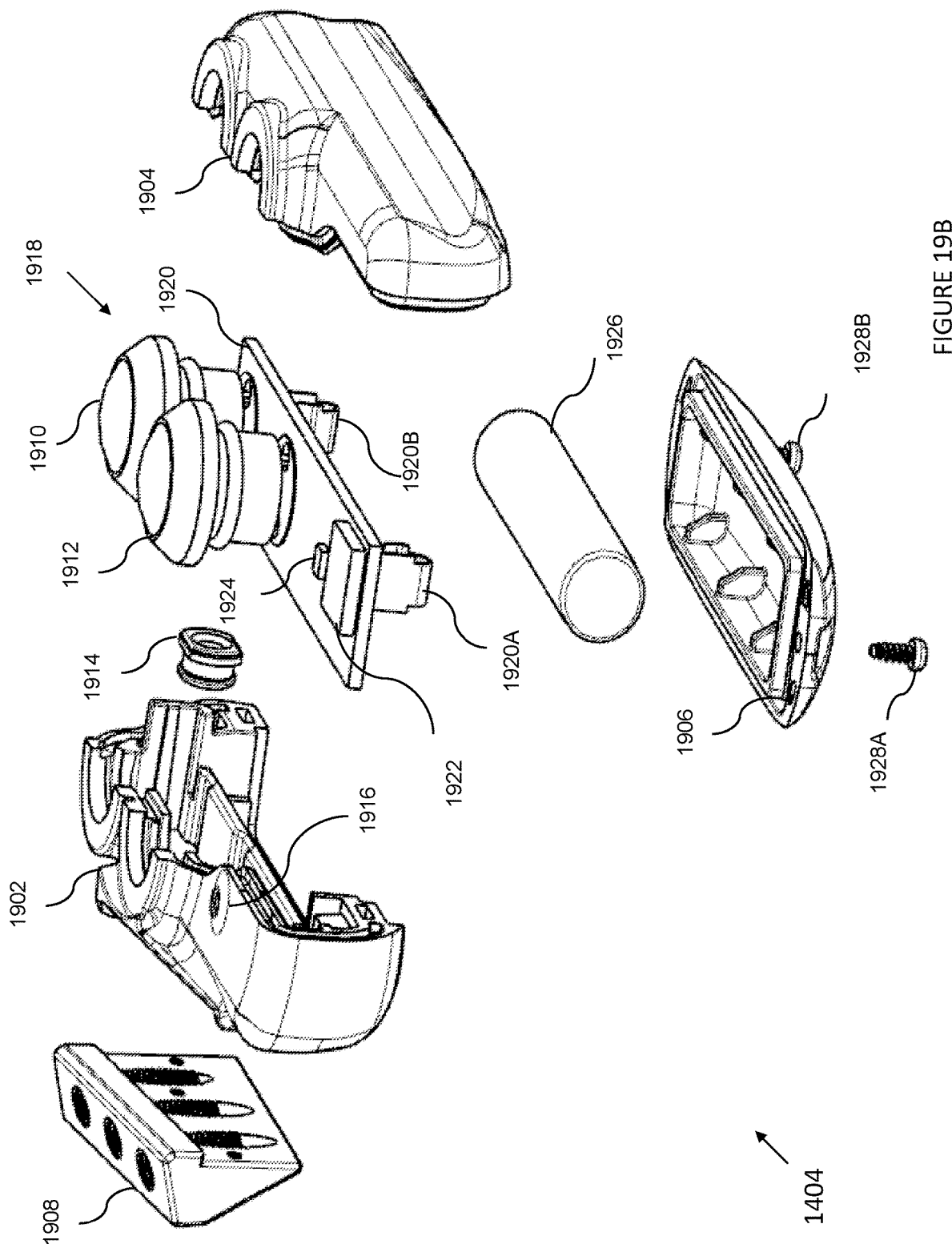
FIG. 19B is an exploded view of the second control module of FIG. 14.

Referring now generally to the Figures and particularly to FIG. 19A, FIG. 19B and FIG. 19C, FIG. 19A is a perspective view of the second control module 1404 in an operational and fully assembled state, and FIG. 19B and FIG. 19C are separate exploded views of the second control module 1404. As shown in FIG. 19A, a module shell 1900 formed by joining a combination of a fixture side panel 1902, a matching side panel 1904 and a bottom side panel 1906. The fixture side panel 1902, the matching side panel 1904 and the bottom side panel 1906 may be coupled by means of adhesives and/or suitable fastening means known in the art, to include screws and tapped receiver features.

The fixture side panel 1902 is sized and shaped to be attached to a clamp feature 1908. The clamp feature 1908 forms three tapped clamp receivers 1908A, 1908B & 1908C that are sized, shaped and adapted to receive and detachably couple with a prior art clamp (not shown), wherein the prior art clamp is preferably adapted to enable attachment of the second control module 1404 to the handlebar 112 of the bicycle 104. The module shell 1900 when fully assembled positions and partially protects an alternate upshift button 1910, an alternate downshift button 1912, an alternate micro-adjust button 1914 and an indicator light window 1916.

Referring now generally to the Figures and particularly to FIG. 19A, FIG. 19B and FIG. 19C, FIG. 19B is an exploded view of the second control module 1404. An electronic communications module 1918 (hereinafter, "the comms module" 1918) includes a signal and power routing control board 1920, from which extend a pair of electrical power contacts 1920A & 1920B. As further described in reference to FIG. 20, the comms module electrically couples an alternate control module controller 1922 (hereinafter, "the ALT CM controller" 1922, a light emitting diode 1924, the upshift button 1910, the downshift button 1912, and the micro-adjust button 1914. An alternate control module battery 1926 is positioned with the fully assembled second control module 1404 to provide electrical power to the pair of electrical power contacts 1920A & 1920B. A pair of control module screws 1926A & 1926B are adapted to extend through the bottom side panel 1906 and to separately engage with individual tapped receivers (not shown) of the fixture side panel 1902 and thereby couple the bottom side panel 1906 with the fixture side panel 1902.

Referring now generally to the Figures and particularly to FIG. 19B and FIG. 19C, FIG. 19C presents a trio of CM shell screws 1900A, 1900B & 1900C that are adapted to extend through a trio of individual untapped apertures 1902A of the fixture side panel 1902 and to separately engage with individual tapped receivers 1908A, 1908B & 1908C of the clamp feature 1908 and thereby couple the clamp feature 1908 with the fixture side panel 1902.

Figure 20:
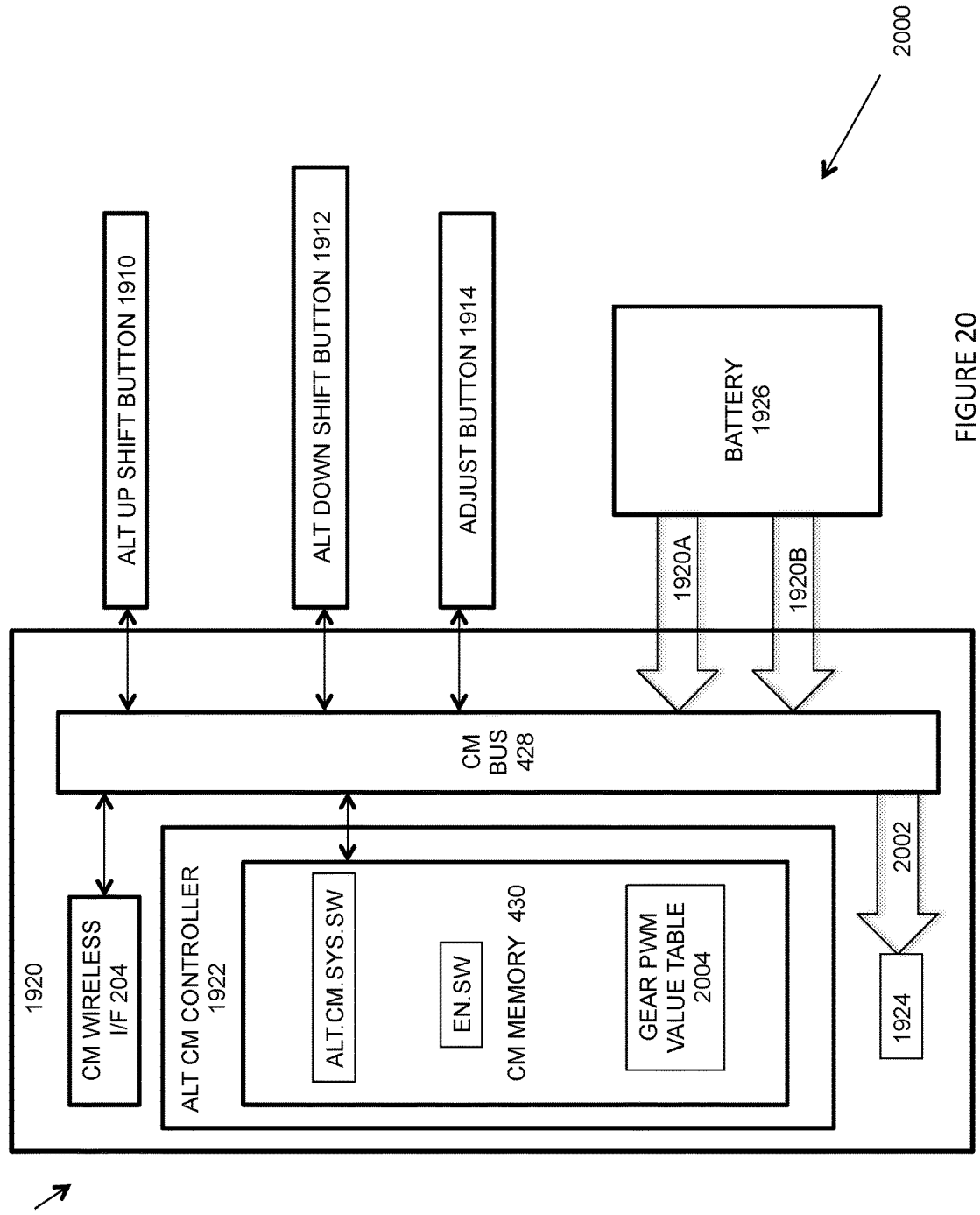
FIG. 20 is a block diagram of an alternate control module circuitry that is comprised within the second control module of FIG. 14 and includes the comms module 1918 of FIG. 19B.

Referring now generally to the Figures and particularly to FIG. 20, FIG. 20 is a block diagram of an alternate control module circuitry 2000 that is comprised within the second control module 1404 and includes the comms module 1918. The derailleur microprocessor 1602S includes the integrated CM memory 430 and is bi-directionally communicatively coupled by the CM bus 428 with the CM wireless interface 204. The CM bus 428 further communicatively couples the CM controller 426 with the alternate upshift button 1910, the alternate downshift button 1912 and the alternate micro-adjust button 1914. The comms bus 428 additionally receives electrical power from the alternate control module battery 1926 via the pair of electrical power contacts 1920A & 1920B and provides electrical power to the control module controller 426 and the CM wireless interface 204 and further provides electrical, as directed by the control module controller 426, to the light emitting diode 1924 via a control module LED power trace 2002. The signal and power routing control board 1920 is structured to mechanically support the control module controller 426, the CM wireless interface 204, the light emitting diode 1924 and control module LED power trace 2002

The CM memory 430 stores an alternate control module system software ALT.CM.SYS.SW (hereinafter "the alternate CM software" ALT.CM.SYS.SW). The alternate CM software ALT.CM.SYS.SW includes software encoded instruction that enable the control module 108 to instantiate and perform all relevant tasks in the operation of the control module 108 and/or the comms module 1918 as required or optionally directed by the invented method to include the method and the process steps of FIGS. 6 through 12 and FIGS. 22 through 25 as disclosed herein. A copy of an encryption/decryption software EN.SW also maintained by the CM memory 430 enables the comms module 1918 to encrypt messages prior to transmission and decrypt messages after receipt as required or directed by the invented method to include the method and the process steps of FIGS. 6 through 12 as disclosed herein. For example, the encryption/decryption software EN.SW enables the comms module 1918 to selectively encrypt information transmitted in step 606 of FIG. 6, 706 of FIG. 7, and step 1210 of FIG. 12 prior to said transmissions.

Figure 21:
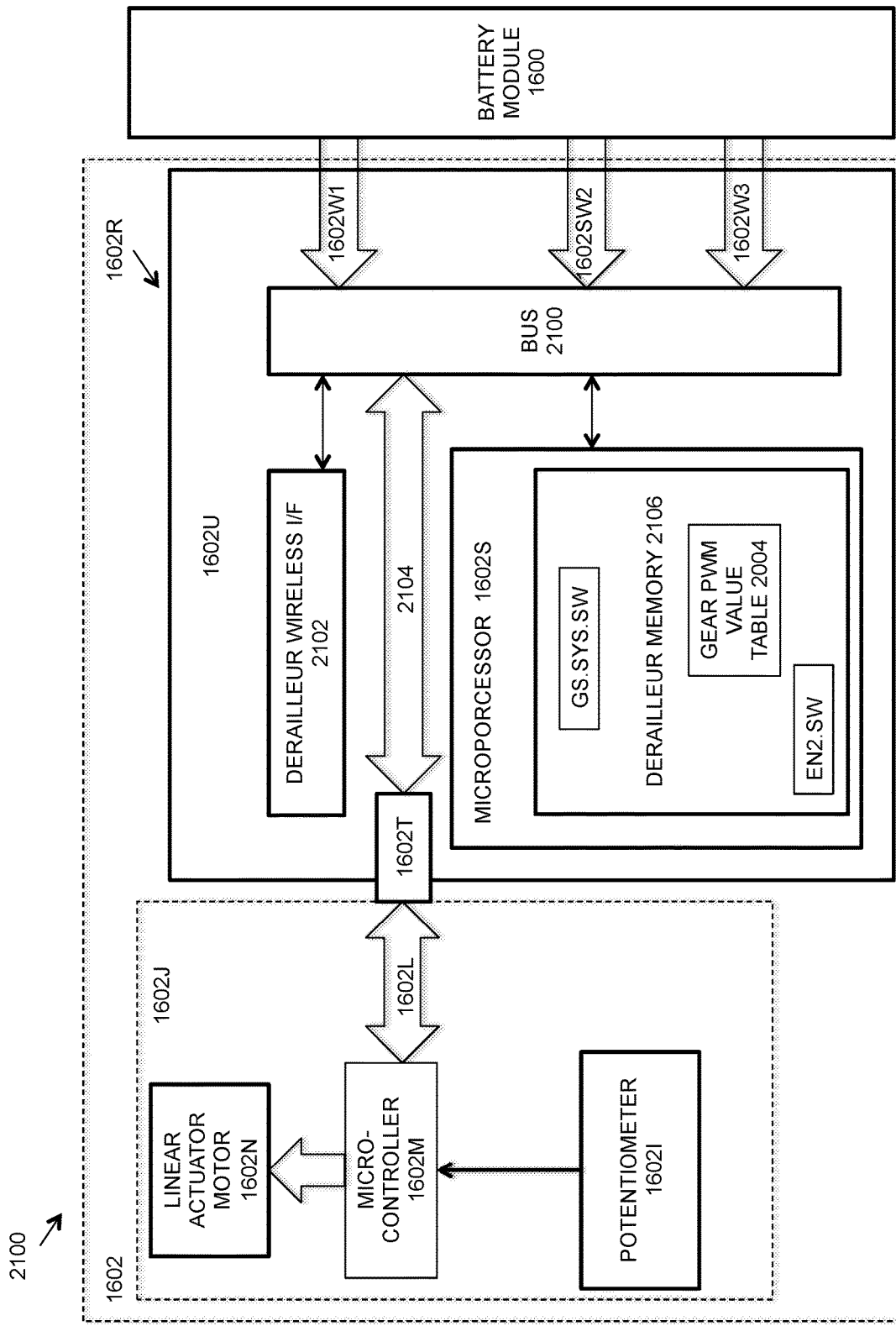
FIG. 21 is a block diagram of a derailleur control circuitry that is comprised within the derailleur of FIG. 14.

Referring now generally to the Figures and particularly to FIG. 21, FIG. 21 is a block diagram of a derailleur control circuitry 2100 that is comprised within the derailleur 1402. The derailleur control circuitry 2100 includes the derailleur controller module 1602R and elements of the linear actuator motor assembly 1602J, to include the potentiometer 1602I, the motor power and signal pathway 1602L, the linear actuator microcontroller 1602M and the linear actuator motor 1602N. An alternate derailleur power and communications bus 2100 bi-directionally communicatively couples the derailleur microprocessor 1602S with the derailleur wireless interface 2102 and the intermediate power and signal pathway 1602T via a derailleur internal power and signal pathway 2104. The alternate derailleur power and communications bus 2100 additionally receives electrical power sourced from the battery module 1600 via the trio of electrically conductive threaded contacts 1602W1, 1602W2 & 1602W3 and provides electrical power to the derailleur microprocessor 1602S with the derailleur wireless interface 2102. The alternate derailleur power and communications bus 2100 additionally provides electrical power, as directed by the derailleur microprocessor 1602S, to the intermediate power and signal pathway 1602T via a derailleur internal power and signal pathway 2104.

Electrical power flows from the derailleur controller module 1602R to the linear actuator motor assembly 1602J by the electrical connectivity of the intermediate power and signal pathway 1602T and the motor power and signal pathway 1602L. The electrical connectivity of the intermediate power and signal pathway 1602T and the motor power and signal pathway 1602L also enable signals to bi-directionally flow between the derailleur controller module 1602R to the linear actuator motor assembly 1602J.

The intermediate power and signal pathway 1602T is electrically coupled with the linear actuator microcontroller 1602M and enables bi-directional communication between the linear actuator microcontroller 1602M and the derailleur microprocessor 1602S. The electrical connectivity of the intermediate power and signal pathway 1602T and the linear actuator microcontroller 1602M further enables signals to bi-directionally flow between the derailleur controller module 1602R to the linear actuator microcontroller 1602M.

Within the linear actuator motor assembly 1602J, the potentiometer 1602I provides electrical signal values that inform the linear actuator microcontroller 1602M of the position of the wiper 1602G within the actuator body 1602F. The linear actuator microcontroller 1602M interprets the electrical values received from the potentiometer 1602I to provide electrical energy to the linear actuator motor 1602N that causes the linear actuator motor 1602N to drive the lead screw 1602K to a position that places the arm 1602C in a location as directed by commands received from the derailleur controller module 1602R. It is understood that the linear actuator microcontroller 1602M may optionally receive pulse width modulated signals from the derailleur controller module 1602R that are applied the linear actuator microcontroller 1602M in view of electrical values received from the potentiometer 1602I to achieve a positioning of arm 1602C as directed by the derailleur controller module 1602R.

The derailleur memory 2106 stores an alternate derailleur system software GS.SYS.SW (hereinafter "the GS software" ALT.CM.SYS.SW). The GS software ALT.CM.SYS.SW includes software encoded instruction that enable the derailleur controller module 1602R to instantiate and perform all relevant tasks in the operation of the derailleur 1402 and/or the derailleur control circuitry 2100 as required or optionally directed by the invented method, to include the method and the process steps of FIGS. 6 through 12 and FIGS. 22 through 25 as disclosed herein. The derailleur memory 2106 additionally stores and enables access to and updating of the gear PWM value 2004 as a copy or as the master and prevailing instantiation.

A copy of an encryption/decryption software EN2.SW also maintained by the derailleur memory 2106 enables the derailleur controller module 1602R to encrypt messages prior to transmission and decrypt messages after receipt as required or directed by the invented method to include the method and the process steps of FIGS. 6 through 12 as disclosed herein. For example, the second encryption/decryption software EN2.SW enables the derailleur controller module 1602R to selectively decrypt encrypted information received in step 608 of FIG. 6, 708 of FIG. 7, step 814 of FIG. 8, 914 of FIG. 9, 1014 of FIG. 10, 1118 of FIG. 11, and step 1212 of FIG. 12 after receipt of transmissions.

Referring now generally to the Figures and particularly to FIG. 22, FIG. 22 is a block diagram of an instantiation of the gear PWM value table 2004 that are reprogrammably associates each of a plurality of gear number values GRN.001-GRN.N with individual specific pulse width modulation values PWM.VAL.001-PWM.VAL.N in a dedicated individual table row 2004R1-2004RN, wherein each pulse width modulation value WM.VAL.001-PWM.VAL.N specifies a position to along the stroke of the linear actuator arm 1602C to the linear actuator microcontroller 1602M. The gear number values GRN.001-GRN.N are stored in a first column 2004A of the gear PWM value table 2004 and the pulse width modulation values PWM.VAL.001-PWM.VAL.N are stored in a second column 2004B of the gear PWM value table 2004. In the instantiation of the gear PWM value table 2004 depicted in FIG. 22, each pulse width modulation value PWM.VAL.001-PWM.VAL.N is preferably reprogrammable by a comprising circuit 2000 & 2100.

A third column 2004C of the gear PWM value table 2004 stores a reprogrammable indication of a reference to a currently selected reference gear number value GRN.001-GRN.N that has most recently been programmed by a user manipulating, e.g., pressing with fingers, the upshift button 1910 and/or the alternate downshift button 1912. The currently selected reference gear number value GRN.001-GRN.N is the sixth gear number GRN.006 and is denoted by an associated reprogrammable indication value FLAG stored in the third column 2004C and the sixth column 2004R6. All gear number values GRN.001-GRN.N that are not indicated to be the currently selected reference gear number value GRN.001-GRN are associated with a null value NULL in the third column position of their corresponding row 2004R1-2004R5 & 2004R7-2004RN.

The CM wireless communications interface 204 and derailleur wireless interface 2102 are selected, configure, paired and adapted to enable communications between the second control module 1404 and the 1602S by one or more wireless communications standards, to include the Bluetooth wireless communications standard, the WiFi standard and the Wireless N standard, the Bluetooth low energy standard, and the ANT standard.

Figure 23:
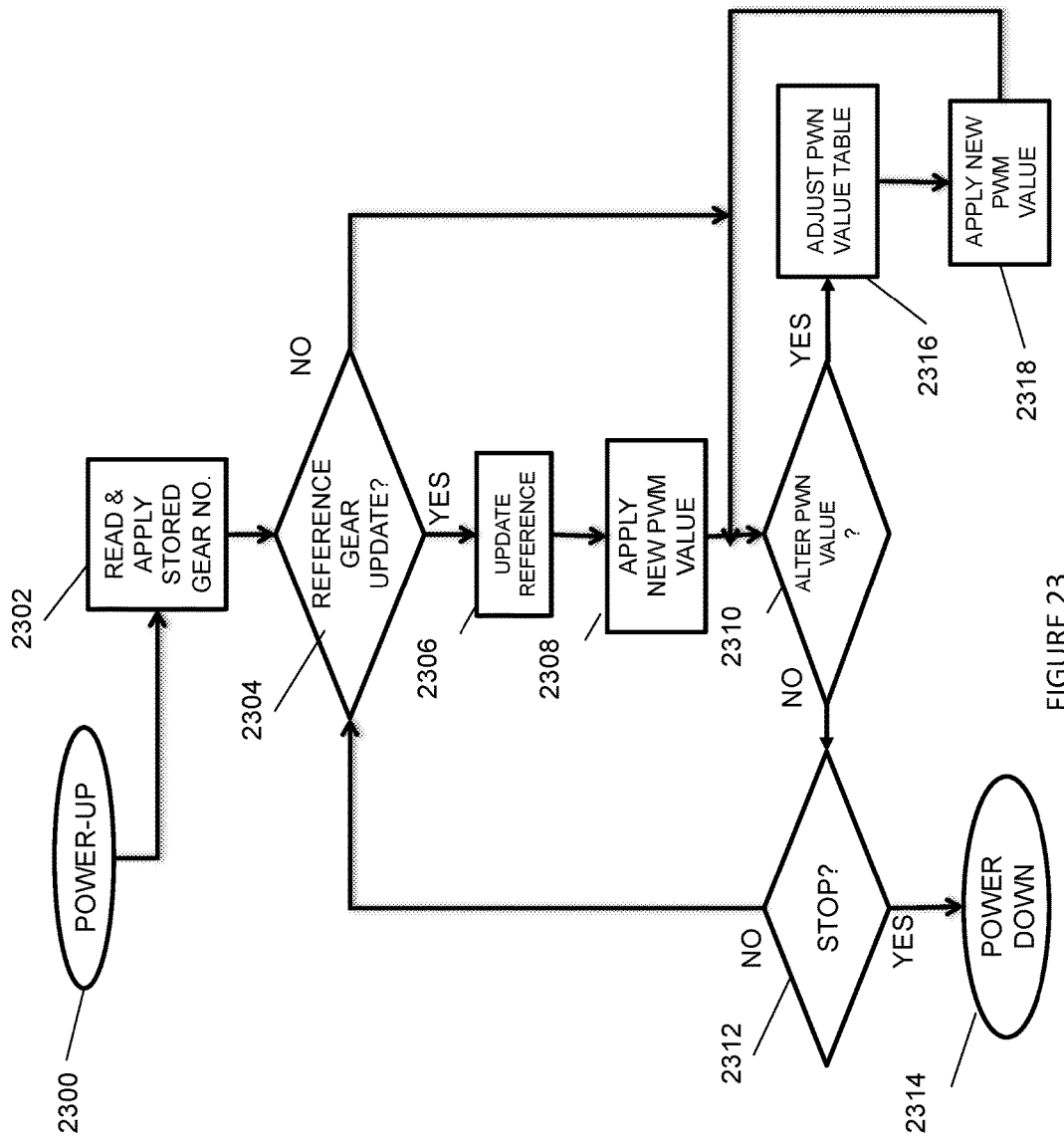
FIG. 23 is a software flowchart of the derailleur of FIG. 14.

Referring now generally to the Figures and particularly to FIG. 23, FIG. 23 is a software flowchart of the derailleur 1402 operating in accordance with wireless communications received from the second control module 1404. It is understood that the execution of steps 2300 through 2318 by the second control system 1404 in accordance with the instructions stored in or generated by the alternate derailleur system software GS.SYS.SW.

An exemplary operation of the derailleur 1402 will now be described, for clarity of explanation and not offered as limitation, in reference to the instantiation of the gear PWM value table 2004 as presented in FIG. 22. It is understood that where an alternate gear number value GRN.001-GRN.005 & GRN.007-GRN.N is indicated in the gear PWM value table 2004, the derailleur 1402 will start from step 2303 from an the alternately indicated gear number value GRN.001-GRN.005 & GRN.007-GRN.N.

In step 2300 the derailleur 1402 powers up and in step 2302 reads and applies the referenced sixth gear number value GRN.006 by issuing a signal pulse sized and shaped in accordance with the reprogrammable pulse width parameters stored as the sixth pulse width modulation value PWM.VAL.006 of the gear PWM value table 2004. The signal pulse generated in step 2302 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2302 as received by the linear actuator microcontroller 1602M. The derailleur 1402 determines in step 2304 whether a derailleur adjustment message ADJ.MSG.001, as further discussed regarding and shown in FIG. 26A, directing an adjustment of the reference gear indication FLAG/NULL in the gear value table 2004 has been received from the second control module 1404 by wireless transmission. When the derailleur 1402 determines in step 2304 that a derailleur adjustment message ADJ.MSG.001 has been received from the second control module 1404 that directs an adjustment of the reference gear indication FLAG/NULL in the gear value table 2004, in step 2306 the second control module 1404 increments of decrements the indication of the reference gear number value GRN.001-GRN.N from GRN.006 as indicated in the derailleur adjustment message ADJ.MSG.001 received from the second control module 1404.

In step 2308 the derailleur microprocessor 1602S issues a signal pulse to the linear actuator microcontroller 1602M that is sized and shaped in accordance with the reprogrammable pulse width parameters stored as the pulse width modulation value PWM.VAL.006 associated with the newly indicated reference number value GRN.001-GRN.N as stored in the gear PWM value table 2004. The signal pulse generated in step 2308 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2308 and as most recently received by the linear actuator microcontroller 1602M.

In step 2310 the derailleur 1402 determines whether a derailleur adjustment message ADJ.MSG.001 received from the second control module 1404 by wireless transmission has been received by the derailleur wireless interface 2102 that directs an incrementing or a decrementing of a pulse width modulation value PWM.VAL.001-PWM.VAL.N as stored in the gear PWM value table 2004 and is associated with the currently indicated reference gear number value number GRN.001-GRN.N.

When the derailleur 1402 determines in step 2310 that a derailleur adjustment message ADJ.MSG.001 directing an incrementing or a decrementing of the pulse width modulation value PWM.VAL.001-PWM.VAL.N has not been received by the derailleur wireless interface 2102 by wireless transmission, the derailleur microprocessor 1602S proceeds on to step 2312 and to determine whether to proceed on to step 2314 and to power down, or to alternatively proceed back to perform an additional and following execution of step 2304.

In the alternative, when the derailleur 1402 determines in step 2310 that a derailleur adjustment message ADJ.MSG.001 directing an incrementing or a decrementing of the pulse width modulation value PWM.VAL.001-PWM.VAL.N has been received by the derailleur wireless interface 2102, the derailleur microprocessor 1602S proceeds on to step 2316 and modify, in accordance with the signal detected in step 2310, the pulse width modulation value PWM.VAL.001-PWM.VAL.N as stored in the gear PWM value table 2004 associated with the currently indicated reference gear number value number GRN.001-GRN.N.

In step 2318 the derailleur microprocessor 1602S issues a signal pulse to the linear actuator microcontroller 1602M that is sized and shaped in accordance with the reprogrammable pulse width parameters stored as the recently revised pulse width modulation value PWM.VAL.006-PWM.CAL.N associated with the indicated reference number value GRN.001-GRN.N as stored in the gear PWM value table 2004. The signal pulse generated in step 2318 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2318 and as most recently received by the linear actuator microcontroller 1602M. The derailleur microprocessor 1602S proceeds from step 2318 and proceeds back to perform a following additional execution of step 2310.

Figure 24:
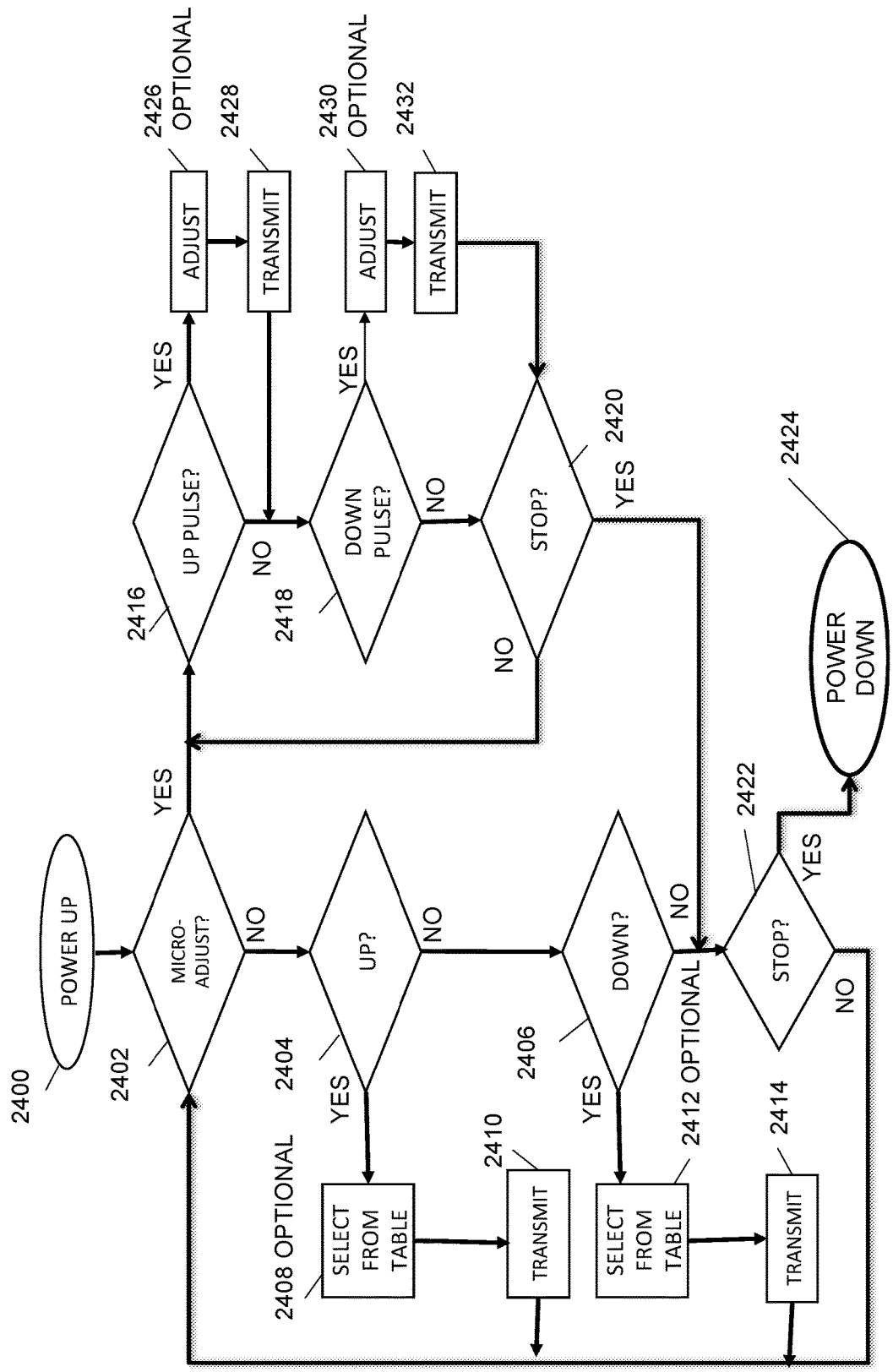
FIG. 24 is a software flowchart of the second control system of FIG. 14.

Referring now generally to the Figures and particularly to FIG. 24, FIG. 24 is a software flowchart of the second control system 1404 operating in accordance with wireless communications with the derailleur 1402. An exemplary operation of the derailleur 1402 will now be described, for clarity of explanation and not offered as limitation, in reference to the instantiation of the gear PWM value table 2004 as presented in FIG. 22. It is understood that the execution of steps 2400 through 2432 by the second control system 1404 in accordance with the instructions stored in or generated by the alternate CM software ALT.CM.SYS.SW.

In step 2400 the second control system 1404 powers up and proceeds to step 2402 to determine whether the ALT CM controller 1922 has detected an actuation signal received from the micro-adjust button 1914. When the ALT CM controller 1922 in step 2402 determines that no newly generated actuation signal has been received from the micro-adjust button 1914, the ALT CM controller 1922 proceeds on to step 2402

In step 2404 the ALT CM controller 1922 determines whether it has detected an actuation signal received from the upshift button 1910. When the ALT CM controller 1922 in step 2404 determines that no newly generated actuation signal has been received from the upshift button 1910, the ALT CM controller 1922 proceeds on to step 2406.

In step 2406 the ALT CM controller 1922 determines whether it has detected an actuation signal received from the downshift button 1912. When the ALT CM controller 1922 in step 2406 determines that no newly generated actuation signal has been received from the downshift button 1912, the ALT CM controller 1922 proceeds on to step 2406.

In an alternative outcome to step 2404, when the ALT CM controller 1922 in step 2404 determines that a newly generated actuation signal has been received from the upshift button 1910, the ALT CM controller 1922 proceeds on to either optional step 2408 or a signal transmission step 2410. In optional step 2408 the ALT CM controller 1922 accesses the gear PWM value table 2004 proceeds on to modify, in accordance with the upshift input detected in step 2404, the currently indicated reference gear number value GRN.001-GRN.N to the next higher gear number value GRN.001-GRN.N. The ALT CM controller 1922 proceeds from optional step 2408 to step 2410 and transmits the derailleur adjustment message ADJ.MSG.001 bearing the newly established gear number value GRN.001-GRN.N to the derailleur wireless interface 2102. The ALT CM controller 1922 proceeds from step 2410 to an additional execution of step 2402.

In yet an alternative outcome to step 2404, when the ALT CM controller 1922 in step 2404 determines that a newly generated actuation signal has been received from the upshift button 1910, the ALT CM controller 1922 proceeds directly on to signal transmission step 2414 and formats and transmits a derailleur adjustment message ADJ.MSG.001 directing the derailleur wireless interface 2102 to (1.) associate the reprogrammable indication value FLAG with a next higher gear number value GRN.001-GRN.N than the gear number value GRN.001-GRN.N presently associated with the reprogrammable indication value FLAG; and (2.) revise the previous association of that lower gear number value GRN.001-GRN.N from the indication value FLAG to the null value NULL. The ALT CM controller 1922 proceeds from step 2410 to an additional execution of step 2402.

In an alternative outcome to step 2406, when the ALT CM controller 1922 in step 2404 determines that a newly generated actuation signal has been received from the downshift button 1912, the ALT CM controller 1922 proceeds on to either optional step 24012 or a signal transmission step 2414. In optional step 2410 the ALT CM controller 1922 accesses the gear PWM value table 2004 proceeds on to modify, in accordance with the downshift input detected in step 2406, the currently indicated reference gear number value GRN.001-GRN.N to the next lower gear number value GRN.001-GRN.N. The ALT CM controller 1922 proceeds from optional step 2412 to step 2414 and transmits a wireless signal bearing the newly established gear number value GRN.001-GRN.N to the derailleur wireless interface 2102.

In yet an alternative outcome to step 2406, when the ALT CM controller 1922 in step 2406 determines that a newly generated actuation signal has been received from the downshift button 1912, the ALT CM controller 1922 may proceed directly on to signal transmission step 2414 and format and transmit a derailleur adjustment message ADJ.MSG.001 directing the derailleur wireless interface 2102 to (1.) associate the reprogrammable indication value FLAG with a next lower gear number value GRN.001-GRN.N than the gear number value GRN.001-GRN.N presently associated with the reprogrammable indication value FLAG; and (2.) revise the previous association of that higher gear number value GRN.001-GRN.N from the indication value FLAG to the null value NULL.

The ALT CM controller 1922 proceeds from either step 2406 or step 2414 to an additional execution of step 2402.

In an alternative outcome to step 2402, when the ALT CM controller 1922 in step 2404 determines that a newly generated actuation signal has been received from the micro-adjust button 1914, the ALT CM controller 1922 proceeds on to step 2416. In step 2416 the ALT CM controller 1922 determines whether it has detected an actuation signal received from the upshift button 1910. When the ALT CM controller 1922 in step 2416 determines that no newly generated actuation signal has been received from the upshift button 1910, the ALT CM controller 1922 proceeds on to step 2418. In step 2418 the ALT CM controller 1922 determines whether it has detected an actuation signal received from the downshift button 1912. When the ALT CM controller 1922 in step 2418 determines that no newly generated actuation signal has been received from the downshift button 1912, the ALT CM controller 1922 proceeds on to step 2420.

In step 2420, when the ALT CM controller 1922 determines that a newly generated actuation signal has been received from the micro-adjust button 1914, the ALT CM controller 1922 proceeds on to step 2422. In an alternative outcome to step 2420, when the ALT CM controller 1922 determines that a newly generated actuation signal has not been received from the micro-adjust button 1914, the ALT CM controller 1922 proceeds on to perform an additional execution of step 2416.

In step 2422, the ALT CM controller 1922 determines whether to perform an additional execution of step 2402 or to proceed on to step 2424 and to power down.

In an alternative outcome to step 2416, when the ALT CM controller 1922 in step 2416 determines that a newly generated actuation signal has been received from the upshift button 1910, the ALT CM controller 1922 proceeds on to either optional step 2426 or a signal transmission step 2428.

In optional step 2426 the ALT CM controller 1922 accesses the gear PWM value table 2004 and proceeds on to increment, in accordance with the upshift input detected in step 2416, the pulse width modulation value PWM.VAL.001-PWM.VAL.N associated with the currently indicated reference gear number value GRN.001-GRN.N. The ALT CM controller 1922 proceeds from optional step 2426 to step 2428 and transmits a wireless signal bearing the newly incremented pulse width modulation value PWM.VAL.001-PWM.VAL.N and optionally the currently indicated reference gear number value GRN.001-GRN.N to the derailleur wireless interface 2102.

In yet an alternative outcome to step 2416, when the ALT CM controller 1922 in step 2416 determines that a newly generated actuation signal has been received from the upshift button 1910, the ALT CM controller 1922 proceeds directly on to signal transmission step 2428 and transmits a wireless signal directing the derailleur wireless interface 2102 to increment the pulse width modulation value PWM.VAL.001-PWM.VAL.N associated with the currently indicated reference gear number value GRN.001-GRN.N.

The ALT CM controller 1922 proceeds from either step 2426 or step 2428 to step 2418.

In an alternative outcome to step 2418, when the ALT CM controller 1922 in step 2418 determines that a newly generated actuation signal has been received from the downshift button 1912, the ALT CM controller 1922 proceeds on to either optional step 2430 or a signal transmission step 2432.

In optional step 2430 the ALT CM controller 1922 accesses the gear PWM value table 2004 and proceeds on to decrement, in accordance with the downshift input detected in step 2416, the pulse width modulation value PWM.VAL.001-PWM.VAL.N associated with the currently indicated reference gear number value GRN.001-GRN.N. The ALT CM controller 1922 proceeds from optional step 2430 to step 2432 and transmits a wireless signal bearing the newly decremented pulse width modulation value PWM.VAL.001-PWM.VAL.N and optionally the currently indicated reference gear number value GRN.001-GRN.N to the derailleur wireless interface 2102.

In yet an alternative outcome to step 2418, when the ALT CM controller 1922 in step 2416 determines that a newly generated actuation signal has been received from the downshift button 1912, the ALT CM controller 1922 proceeds directly on to signal transmission step 2432 and transmits a wireless signal directing the derailleur wireless interface 2102 to decrement the pulse width modulation value PWM.VAL.001-PWM.VAL.N associated with the currently indicated reference gear number value GRN.001-GRN.N.

The ALT CM controller 1922 proceeds from either step 2430 or step 2432 to step 2420.

Figure 25:
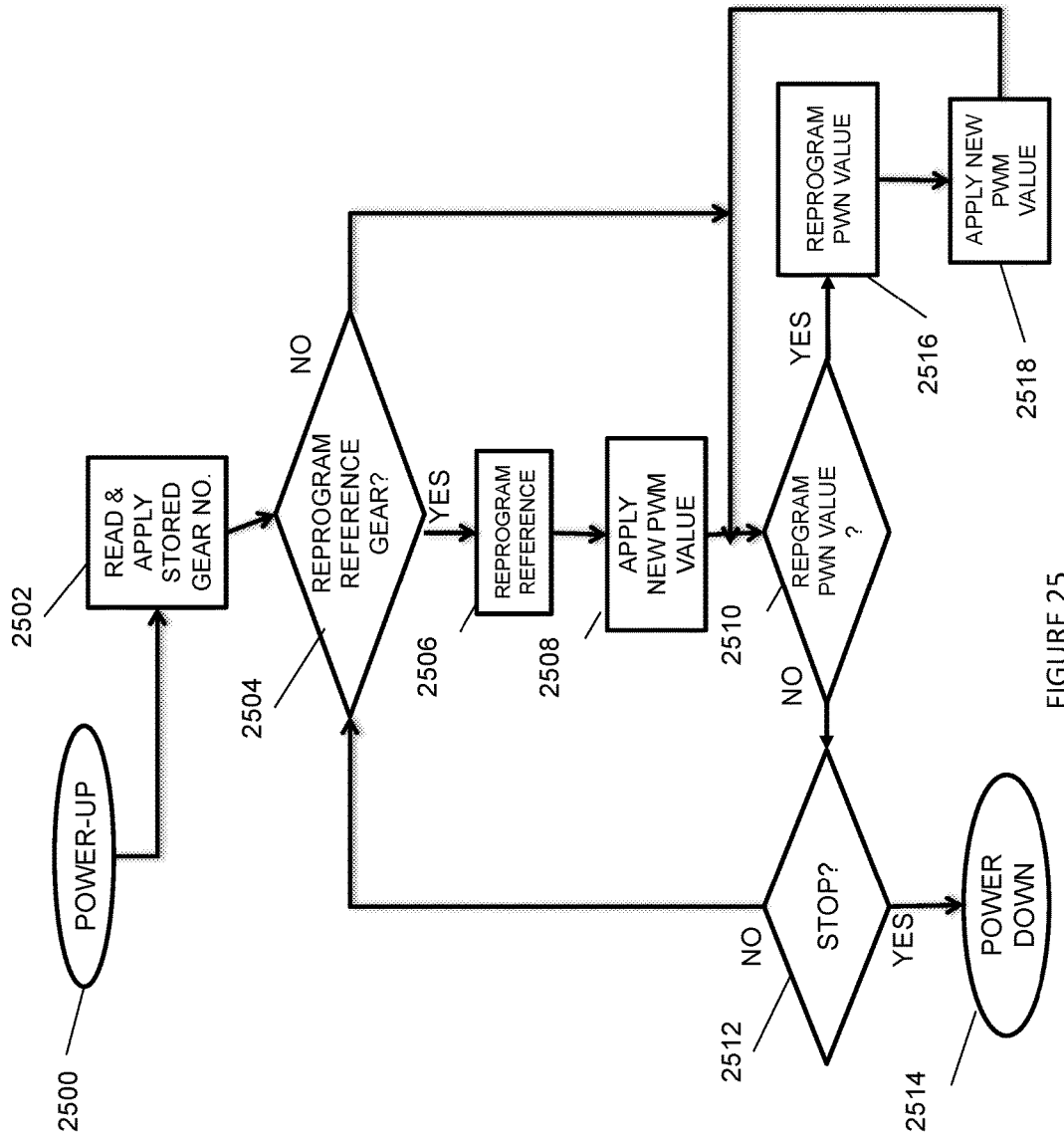
FIG. 25 is an alternate software flowchart of the derailleur of FIG. 14.
Figure 26A:
FIG. 26A is a block diagram of an exemplary derailleur adjustment message as transmitted by the derailleur control circuitry of FIG. 21 to the derailleur of FIG. 14.
Figure 26B:
FIG. 26B is a block diagram of an exemplary value reprogramming message as transmitted by the derailleur control circuitry of FIG. 21 to the derailleur of FIG. 14.

Referring now generally to the Figures and particularly to FIG. 25 and FIG. 26B, FIG. 25 is a software flowchart of the derailleur 1402 operating in accordance with wireless communications received from the second control module 1404. It is understood that the execution of steps 2500 through 2518 by the second control system 1404 in accordance with the instructions stored in or generated by the alternate derailleur system software GS.SYS.SW.

An exemplary operation of the derailleur 1402 will now be described, for clarity of explanation and not offered as limitation, in reference to the instantiation of the gear PWM value table 2004 as presented in FIG. 22 and referred to in the description of FIG. 26B.

In step 2500 the derailleur 1402 powers up and in step 2502 reads and applies the referenced sixth gear number value GRN.006 by issuing a signal pulse sized and shaped in accordance with the reprogrammable pulse width parameters stored as the sixth pulse width modulation value PWM.VAL.006 of the gear PWM value table 2004. The signal pulse generated in step 2502 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2502 as received by the linear actuator microcontroller 1602M. The derailleur 1402 determines in step 2504 whether a value reprogramming message RPGM.MSG.001, as further discussed regarding and shown in FIG. 26B, directing a reprogramming of the reference gear indication FLAG/NULL in the gear value table 2004 has been received from the second control module 1404 by wireless transmission. When the derailleur 1402 determines in step 2504 that a value reprogramming message RPGM.MSG.001 has been received from the second control module 1404 that directs a reprogramming of the reference gear indication FLAG/NULL in the gear value table 2004, in step 2506 the second control module 1404 reprograms the indication of the reference gear number value number value GRN.001-GRN.N from GRN.006 as indicated in the most recently received value reprogramming message RPGM.MSG.001.

In step 2508 the derailleur microprocessor 1602S issues a signal pulse to the linear actuator microcontroller 1602M that is sized and shaped in accordance with the reprogrammable pulse width parameters stored as the pulse width modulation value PWM.VAL.006 associated with the newly indicated reference number value GRN.001-GRN.N as stored in the gear PWM value table 2004. The signal pulse generated in step 2508 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2508 and as most recently received by the linear actuator microcontroller 1602M.

In step 2510 the derailleur 1402 determines whether a value reprogramming message RPGM.MSG.001 received from the second control module 1404 by wireless transmission has been received by the derailleur wireless interface 2102 that directs a reprogramming of the pulse width modulation value PWM.VAL.001-PWM.VAL.N stored in the gear PWM value table 2004 and associated with the currently indicated reference gear number value GRN.001-GRN.N.

When the derailleur 1402 determines in step 2510 that a value reprogramming message RPGM.MSG.001 directing a reprogramming of a pulse width modulation value PWM.VAL.001-PWM.VAL.N has not been received by the derailleur wireless interface 2102 by wireless transmission, the derailleur microprocessor 1602S proceeds on to step 2512 and to determine whether to proceed on to step 2514 and to power down, or to alternatively proceed back to perform an additional and following execution of step 2504.

In the alternative, when the derailleur 1402 determines in step 2510 that a value reprogramming message RPGM.MSG.001 directing reprogramming of the pulse width modulation value PWM.VAL.001-PWM.VAL.N has been received by the derailleur wireless interface 2102, the derailleur microprocessor 1602S proceeds on to step 2516 and reprograms, in accordance with the value reprogramming message RPGM.MSG.001 detected in step 2510, the pulse width modulation value PWM.VAL.001-PWM.VAL.N stored in the gear PWM value table 2004 and associated with the currently indicated reference gear number value number value GRN.001-GRN.N.

In step 2518 the derailleur microprocessor 1602S issues a signal pulse to the linear actuator microcontroller 1602M that is sized and shaped in accordance with the reprogrammable pulse width parameters stored as the recently reprogrammed pulse width modulation value PWM.VAL.006-PWM.CAL.N associated with the indicated reference number value GRN.001-GRN.N as stored in the gear PWM value table 2004. The signal pulse generated in step 2518 is transmitted from the derailleur microprocessor 1602S to the linear actuator microcontroller 1602M, whereupon the linear actuator microcontroller 1602M powers the linear motor 1602N until a current reading of the potentiometer 1602I indicates that position of the wiper 1602G corresponds to a position associated with the signal pulse generated in step 2518 and as most recently received by the linear actuator microcontroller 1602M. The derailleur microprocessor 1602S proceeds from step 2518 and proceeds back to perform a following additional execution of step 2510.

Referring now generally to the Figures and particularly to FIG. 26A and FIG. 23, FIG. 26A is a block diagram of an exemplary derailleur adjustment message ADJ.MSG.001. The derailleur adjustment message ADJ.MSG.001 includes a message identifier AMSG.ID.001, a derailleur wireless address ADDR.DR of the derailleur 1402 as stored in the derailleur controller module 1602R as the destination address; a controller wireless address ADDR.CN of the second control module 1404 as stored in the the comms module 1918 as the sender address; a selection bit GN-PWM that indicates whether an association of gear number reference FLAG with a gear number GRN.001-GRN.N of the gear PWM value table 2004 is to be adjusted or a pulse width modulation value PWM.001-PWM-N of the same gear PWM value table 2004 is to be adjusted; and a decrement/increment bit UP-DOWN that indicates whether (1.) the current association of the gear number reference FLAG with a gear number GRN.001-GRN.N is to be incremented or decremented by gear number GRN.001-GRN.N, or the pulse width modulation value PWM.001-PWM-N associated with the currently indicated reference gear number gear number GRN.001-GRN.N of the gear PWM value table 2004 is to be incremented or decremented. The derailleur adjustment message ADJ.MSG.001 may optionally include an adjustment message date time stamp DTS.001.

It is understood that the derailleur controller module 1602R applies the selection bit GN-PWM in step 2304 and step 2310 of the method of FIG. 23, and further that the derailleur controller module 1602R applies the decrement/increment bit UP-DOWN in steps 2306 and 2316 of the method of FIG. 23.

Referring now generally to the Figures and particularly to FIG. 26B and FIG. 23, FIG. 26B is a block diagram of an exemplary value reprogramming message RPGM.MSG.001. The value reprogramming message RPGM.MSG.001 includes a reprogramming message identifier RMSG.ID.001, a derailleur wireless address ADDR.DR of the derailleur 1402 as stored in the derailleur controller module 1602R included as the destination address; a controller wireless address ADDR.CN of the second control module 1404 as stored in the comms module 1918 as the sender; a selection bit GN-PWM that indicates whether an association of the gear number reference FLAG with a gear number GRN.001-GRN.N of the gear PWM value table 2004 is to be reprogrammed, or a pulse width modulation value PWM.001-PWM-N of the gear PWM value table 2004 is to be reprogrammed; and a new value datum VAL.NEW that is to be entered into the gear PWM value table 2004 as either (a.) a new reference gear number value GRN.001-GRN.N to be indicated by the reference indicator FLAG, or (b.) as a new pulse width modulation value to be entered as a new pulse width modulation value PWM.VAL.001-PWM.VAL.N that is associated with the currently indicated reference gear GRN.001-GRN.N of the PWM value table 2004.

It is understood that the derailleur controller module 1602R applies the selection bit GN-PWM in step 2504 and step 2510, and further that the derailleur controller module 1602R reprograms the gear PWM value table 2004 with the new value datum VAL.NEW in steps 2506 and 2516.

The reprogramming message RPGM.MDG.001 may optionally include a reprogramming message date time stamp DTS.002.

Figure 27:
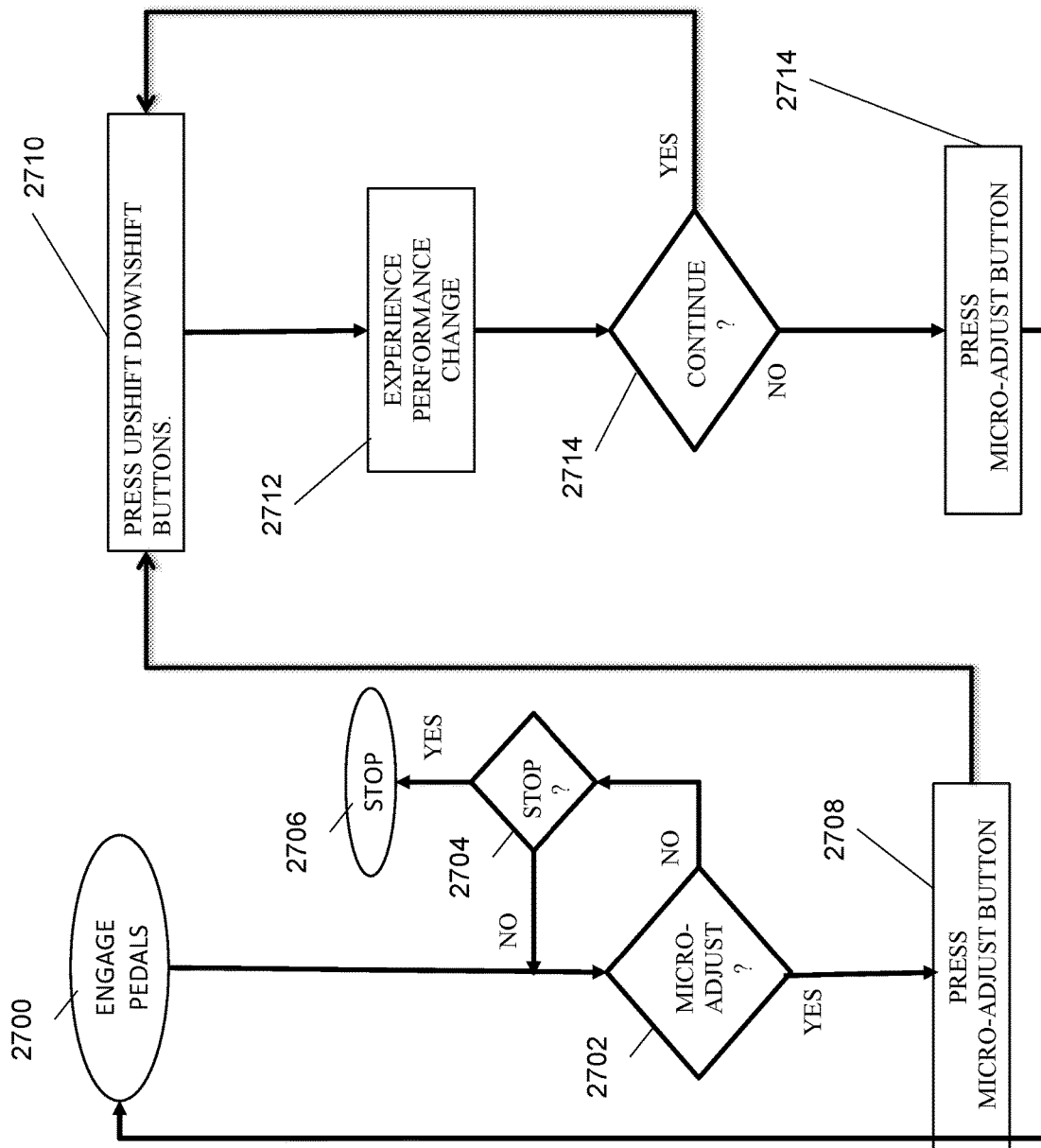
FIG. 27 is a process chart of a user experience of the invented gearshift system of FIG. 14.

Referring now generally to the Figures and particularly to FIG. 27, FIG. 27 is a process chart of a user experience of the invented gearshift system 1400 in riding the bicycle 104 and directing micro-adjustments of the pulse width modulation values PWM.VAL.001-PWM.N. In step 2700 the user mounts the bike 104 and rotates one or more bicycle pedals 114 & 116, as shown in FIG. 1 and FIG. 14, to engage the derailleur 1402 with the plurality of sprockets 1406. In step 2702 the user decides whether to adjust a pulse width modulation value PWM.VAL.001-PWM.N or to proceed on to step 2704 to consider stopping the present use of the bicycle 104 in step 2706. In step 2708 the user may adjust a pulse width modulation value PWM.VAL.001-PWM.N by manually depressing the micro-adjust button 1914 for 1 second or more. In step 2710 the user may direct the invented gearshift system to adjust and apply a micro-adjustment of the currently applied pulse width modulation value PWM.VAL.001-PWM.N by manually depressing either the upshift button 1910 or the downshift button 1912. Each press of the upshift button 1910 directs the invented gearshift system to increase the stored pulse width modulation value PWM.VAL.001-PWM.N by 5 μsec. Each press of the downshift button 1912 directs the invented gearshift system to decrease the stored pulse width modulation value PWM.VAL.001-PWM.N by 5 μsec. The user may then choose to evaluate any perceived difference in performance of the derailleur 1402 and/or the bicycle 104 in step 2712. In step 2714 the user may elect to continue directing micro-adjustments of the selected pulse width modulation value PWM.VAL.001-PWM.N by returning to an additional execution of step 2710, or alternatively, to end the present micro-adjustment session by manually depressing the micro-adjust button 1914 for 0.5 seconds or more.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the invented system, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A damping device comprised within a derailleur of a bicycle, the derailleur including a gear selection assembly and a gear guide pulley, the damping device comprising:
   an annular chamber, the chamber rotatably coupled with the gear selection assembly;
   a rotating element, the rotating element rotatably coupled with the chamber and fixedly coupled with the gear guide pulley;
   a damping grease volume, the damping grease volume contained between the chamber and the rotating element and transferring force travelling from the chamber and to the rotating element; and
   a fixed element fixedly coupled within the chamber, wherein the damping grease volume is maintained in compression between the fixed element and the rotating element.

2. The damping device of claim 1, the chamber further comprising a first attachment point at which the chamber is rotatably coupled with the gear selection assembly.

3. The damping device of claim 2, the chamber further comprising a second attachment point at which the chamber is additionally rotatably coupled with the gear selection assembly.

4. The damping device of claim 1, further comprising:
   a fixed element slidably coupled within the chamber, wherein the damping grease volume is maintained in compression between the fixed element and the rotating element; and
   a spring positioned within the chamber, wherein the spring provides spring force against the fixed element and the spring force is transferred through the damping grease and to the rotating element.

5. The device of claim 1, wherein a cage arm is disposed between and fixedly attached to both the rotating element and the gear guide pulley.

6. The device of claim 1, wherein the damping grease volume comprises silicone.

7. The device of claim 1, further comprising:
   an untapped rotating element aperture;
   an untapped chamber aperture; and
   a bolt extending through the rotating element aperture and the chamber aperture.

8. The device of claim 7, further comprising:
a fixed element having a tapped aperture, the fixed element slidably coupled within the chamber, wherein the damping grease volume is maintained in compression between the fixed element and the rotating element;
a threaded length of the bolt distal from the rotating element; and a tapped receiver of the fixed element, wherein the threaded length of the bolt rotatably engages with the tapped receiver of the fixed element.

9. The device of claim 8, further comprising a spring positioned within the chamber, wherein the spring provides spring force against the fixed element and the spring force is transferred through the damping grease and to the rotating element.

10. The device of claim 1, the bolt further comprising bolt head, the bolt head adapted to press the rotating element toward the chamber and maintain a coupling of the rotating element and the chamber.

11. The device of claim 1, further comprising:
a fixed element slidably coupled within the chamber, wherein the damping
grease volume is maintained in compression between the fixed element and the rotating element;
a spring positioned within the chamber, wherein the spring provides spring force against the fixed element and the spring force is transferred through the damping grease and to the rotating element;
an untapped rotating element aperture;
an untapped chamber aperture;
a bolt extending through the rotating element aperture and the chamber aperture, the bolt having a threaded bolt length positioned distally from the rotating element, and
a fixed element tapped receiver, the fixed element slidably coupled within the chamber, wherein the threaded length of the bolt rotatably engages with the tapped receiver of the fixed element, whereby the damping grease volume is maintained in compression between the fixed element and the rotating element.

12. The device of claim 11, further comprising:
a bolt head relieved channel of the bolt, the bolt head relieved channel distal from the rotating element and positioned outside of the chamber; and
a notched clip, the notched clip adapted to fit onto the bolt head relieved channel and extend peripherally beyond the bolt head relieved channel, whereby the notched clip maintains a coupling of the rotating element and the chamber.

13. The device of claim 12, further comprising a thumbscrew, the thumbscrew having a thumbscrew receiver positioned at a bolt tip located distally from the bolt head and the thumbscrew receiver accepting the bolt tip.

14. The device of claim 13, further comprising a first bushing positioned between the fixed element and the rotating element.

15. The device of claim 14, further comprising a second bushing positioned between the fixed element and the first bushing.

16. The device of claim 11, further comprising:
a chamber internal receiver, the chamber internal receiver positioned proximately to the fixed element and extending partially along the bolt; and
a fixed element extension, the fixed element extending into the chamber internal receiver and the chamber internal receiver inhibiting rotational motion of the fixed element about the bolt.

17. The device of claim 16, wherein the untapped chamber aperture extends centrally fully through the chamber internal receiver.

18. The device of claim 17, wherein the tapped fixed element aperture extends centrally fully through the fixed element extension.

19. The device of claim 16, wherein the fixed element extension forms at least three sides that extend in parallel with the bolt.

20. The device of claim 1, wherein the gear selection assembly comprises a linear actuator rotatably coupled with a drive arm, and the drive arm is rotatably coupled to the chamber.

21. The device of claim 4, wherein the gear selection assembly comprises a linear actuator rotatably coupled with a drive arm, and the drive arm is rotatably coupled to the chamber.

22. The device of claim 5, wherein the gear selection assembly comprises a linear actuator rotatably coupled with a guide arm, and the guide arm is rotatably coupled to the chamber.

* * * * *